(12) United States Patent
Kwon et al.

(10) Patent No.: US 12,348,868 B2
(45) Date of Patent: *Jul. 1, 2025

(54) CAMERA MODULE ACTUATOR FOR OPTICAL IMAGE STABILIZATION WITH MOVABLE IMAGE SENSOR

(71) Applicant: SAMSUNG ELECTRO-MECHANICS CO., LTD., Suwon-si (KR)

(72) Inventors: Oh Byoung Kwon, Suwon-si (KR); Bo Sung Seo, Suwon-si (KR); Soo Cheol Lim, Suwon-si (KR); Gab Yong Kim, Suwon-si (KR); Ki Hoon Jang, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,743

(22) Filed: Jan. 12, 2024

(65) Prior Publication Data

US 2024/0147072 A1 May 2, 2024

Related U.S. Application Data

(63) Continuation of application No. 17/732,734, filed on Apr. 29, 2022, now Pat. No. 11,910,090.

(30) Foreign Application Priority Data

| Apr. 30, 2021 | (KR) | 10-2021-0056625 |
| Sep. 3, 2021 | (KR) | 10-2021-0117762 |
| Apr. 15, 2022 | (KR) | 10-2022-0046938 |

(51) Int. Cl.
*H04N 23/68* (2023.01)
*H04N 23/54* (2023.01)
(Continued)

(52) U.S. Cl.
CPC .......... *H04N 23/687* (2023.01); *H04N 23/54* (2023.01); *H04N 23/55* (2023.01); *H04N 23/67* (2023.01)

(58) Field of Classification Search
CPC ...... H04N 23/687; H04N 23/54; H04N 23/55; H04N 23/67; H04N 23/57; G02B 7/021; G02B 7/08; G02B 7/09; G02B 27/646
See application file for complete search history.

(56) References Cited

U.S. PATENT DOCUMENTS

| 2011/0013283 A1 | 1/2011 | Sato |
| 2015/0049209 A1 | 2/2015 | Hwang et al. |

(Continued)

FOREIGN PATENT DOCUMENTS

| KR | 10-2018-0071223 A | 6/2018 |
| KR | 10-2020-0005436 A | 1/2020 |

(Continued)

OTHER PUBLICATIONS

Chinese Office Action Issued on Mar. 27, 2024, in Counterpart Chinese Patent Application No. 202210493979.5 (5 Pages in English, 8 Pages in Chinese).

(Continued)

*Primary Examiner* — Padma Haliyur
(74) *Attorney, Agent, or Firm* — NSIP Law

(57) ABSTRACT

An actuator for optical image stabilization, includes a fixed frame having an internal space; a moving frame, accommodated in the internal space, configured to linearly and rotatably move on a plane perpendicular to an optical axis; a first ball member disposed between the fixed frame and the moving frame; a first driver, disposed on the moving frame and the fixed frame, configured to provide a driving force to the moving frame; a plurality of magnetic bodies disposed on the fixed frame to generate attractive force with respect (Continued)

to the first driver disposed on the moving frame; a sensor substrate having a portion coupled to the moving frame to be movable, together with the moving frame, and another portion coupled to the fixed frame; and an image sensor disposed on the portion of the sensor substrate.

12 Claims, 37 Drawing Sheets

(51) Int. Cl.
*H04N 23/55* (2023.01)
*H04N 23/67* (2023.01)

(56) References Cited

U.S. PATENT DOCUMENTS

| | | |
|---|---|---|
| 2015/0062421 A1 | 3/2015 | Kwon et al. |
| 2016/0241787 A1 | 8/2016 | Sekimoto |
| 2017/0139225 A1 | 5/2017 | Lim |
| 2020/0314338 A1 | 10/2020 | Johnson et al. |
| 2021/0080806 A1 | 3/2021 | Xuepeng et al. |
| 2022/0014677 A1 | 1/2022 | Smyth |
| 2022/0337753 A1 | 10/2022 | Oh |
| 2024/0040254 A1 * | 2/2024 | Kim .................... G03B 5/04 |

FOREIGN PATENT DOCUMENTS

| | | |
|---|---|---|
| KR | 10-2020-0070704 A | 6/2020 |
| WO | WO 2021/040397 A1 | 3/2021 |
| WO | WO-2022225325 A1 * | 10/2022 ............ G03B 13/36 |

OTHER PUBLICATIONS

Korean Office Action issued on Oct. 23, 2023, in counterpart Korean Patent Application No. 10-2022-0046938 (7pages in English, 5 pages in Korean).

* cited by examiner

III-III'

CAMERA MODULE ACTUATOR FOR OPTICAL IMAGE STABILIZATION WITH MOVABLE IMAGE SENSOR

CROSS-REFERENCE TO RELATED APPLICATION(S)

This application is a continuation of application Ser. No. 17/732,734 filed on Apr. 29, 2022, which claims the benefit under 35 USC 119(a) of Korean Patent Application No. 10-2021-0056625 filed on Apr. 30, 2021, Korean Patent Application No. 10-2021-0117762 filed on Sep. 3, 2021, and Korean Patent Application No. 10-2022-0046938 filed on Apr. 15, 2022, in the Korean Intellectual Property Office, the entire disclosures of which are incorporated herein by reference for all purposes.

BACKGROUND

1. Field

The present disclosure relates to an actuator for optical image stabilization and a camera module including the same.

2. Description of Related Art

Recently, camera modules have been used in mobile communications terminals such as tablet personal computers (PC), laptops, and smartphones.

In addition, such camera modules have been provided with an actuator having a focusing function and an optical image stabilization function in order to generate a high-resolution image.

For example, focusing is performed by moving a lens module in an optical axis (Z-axis) direction, or optical image stabilization is performed by moving the lens module in directions perpendicular to an optical axis (a Z-axis).

However, recently, following improvements in the performance of camera modules, the weight of the lens module has also increased, and a weight of a driver for moving the lens module has also been affected, such that it has been difficult to precisely control the driving force of the optical image stabilization.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator for optical image stabilization, includes a fixed frame having an internal space; a moving frame, accommodated in the internal space, configured to linearly and rotatably move on a plane perpendicular to an optical axis; a first ball member disposed between the fixed frame and the moving frame; a first driver, disposed on the moving frame and the fixed frame, configured to provide a driving force to the moving frame; a plurality of magnetic bodies disposed on the fixed frame to generate attractive force with respect to the first driver disposed on the moving frame; a sensor substrate having a portion coupled to the moving frame to be movable, together with the moving frame, and another portion coupled to the fixed frame; and an image sensor disposed on the portion of the sensor substrate.

Guide grooves may be disposed, respectively, in opposing surfaces of the fixed frame and the moving frame facing each other in an optical axis direction, and cross sections of the guide grooves on the plane perpendicular to the optical axis may have sizes greater than a diameter of the first ball member.

The first driver may include a first sub-driver configured to generate a driving force in a first axis direction perpendicular to the optical axis and a second sub-driver configured to generate a driving force in a second axis direction perpendicular to both of the optical axis and the first axis direction. The first sub-driver may include a first magnet disposed on the moving frame and a first coil disposed on the fixed frame. The second sub-driver may include a second magnet disposed on the moving frame and a second coil disposed on the fixed frame.

The fixed frame may be provided with a plurality of through-holes penetrating through the fixed frame in an optical axis direction. The first coil and the second coil may be disposed in the plurality of through-holes, respectively.

A first substrate may be disposed on the fixed frame, and the first substrate may cover upper portions of the plurality of through-holes.

The first coil and the second coil may be disposed on one surface of the first substrate, and the plurality of magnetic bodies may be disposed on another surface of the first substrate.

Either one or both of the first magnet and the second magnet may include a plurality of magnets disposed to be spaced apart from each other in a direction perpendicular to a direction of the driving force.

A plurality of position sensors, facing the plurality of magnets, may be disposed on the fixed frame.

Each of the first magnet and the second magnet may have an N pole, a neutral region, and an S pole sequentially provided along a direction in which the driving force is generated.

The sensor substrate may include a moving part on which the image sensor is disposed, and which is coupled to the moving frame, a fixed part coupled to the fixed frame, and a connection part connecting the moving part and the fixed part. The connection part may extend along a circumference of the moving part. The connection part may have a plurality of slits penetrating through the connection part in an optical axis direction.

The connection part may include a first support part and a second support part, the first support part may have one side connected to the moving part and another side spaced apart from the fixed part, and the second support part may have one side connected to the fixed part and another side spaced apart from the moving part.

In another general aspect, a camera module includes a housing having an internal space; a lens module, accommodated in the internal space, disposed to be movable in an optical axis direction; a fixed frame fixedly disposed on the housing; a moving frame configured to move in directions perpendicular to an optical axis relative to the fixed frame, rotate about the optical axis, and press against the fixed frame; a first ball member disposed between the fixed frame and the moving frame; a first driver, disposed on the moving frame and the fixed frame, configured to provide a driving force to the moving frame; and a sensor substrate includes a moving part, coupled to the moving frame and on which an image sensor is disposed, and a fixed part coupled to the fixed frame.

The first driver may include a first sub-driver configured to generate a driving force in a first axis direction perpendicular to the optical axis, and a second sub-driver configured to generate a driving force in a second axis direction perpendicular to the optical axis and the first axis direction. Either one or both of the first sub-driver and the second sub-driver may include a plurality of magnets disposed to be spaced apart from each other in a direction perpendicular to a direction in which the driving force is generated. A plurality of position sensors facing the plurality of magnets may be disposed on the fixed frame.

The sensor substrate may further include a connection part connecting the moving part and the fixed part to each other. The connection part, a flexible printed circuit board, may have a plurality of slits penetrating through the connection part in the optical axis direction.

The camera module may further include a second driver, including a magnet disposed on the lens module and a coil disposed on the housing, and a second ball member disposed between the lens module and the housing. The second ball member may include a first ball group and a second ball group, each having a plurality of balls, and a number of balls in the first ball group and a number of balls in the second ball group may be different from each other.

Guide grooves in which the second ball member is disposed may be provided, respectively, in the lens module and the housing. A length, in the optical axis direction, of a guide groove in which the first ball group is disposed may be different from a length, in the optical axis direction, of a guide groove of the guide grooves in which the second ball group is disposed.

In another general aspect, a camera module includes a lens module includes one lens disposed in a lens barrel, a first actuator, and a second actuator. The first actuator, is configured for optical image stabilization, includes a fixed frame; a moving frame, accommodated in the fixed frame, configured to linearly and rotatably move about an optical axis; a first ball member disposed between the fixed frame and the moving frame; a first driver, disposed on the moving frame and the fixed frame, configured to drive the moving frame; magnetic bodies configured to generate an attractive force between the fixed frame and the first driver; a sensor substrate having a portion movably coupled to the moving frame and another portion fixedly coupled to the fixed frame; and an image sensor disposed on the portion of the sensor substrate. The second actuator, coupled to the first actuator, is configured to focus the lens module on an optical axis direction.

Guide grooves may be disposed, respectively, in opposing surfaces of the fixed frame and the moving frame facing each other in the optical axis direction, and cross sections of the guide grooves on the plane perpendicular to the optical axis may have sizes greater than a diameter of the first ball member.

The first driver may include a first sub-driver configured to generate a driving force in a first axis direction perpendicular to the optical axis direction and a second sub-driver configured to generate a driving force in a second axis direction perpendicular to both of the optical axis direction and the first axis direction. The first sub-driver may include a first magnet disposed on the moving frame and a first coil disposed on the fixed frame. The second sub-driver may include a second magnet disposed on the moving frame and a second coil disposed on the fixed frame.

The moving frame may be coupled to a reinforcing plate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
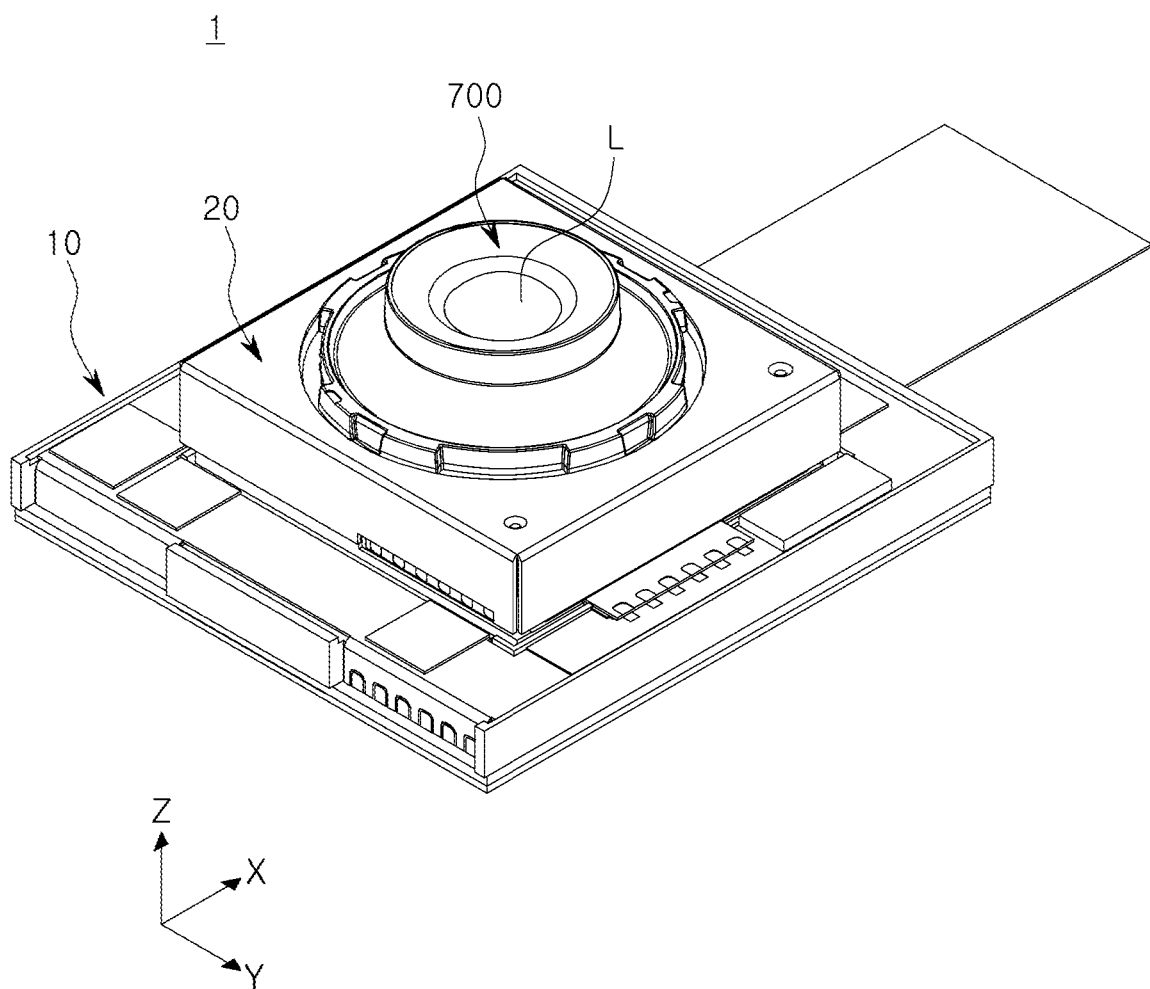
FIG. 1 is a perspective view illustrating an example of a camera module according to one or more embodiments in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

In addition, components included in an embodiment in the specification may be applied to other embodiments unless otherwise specified.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
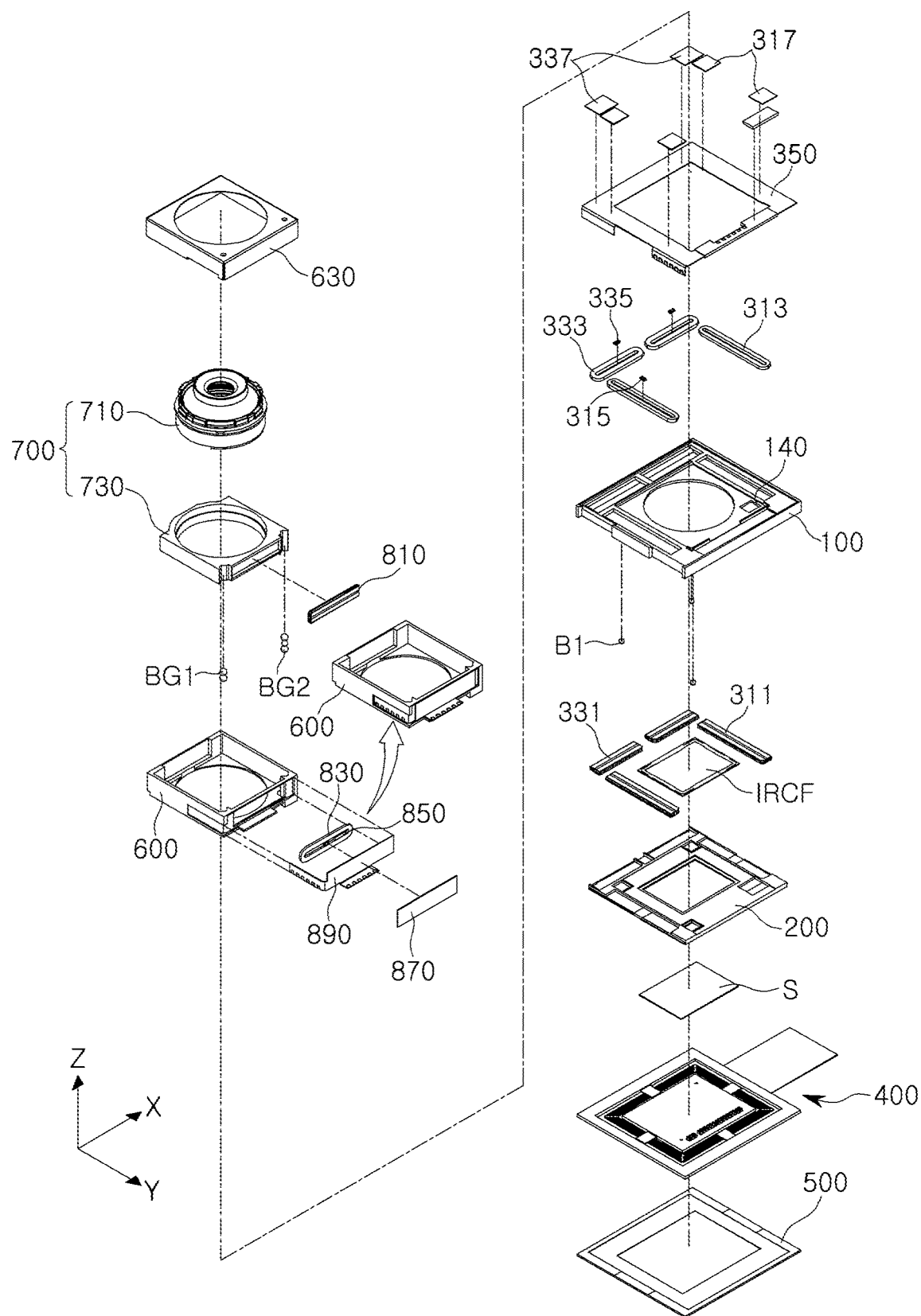
FIG. 2 is a schematic exploded perspective view illustrating the camera module according to one or more embodiments in the present disclosure.

FIG. 1 is a perspective view illustrating an example of a camera module according to one or more embodiments in the present disclosure, and FIG. 2 is a schematic exploded perspective view illustrating the camera module according to one or more embodiments in the present disclosure.

According to one or more embodiments in the present disclosure, an actuator for optical image stabilization and a camera module including the same may be mounted in a mobile electronic device. The mobile electronic device may be a portable electronic device such as a mobile communications terminal, a smartphone, or a tablet personal computer (PC).

Referring to FIGS. 1 and 2, a camera module 1 according to one or more embodiments in the present disclosure may include a lens module 700, an image sensor S, a first actuator 10, and a second actuator 20.

The first actuator 10 may be an actuator for optical image stabilization, and the second actuator 20 may be an actuator for focusing.

The lens module 700 may include at least one lens and a lens barrel 710. At least one lens may be disposed inside the lens barrel 710. When a plurality of lenses L are provided, the plurality of lenses L may be mounted inside the lens barrel 710 along an optical axis (a Z-axis).

The lens module 700 may further include a carrier 730 coupled to the lens barrel 710.

The carrier 730 may be provided with a hollow part penetrating through the carrier 730 in an optical axis (e.g., Z-axis) direction, and the lens barrel 710 may be inserted into the hollow part and be fixedly disposed with respect to the carrier 730.

In one or more embodiments in the present disclosure, the lens module 700 may be a moving member moving in the optical axis (e.g., Z-axis) direction at the time of auto-focusing (AF). To this end, the camera module 1, according to one or more embodiments in the present disclosure, may include the second actuator 20.

The lens module 700 may be moved in the optical axis (e.g., Z-axis) direction by the second actuator 20 to perform a focusing operation.

Meanwhile, the lens module 700 may be a fixed member that does not move at the time of optical image stabilization.

The camera module 1, according to one or more embodiments in the present disclosure, may perform optical image stabilization (OIS) by moving the image sensor S rather than the lens module 700. Since the image sensor S that is relatively light is moved, the image sensor S may be moved with a smaller driving force. Accordingly, the optical image stabilization may be more precisely performed.

To this end, the camera module 1, according to one or more embodiments in the present disclosure, may include the first actuator 10.

The image sensor S may be moved in directions perpendicular to the optical axis (e.g., the Z-axis) or rotated with the optical axis (e.g., the Z-axis) as a rotation axis by the first actuator 10 to perform the optical image stabilization.

The image sensor S may be moved in directions perpendicular to a direction to which an imaging plane of the image sensor S is directed by the first actuator 10. For example, the image sensor S may be moved in directions perpendicular to the optical axis (e.g., the Z-axis) or rotated with the optical axis (e.g., the Z-axis) as a rotation axis to perform the optical image stabilization.

Herein, the direction to which the imaging plane of the image sensor S is directed may be referred to as an optical axis (e.g., Z-axis) direction. That is, the image sensor S may be moved in the directions perpendicular to the optical axis (e.g., the Z-axis).

In the drawings, when it is mentioned that the image sensor S is moved in directions parallel to the imaging plane, it may be understood that the image sensor S is moved in the directions perpendicular to the optical axis (e.g., the Z-axis).

In addition, when it is mentioned that the image sensor S is moved in a first axis direction (e.g., X-axis direction) or a second axis direction (e.g., Y-axis direction), it may be understood that the image sensor S is moved in the direction perpendicular to the optical axis (e.g., the Z-axis).

In addition, it has been described that the image sensor S is rotated with the optical axis (e.g., the Z-axis) as a rotation axis for convenience, but when the image sensor S is rotated, the rotation axis of the image sensor may not coincide with the optical axis (e.g., the Z-axis). For example, the image sensor S may be rotated with any one axis perpendicular to the direction in which the imaging plane of the image sensor S is directed, as a rotation axis.

In addition, the first axis direction (e.g., the X-axis direction) and the second axis direction (e.g., the Y-axis direction) are examples of two directions perpendicular to the optical axis (e.g., the Z-axis) and intersecting each other. The first axis direction (e.g., the X-axis direction) and the second axis direction (e.g., the Y-axis direction) described herein may be understood as the two directions perpendicular to the optical axis (e.g., the Z-axis) and intersecting each other.

Figure 3:
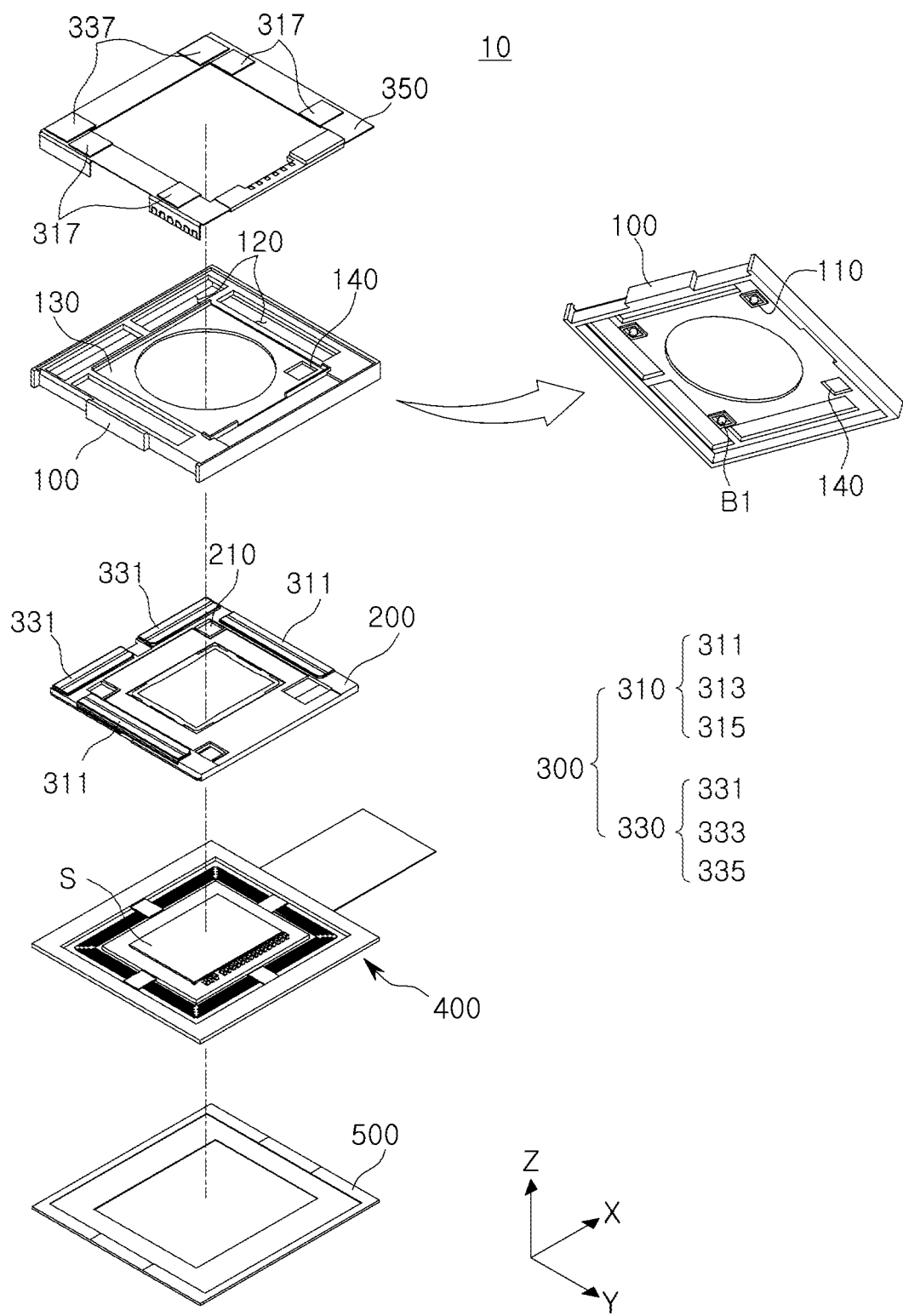
FIG. 3 is an exploded perspective view of a first actuator.
Figure 4:
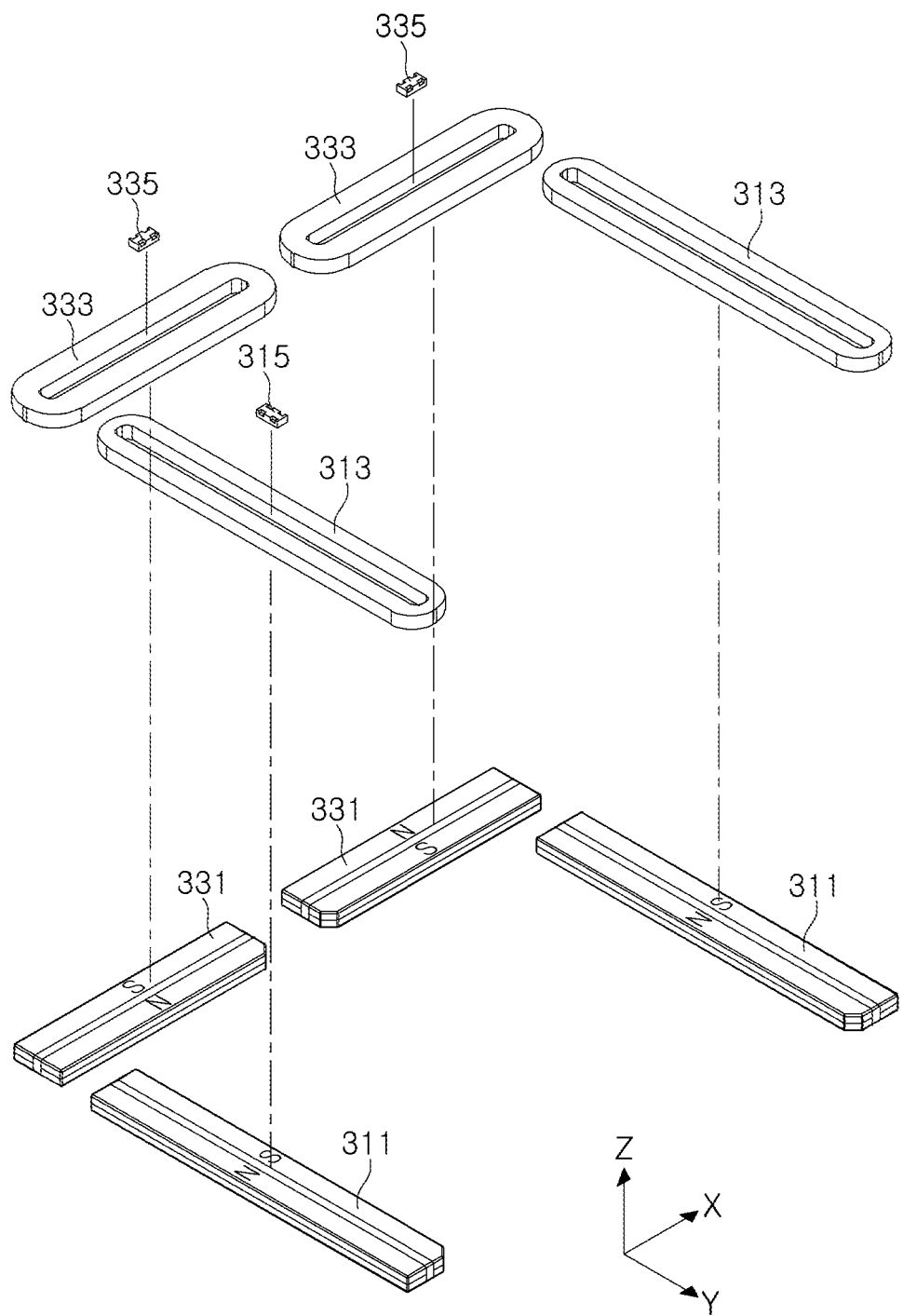
FIG. 4 is an exploded perspective view of a first driver of the first actuator.

FIG. 3 is an exploded perspective view of a first actuator, and FIG. 4 is an exploded perspective view of a first driver 300 of the first actuator.

Figure 5:
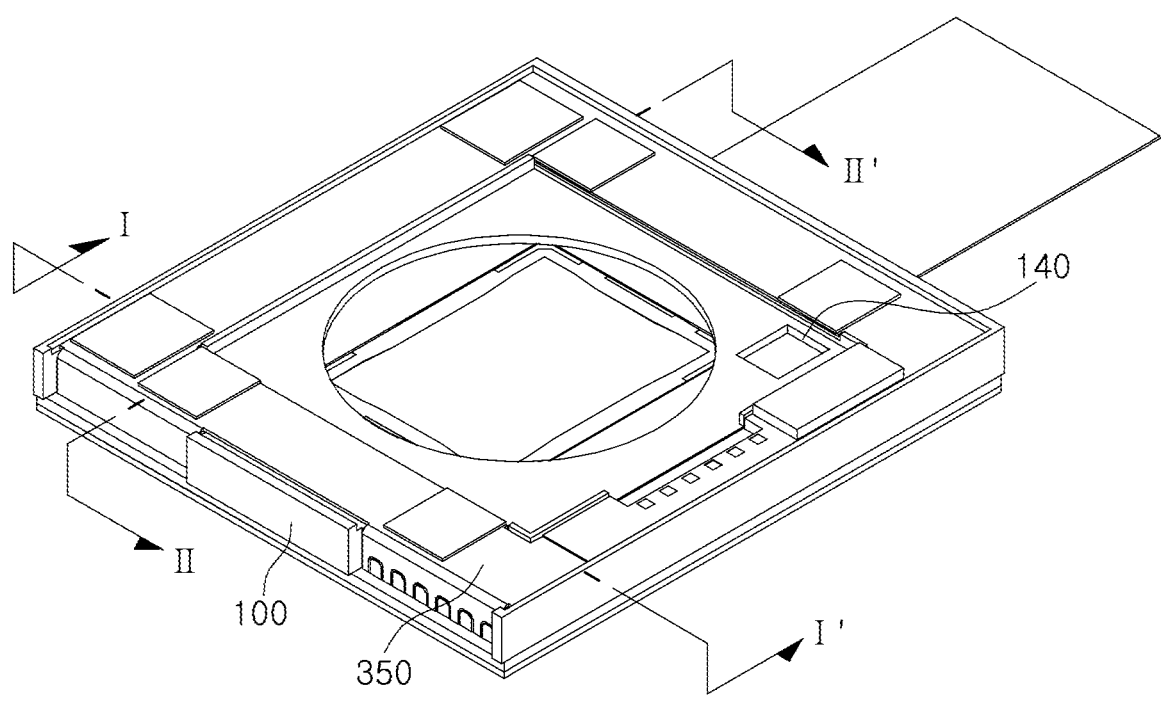
FIG. 5 is a perspective view of the first actuator.
Figure 6A:
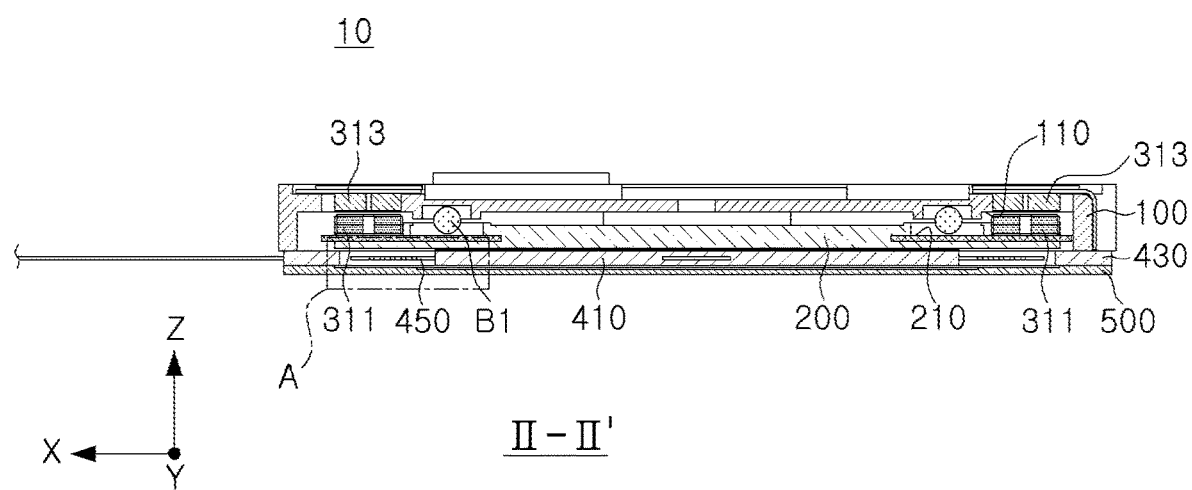
FIG. 6A is a cross-sectional view taken along line II-II' of FIG. 5.
Figure 6B:
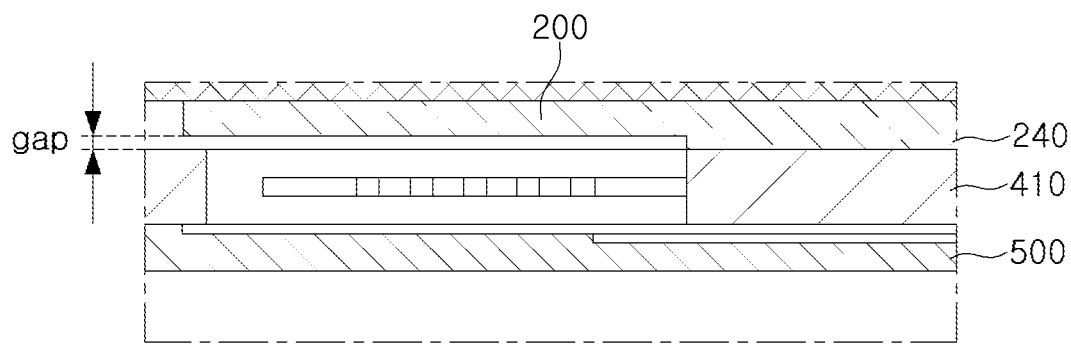
FIG. 6B is an enlarged view of portion A of FIG. 6A.
Figure 7A:
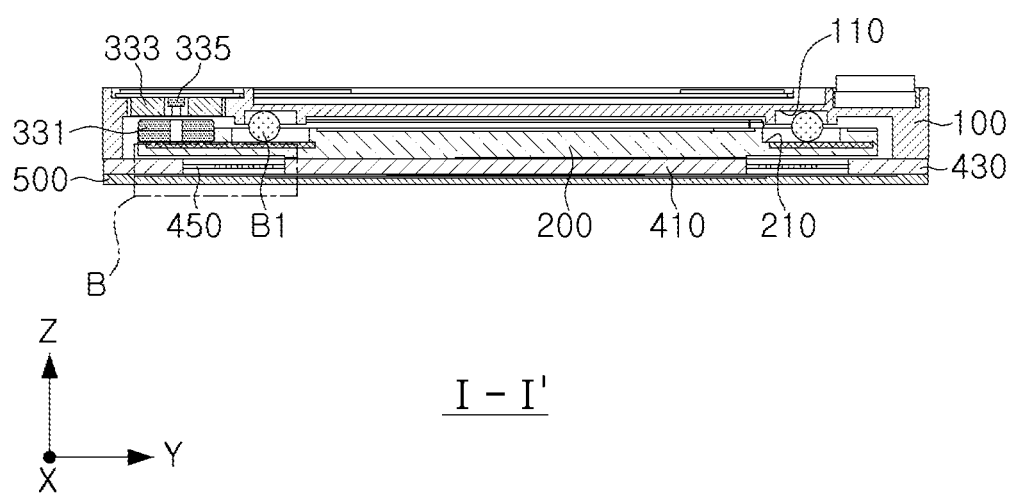
FIG. 7A is a cross-sectional view taken along line I-I' of FIG. 5.
Figure 7B:
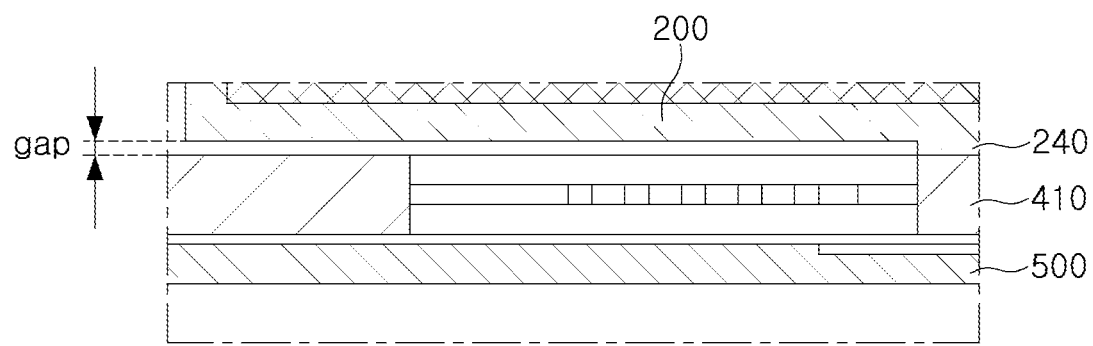
FIG. 7B is an enlarged view of portion B of FIG. 7A.

FIG. 5 is a perspective view of the first actuator, FIG. 6A is a cross-sectional view taken along line II-II' of FIG. 5, FIG. 6B is an enlarged view of portion A of FIG. 6A, FIG. 7A is a cross-sectional view taken along line I-I' of FIG. 5, and FIG. 7B is an enlarged view of portion B of FIG. 7A.

Figure 8:
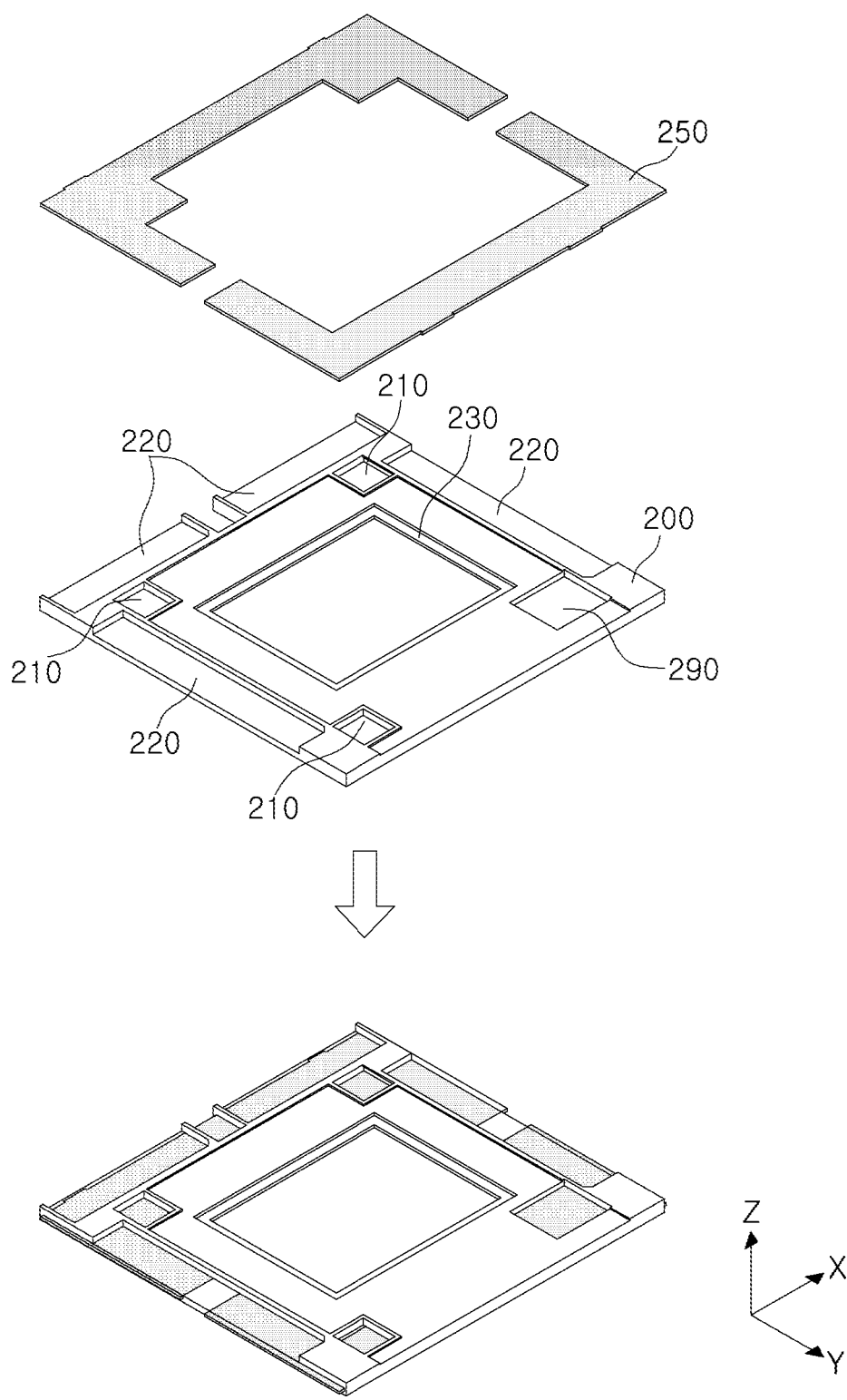
FIG. 8 illustrates an example of a moving frame of the first actuator.
Figure 9:
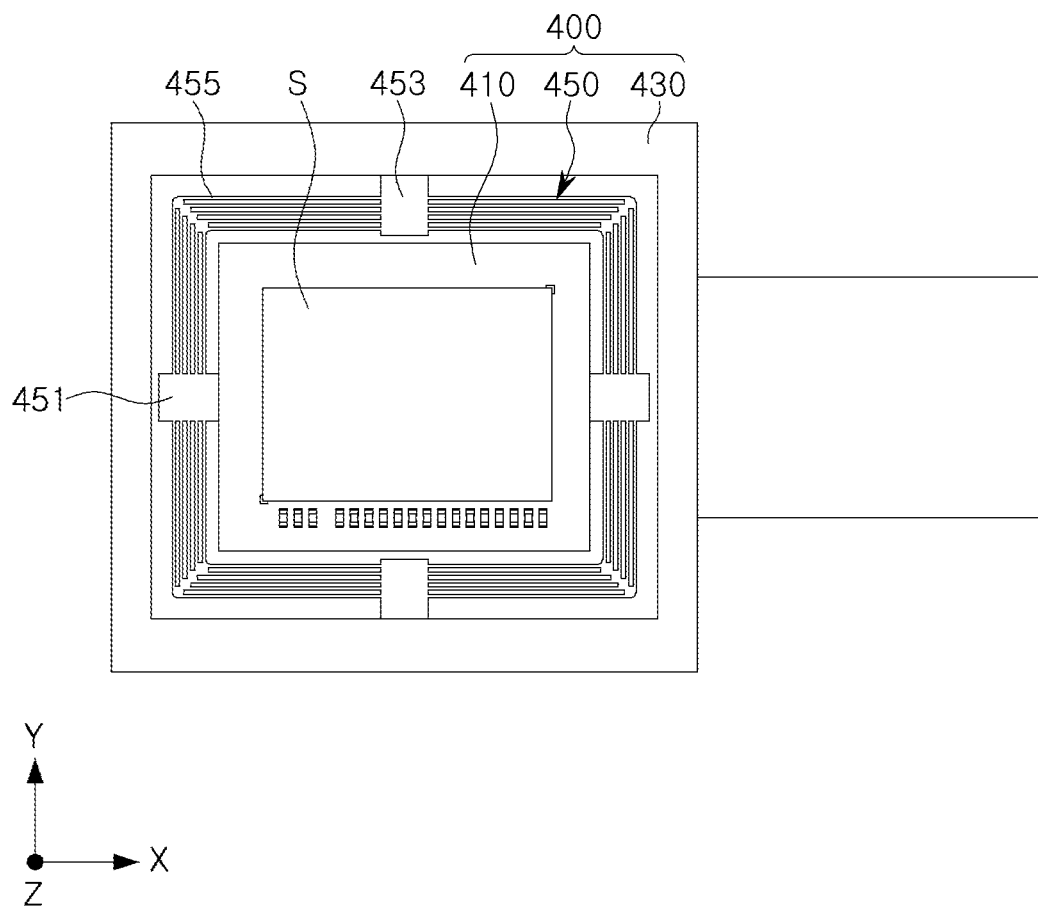
FIG. 9 is a plan view of a sensor substrate of the first actuator.

FIG. 8 illustrates an example of a moving frame of the first actuator, and FIG. 9 is a plan view of a sensor substrate of the first actuator.

The movement of the image sensor S will be further described with reference to FIGS. 3 through 9.

First, referring to FIG. 3, the first actuator 10 may include a fixed frame 100, a moving frame 200, a first driver 300, and a sensor substrate 400, and may further include a base 500.

The fixed frame 100 may be coupled to a second actuator 20 to be described later. For example, the fixed frame 100 may be coupled to a housing 600 of the second actuator 20. A seating groove 130 in which the housing 600 of the second actuator 20 is seated may be provided in an upper surface of the fixed frame 100.

The fixed frame 100 may be a fixed member that does not move at the time of the focusing and the optical image stabilization.

The fixed frame 100 may be a rectangular box shape in which a top and a bottom are opened.

The moving frame 200 may be accommodated in the fixed frame 100. The fixed frame 100 may have sidewalls extending downward in the optical axis (e.g., Z-axis) direction, and accordingly, the fixed frame 100 may have an accommodation space for accommodating the moving frame 200 therein.

The moving frame 200 may be relatively moved in the directions perpendicular to the optical axis (e.g., the Z-axis) with respect to the fixed frame 100 or may be rotated with the optical axis (e.g., the Z-axis) as a rotation axis. The moving frame 200 may be a moving member moving at the time of the optical image stabilization.

For example, the moving frame 200 may be configured to be movable in a first axis (e.g., X-axis) direction and a second axis (e.g., Y-axis) direction, and may be rotated with the optical axis (e.g., the Z-axis) as the rotation axis.

The first axis (e.g., X-axis) direction may refer to a direction perpendicular to the optical axis (e.g., the Z-axis), and the second axis (e.g., Y-axis) direction may refer to a direction perpendicular to both the optical axis (e.g., Z-axis) direction and the first axis (e.g., X-axis) direction.

The moving frame 200 may have a rectangular plate shape with a center penetrated in the direction of the optical axis (e.g., Z-axis).

An infrared cut-off filter IRCF may be mounted on an upper surface of the moving frame 200. A filter mounting groove 230 (see FIG. 8) in which the infrared cut-off filter IRCF is mounted may be provided on the upper surface of the moving frame 200. The sensor substrate 400 may be mounted on a lower surface of the moving frame 200.

A first ball member B1 may be disposed between the fixed frame 100 and the moving frame 200.

The first ball member B1 may be disposed to contact each of the fixed frame 100 and the moving frame 200.

When the moving frame 200 is moved or rotated relatively with respect to the fixed frame 100, the first ball member B1 may be moved in a rolling motion between the fixed frame 100 and the moving frame 200 to support the movement of the moving frame 200.

Meanwhile, since the moving frame 200 is accommodated in the fixed frame 100, the thickness of the moving frame 200 needs to be decreased to decrease the height of the first actuator 10 in the optical axis (e.g., Z-axis) direction.

However, when the thickness of the moving frame 200 is decreased, the rigidity of the moving frame 200 may be decreased, such that there is a risk that the reliability of the moving frame 200 against an external impact or the like will be decreased.

Accordingly, the moving frame 200 may be provided with a reinforcing plate 250 to reinforce the rigidity of the moving frame 200.

As an example, referring to FIG. 8, the reinforcing plate 250 may be coupled integrally with the moving frame 200 by insert injection. In this case, the reinforcing plate 250 may be manufactured to be integrated with the moving frame 200 by injecting a resin material into a mold in a state where the reinforcing plate 250 is fixed in the mold.

The reinforcing plate 250 may be disposed inside the moving frame 200. In addition, the reinforcing plate 250 may be disposed so that a portion thereof is exposed externally of the moving frame 200. By exposing a portion of the reinforcing plate 250 externally of the moving frame 200 while forming the reinforcing plate 250 integrally with the moving frame 200 inside the moving frame 200 as described above, a coupling force between the reinforcing plate 250 and the moving frame 200 may be improved, and separation of the reinforcing plate 250 from the moving frame 200 may be prevented.

Meanwhile, the reinforcing plate 250 may be formed of a stainless material.

The image sensor S may be mounted on the sensor substrate 400. A portion of the sensor substrate 400 may be coupled to the moving frame 200, and the other portion of the sensor substrate 400 may be coupled to the fixed frame 100.

The image sensor S may be mounted on a portion of the sensor substrate 400 coupled to the moving frame 200.

Since a portion of the sensor substrate 400 is coupled to the moving frame 200, as the moving frame 200 is moved or rotated, a portion of the sensor substrate 400 may also be moved or rotated together with the moving frame 200.

Accordingly, the image sensor S may be moved or rotated on a plane perpendicular to the optical axis (e.g., the Z-axis) to perform optical image stabilization at the time of capturing an image.

The first driver 300 may generate driving forces in the directions perpendicular to the optical axis (e.g., the Z-axis) to move the moving frame 200 in the directions perpendicular to the optical axis (e.g., the Z-axis) or rotate the moving frame 200 with the optical axis (e.g., Z-axis) as the rotation axis.

The first driver 300 may include a first sub-driver 310 and a second sub-driver 330. The first sub-driver 310 may generate driving force in the first axis (e.g., X-axis) direction, and the second sub-driver 330 may generate driving force in the second axis (e.g., Y-axis) direction.

The first sub-driver 310 may include a first magnet 311 and a first coil 313. The first magnet 311 and the first coil 313 may be disposed to face each other in the optical axis (e.g., Z-axis) direction.

The first magnet 311 may be disposed on the moving frame 200. The first magnet 311 may include a plurality of magnets. For example, the first magnet 311 may include two magnets, and the two magnets may be disposed to be symmetrical to each other in relation to the optical axis (e.g., the Z-axis) and to be spaced apart from each other. For example, the first magnet 311 may include two magnets disposed to be spaced apart from each other in a direction (the first axis (e.g., X-axis) direction) in which driving force is generated by the first magnet 311.

A mounting groove 220 (see FIG. 8) in which the first magnet 311 is disposed may be provided in the upper surface of the moving frame 200. By inserting and disposing the first magnet 311 into and in the mounting groove 220, increases in the entire heights of the first actuator 10 and the camera module 1 due to the thickness of the first magnet 311 may be prevented.

The first magnet 311 may be magnetized so that one surface (e.g., a surface thereof facing the first coil 313) has both an N pole and an S pole. As an example, an N pole, a neutral region, and an S pole may be sequentially provided along the first axis (e.g., X-axis) direction on one surface of the first magnet 311 facing the first coil 313. The first magnet 311 may have a shape with a length in the second axis (e.g., Y-axis) direction (see FIG. 4).

The first magnet 311 may be magnetized so that the other surface (e.g., an opposite surface to one surface) has both an S pole and an N pole. As an example, an S pole, a neutral region, and an N pole may be sequentially provided along the first axis (e.g., X-axis) direction on the other surface of the first magnet 311.

The first coil 313 may be disposed to face the first magnet 311. For example, the first coil 313 may be disposed to face the first magnet 311 in the optical axis (e.g., Z-axis) direction.

The first coil 313 may have a doughnut shape with a hollow part, and may have a shape with a length in the second axis (e.g., Y-axis) direction. The first coil 313 may include coils of which the number corresponds to the number of magnets included in the first magnet 311.

The first coil 313 may be disposed on a first substrate 350. The first substrate 350 may be mounted on the fixing frame 100 so that the first magnet 311 and the first coil 313 face each other in the optical axis (e.g., Z-axis) direction.

The fixing frame 100 may be provided with a through-hole 120. For example, the through-hole 120 may be configured to penetrate through the upper surface of the fixed frame 100 in the optical axis (e.g., Z-axis) direction. The first coil 313 may be disposed in the through-hole 120 of the fixed frame 100. By disposing the first coil 313 in the through-hole 120 of the fixed frame 100, increases in the entire heights of the first actuator 10 and the camera module 1 due to a thickness of the first coil 313 may be prevented.

An upper portion of the through-hole 120 of the fixing frame 100 may be covered by the first substrate 350.

The first magnet 311 may be a moving member mounted on the moving frame 200 and moving together with the moving frame 200, and the first coil 313 may be a fixed member fixed to the first substrate 350 and the fixed frame 100.

When power is applied to the first coil 313, the moving frame 200 may be moved in the first axis (e.g., X-axis) direction by an electromagnetic force between the first magnet 311 and the first coil 313.

The first magnet 311 and the first coil 313 may generate driving force in a direction (e.g., the first axis (e.g., X-axis) direction) perpendicular to a direction (the optical axis direction) in which they face each other.

The second sub-driver 330 may include a second magnet 331 and a second coil 333. The second magnet 331 and the second coil 333 may be disposed to face each other in the optical axis (e.g., Z-axis) direction.

The second magnet 331 may be disposed on the moving frame 200. The second magnet 331 may include a plurality of magnets. For example, the second magnet 331 may include two magnets, and the two magnets may be disposed to be spaced apart from each other along the first axis (the X-axis) direction. For example, the second magnet 331 may include two magnets disposed to be spaced apart from each other in a direction perpendicular to a direction (the second axis (e.g., Y-axis) direction) in which driving force is generated by the second magnet 331.

For reference, the first magnet 311 and the second magnet 331 may be disposed as opposed to each other in a form illustrated in FIG. 4. For example, the first magnet 311 may include two magnets disposed to be spaced apart from each other in a direction perpendicular to the direction (the first axis (e.g., X-axis) direction) in which the driving force is generated by the first magnet 311, and the second magnet 331 may include two magnets disposed to be spaced apart from each other in the direction (the second axis (e.g., Y-axis) direction) in which the driving force is generated by the second magnet 331.

Alternatively, both the first magnet 311 and the second magnet 331 may include two magnets disposed to be spaced apart from each other in a direction perpendicular to a direction in which each magnet generates driving force.

A mounting groove 220 (see FIG. 8) in which the second magnet 331 is disposed may be provided in the upper surface of the moving frame 200. By inserting and disposing the second magnet 331 into and in the mounting groove 220, increases in the entire heights of the first actuator 10 and the camera module 1 due to the thickness of the second magnet 331 may be prevented.

The second magnet 331 may be magnetized so that one surface thereof (e.g., a surface thereof facing the second coil 333) has both an S pole and an N pole. For example, an S pole, a neutral region, and an N pole may be sequentially provided along the second axis (e.g., Y-axis) direction on one surface of the second magnet 331 facing the second coil 333 (see FIG. 4). The second magnet 331 may have a shape with a length in the first axis (e.g., X-axis) direction.

The second magnet 331 may be magnetized so that the other surface (e.g., an opposite surface to one surface) thereof has both an N pole and an S pole. As an example, an N pole, a neutral region, and an S pole may be sequentially provided along the second axis (e.g., Y-axis) direction on the other surface of the second magnet 331.

Magnetization directions of the two magnets of the second magnet 331 may be opposite to each other.

The second coil 333 may be disposed to face the second magnet 331. For example, the second coil 333 may be disposed to face the second magnet 331 in the optical axis (e.g., Z-axis) direction.

The second coil 333 may have a doughnut shape with a hollow part, and may have a shape with a length in the first axis (e.g., X-axis) direction. The second coil 333 may include coils of which the number corresponds to the number of magnets included in the second magnet 331.

The second coil 333 may be disposed on the first substrate 350. The first substrate 350 may be mounted on the fixing frame 100 so that the second magnet 331 and the second coil 333 face each other in the optical axis (e.g., Z-axis) direction.

The fixing frame 100 may be provided with a through-hole 120. For example, the through-hole 120 may be configured to penetrate through the upper surface of the fixed frame 100 in the optical axis direction. The second coil 333 may be disposed in the through-hole 120 of the fixed frame 100. By disposing the second coil 333 in the through-hole 120 of the fixed frame 100, increases in the entire heights of the first actuator 10 and the camera module 1 due to the thickness of the second coil 333 may be prevented.

The second magnet 331 may be a moving member mounted on the moving frame 200 and moving together with the moving frame 200, and the second coil 333 may be a fixed member fixed to the first substrate 350 and the fixed frame 100.

When power is applied to the second coil 333, the moving frame 200 may be moved in the second axis (e.g., Y-axis) direction by an electromagnetic force between the second magnet 331 and the second coil 333.

The second magnet 331 and the second coil 333 may generate driving force in a direction (e.g., the second axis (e.g., Y-axis) direction) perpendicular to the direction (the optical axis direction) in which they face each other.

Meanwhile, the moving frame 200 may be rotated in relation to the optical axis (e.g., the Z-axis) by the first sub-driver 310 and the second sub-driver 330.

The first magnet 311 and the second magnet 331 may be disposed perpendicular to each other on the plane perpendicular to the optical axis (e.g., the Z-axis), and the first coil 313 and the second coil 333 may also be disposed perpendicular to each other on the plane perpendicular to the optical axis (e.g., the Z-axis).

The first ball member B1 may be disposed between the fixed frame 100 and the moving frame 200.

The first ball member B1 may be disposed to contact each of the fixed frame 100 and the moving frame 200.

The first ball member B1 may serve to guide the movement of the moving frame 200 in an optical image stabilization process. In addition, the first ball member B1 may also serve to maintain a gap between the fixed frame 100 and the moving frame 200.

The first ball member B1 may be moved in a rolling motion in the first axis (e.g., X-axis) direction when the driving force in the first axis (e.g., X-axis) direction is generated. Accordingly, the first ball member B1 may guide the movement of the moving frame 200 in the first axis (e.g., X-axis) direction.

In addition, the first ball member B1 may be moved in a rolling motion in the second axis (e.g., Y-axis) direction when the driving force in the second axis (e.g., Y-axis) direction is generated. Accordingly, the first ball member B1 may guide the movement of the moving frame 200 in the second axis (e.g., Y-axis) direction.

The first ball member B1 may include a plurality of balls disposed between the fixed frame 100 and the moving frame 200.

Referring to FIG. 3, a guide groove in which the first ball member B1 is disposed may be provided in at least one of the surfaces of the fixed frame 100 and the moving frame 200 facing each other in the optical axis (e.g., Z-axis) direction. A plurality of guide grooves may be provided to correspond to the plurality of balls of the first ball member B1.

For example, a first guide groove 110 may be provided in a lower surface of the fixed frame 100, and a second guide groove 210 may be provided in the upper surface of the moving frame 200.

The first ball member B1 may be disposed in the first guide groove 110 and the second guide groove 210 to be fitted between the fixed frame 100 and the moving frame 200.

Each of the first guide groove 110 and the second guide groove 210 may have a rectangular or circular shape in plan view. The sizes of the first guide groove 110 and the second guide groove 210 may be greater than the diameter of the first ball member B1. For example, cross sections of the first guide groove 110 and the second guide groove 210 on the plane perpendicular to the optical axis (e.g., the Z-axis) may have sizes greater than the diameter of the first ball member B1.

Specific shapes of the first guide groove 110 and the second guide groove 210 are not limited as long as the sizes of the first guide groove 110 and the second guide groove 210 are greater than the diameter of the first ball member B1.

Accordingly, the first ball member B1 may be moved in the rolling motion in the directions perpendicular to the optical axis (e.g., the Z-axis) in a state in which it is accommodated in the first guide groove 110 and the second guide groove 210.

Meanwhile, a portion of the reinforcing plate 250 may be exposed externally through the upper surface of the moving frame 200. The reinforcing plate 250 exposed externally may form a bottom surface of the first guide groove 110 (see FIGS. 6A, 7A, and 8). Accordingly, the first ball member B1 may be in contact and roll with respect to the reinforcing plate 250.

As illustrated in FIG. 6A, when the driving force is generated in the first axis (e.g., X-axis) direction, the moving frame 200 may be moved in the first axis (e.g., X-axis) direction.

In addition, as illustrated in FIG. 7A, when the driving force is generated in the second axis (e.g., Y-axis) direction, the moving frame 200 may be moved in the second axis (e.g., Y-axis) direction.

In addition, the moving frame 200 may be rotated by generating a deviation between a magnitude of the driving force in the first axis (e.g., X-axis) direction and a magnitude of the driving force in the second axis (e.g., Y-axis) direction.

Since a portion of the sensor substrate 400 is coupled to the moving frame 200 and the image sensor S is disposed on the sensor substrate 400, as the moving frame 200 moves, the image sensor S may also be moved or rotated.

Referring to FIGS. 6B and 7B, a projection part 240 protruding toward the sensor substrate 400 may be disposed on the moving frame 200. For example, the projection part 240 may be disposed on the lower surface of the moving frame 200, and may be coupled to a moving part 410 of the sensor substrate 400. Accordingly, a gap may be formed between the body of the moving frame 200 and the sensor substrate 400 in the optical axis (e.g., Z-axis) direction, which may prevent interference between the moving frame 200 and the sensor substrate 400 when the moving frame 200 is moved on an X-Y plane.

While FIGS. 6B and 7B illustrate the projection part 240 being disposed on the lower surface of the moving frame 200, the illustration is only an example and the projection part 240 may also be disposed on an upper surface of the sensor substrate 400.

The first actuator 10 may detect a position of the moving frame 200 in the directions perpendicular to the optical axis (e.g., the Z-axis).

To this end, a first position sensor 315 and a second position sensor 335 may be provided (see FIG. 4). The first position sensor 315 may be disposed on the first substrate 350 to face the first magnet 311, and the second position sensor 335 may be disposed on the first substrate 350 to face the second magnet 331. The first position sensor 315 and the second position sensor 335 may be Hall sensors.

Here, referring to an embodiment illustrated in FIG. 4, the second position sensor 335 may include two Hall sensors. For example, the second magnet 331 may include two magnets disposed to be spaced apart from each other in the direction (the first axis (e.g., X-axis) direction) perpendicular to the direction (the second axis (e.g., Y-axis) direction) in which the driving force is generated by the second magnet 331, and the second position sensor 335 may include two Hall sensors disposed to face the two magnets.

It may be sensed whether or not the moving frame 200 is rotated through the two hall sensors facing the second magnet 331.

Meanwhile, a torque may be intentionally generated in a manner of generating a deviation between the driving force of the first sub-driver 310 and the driving force of the second sub-driver 330, using a resultant force of the first sub-driver 310 and the second sub-driver 330, or using the two magnets included in the second sub-driver 330.

Since the first guide groove 110 and the second guide groove 210 have a rectangular or circular shape, in plan view, greater than the diameter of the first ball member B1, the first ball member B1 disposed between the first guide groove 110 and the second guide groove 210 may be moved in the rolling motion in the directions perpendicular to the optical axis (e.g., the Z-axis) without limitation.

Accordingly, the moving frame 200 may be rotated about the Z-axis in a state where first ball member B1 supports it.

In addition, when the rotation of the moving frame 200 is not desired and linear movement of the moving frame 200 is desired, the driving force of the first sub-driver 310 and/or the driving force of the second sub-driver 330 may be controlled to offset an unintentionally generated torque.

Referring to FIG. 3, the first actuator 10 may include a first yoke 317 and a second yoke 337. The first yoke 317 and the second yoke 337 may provide attractive force so that the fixed frame 100 and the moving frame 200 may be maintained in a state in which they are in contact with the first ball member B1.

The first yoke 317 and the second yoke 337 are disposed on the fixed frame 100. For example, the first yoke 317 and the second yoke 337 may be disposed on the first substrate 350, and the first substrate 350 may be coupled to the fixed frame 100.

The first coil 313 and the second coil 333 may be disposed on one surface of the first substrate 350, and the first yoke 317 and the second yoke 337 may be disposed on the other surface of the first substrate 350.

The first yoke 317 may be disposed to face the first magnet 311 in the optical axis (e.g., the Z-axis) direction. The first yoke 317 may include a plurality of yokes corresponding to twice the number of magnets included in the first magnet 311. For example, each magnet of the first magnet 311 may face two yokes in the optical axis (e.g., Z-axis) direction. The two yokes facing one magnet may be disposed to be spaced apart from each other in the second axis (e.g., Y-axis) direction. However, the first yoke 317 may also include a plurality of yokes corresponding to the number of magnets included in the first magnet 311.

The second yoke 337 may be disposed to face the second magnet 311 in the optical axis (e.g., the Z-axis) direction. The second yoke 337 may include a plurality of yokes corresponding to the number of magnets included in the second magnet 331. For example, when the second magnet 331 includes two magnets, the second yoke 337 may include two yokes. The two yokes may be disposed to be spaced apart from each other in the first axis (e.g., X-axis) direction. Alternatively, each magnet of the second magnet 331 may face the two yokes in the optical axis direction. In this case, the two yokes facing one magnet may be disposed to be spaced apart from each other in the first axis (e.g., X-axis) direction.

Attractive forces may act between the first yoke 317 and the first magnet 311 and between the second yoke 337 and the second magnet 331 in the optical axis (e.g., Z-axis) direction, respectively.

Accordingly, the moving frame 200 may be pressed toward the fixed frame 100, and the fixed frame 100 and the moving frame 200 may thus be maintained in a state in which they are in contact with the first ball member B1.

The first yoke 317 and the second yoke 337 may be formed of a material capable of generating attractive forces between the first and second yokes 317 and 337 and the first and second magnets 311 and 331. For example, the first yoke 317 and the second yoke 337 may be provided as magnetic bodies.

Referring to FIG. 9, the sensor substrate 400 may include a moving part 410, a fixed part 430, and a connection part 450. The sensor substrate 400 may be a rigid flexible printed circuit board (RF PCB).

The image sensor S may be mounted on the moving part 410. The moving part 410 may be coupled to the lower surface of the moving frame 200. For example, an area of the moving part 410 may be greater than that of the image sensor S, and the moving part 410 at an outer part of the image sensor S may be coupled to the lower surface of the moving frame 200.

The moving part 410 may be a moving member moving together with the moving frame 200 at the time of the optical image stabilization. The moving part 410 may be a rigid PCB.

The fixed part 430 may be coupled to the lower surface of the fixed frame 100. The fixed part 430 may be a fixed member that does not move at the time of optical image stabilization. The fixed part 430 may be a rigid PCB.

The connection part 450 may be disposed between the moving part 410 and the fixed part 430, and may connect the moving part 410 and the fixed part 430 to each other. The connection part 450 may be a flexible PCB. When the moving part 410 is moved, the connection part 450 disposed between the moving part 410 and the fixed part 430 may be bent.

The connection part 450 may extend along a circumference of the moving part 410. The connection part 450 may be provided with a plurality of slits penetrating through the connection part 450 in the optical axis direction. The plurality of slits may be disposed at intervals between the moving part 410 and the fixed part 430. Accordingly, the connection part 450 may include a plurality of bridges 455 spaced apart from each other by the plurality of slits. The plurality of bridges 455 may extend along the circumference of the moving part 410.

The connection part 450 may include a first support part 451 and a second support part 453. The connection part 450 may be connected to the moving part 410 through the first support part 451. In addition, the connection part 450 may be connected to the fixed part 430 through the second support part 453.

For example, the first support part 451 may be in contact with and connected to the moving part 410, and may be spaced apart from the fixed part 430. In addition, the second support part 453 may be in contact with and connected to the fixed part 430, and may be spaced apart from the moving part 410.

For example, the first support part 451 may extend in the first axis direction (e.g., the X-axis direction) to connect the plurality of bridges 455 of the connection part 450 and the moving part 410 to each other. In one embodiment, the first support part 451 may include two support parts disposed on sides opposite each other in the first axis direction (e.g., X-axis direction).

The second support part 453 may extend in the second axis direction (e.g., the Y-axis direction) to connect the plurality of bridges 455 of the connection part 450 and the fixed part 430 to each other. In one embodiment, the second support part 453 may include two support parts disposed on sides opposite to each other in the second axis direction (e.g., Y-axis direction).

Accordingly, the moving part 410 may be moved in the directions perpendicular to the optical axis (e.g., the Z-axis) or rotated in relation to the optical axis (e.g., the Z-axis) in a state in which it is supported by the connector 450.

Figure 11:
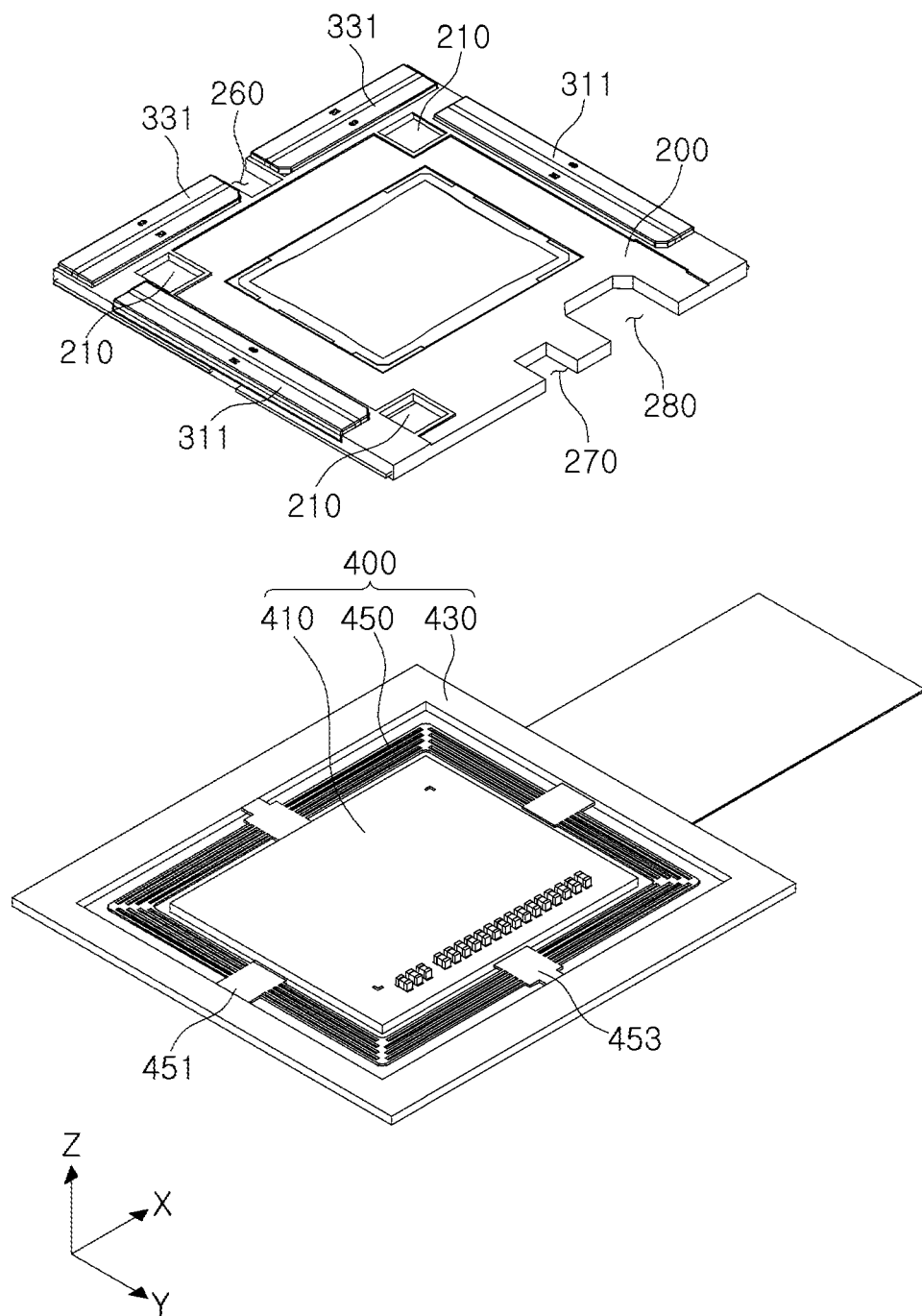
FIG. 11 is a perspective view of the moving frame and the sensor substrate of the first actuator.
Figure 12:
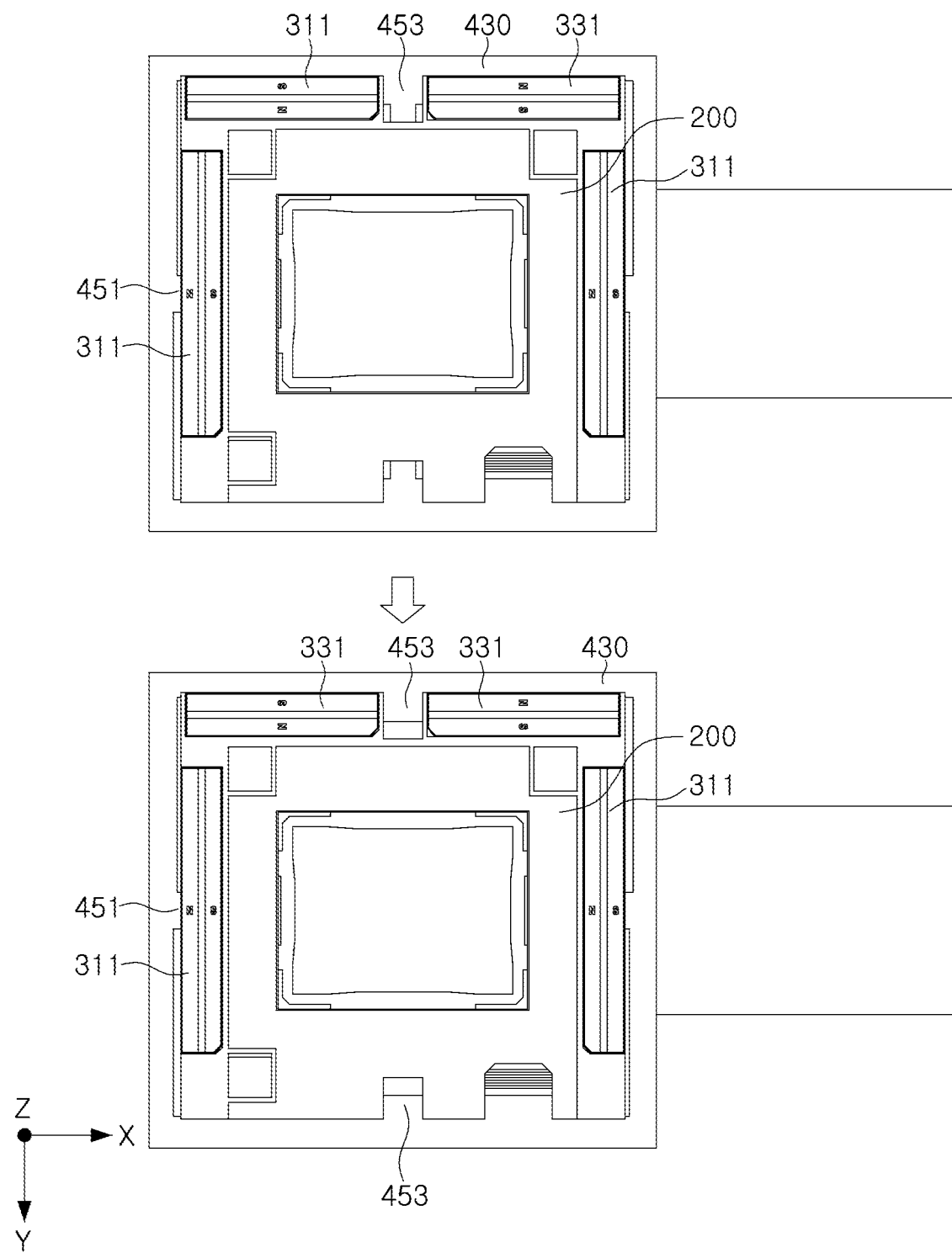
FIG. 12 is a plan view illustrating a form in which the moving frame and the sensor substrate of the first actuator are coupled to each other.

Components respectively connected to the first support part 451 and the second support part 453 may also be disposed as opposed to that described above. For example, as illustrated in FIGS. 11 and 12, the first support part 451 may be connected to the fixed part 430 and be spaced apart from the moving part 410, and the second support part 453 may be connected to the moving part 410 and be spaced apart from the fixed part 430.

In an embodiment, when the image sensor S is moved in the first axis direction (e.g., the X-axis direction), the plurality of bridges 455 connected to the first support part 451 may be bent. In addition, when the image sensor S is moved in the second axis direction (e.g., the Y-axis direction), the plurality of bridges 455 connected to the second support part 453 may be bent. Additionally, when the image sensor S is rotated in relation to the optical axis (e.g., the Z-axis), the plurality of bridges 455 connected to the first support part 451 and the plurality of bridges 455 connected to the second support part 453 may be bent together.

The base 500 may be coupled to a lower portion of the sensor substrate 400.

The base 500 may be coupled to the sensor substrate 400 to cover the lower portion of the sensor substrate 400. The base 500 may prevent foreign materials or the like from being introduced through a gap between the moving part 410 and the fixed part 430 of the sensor substrate 400.

Figure 10:
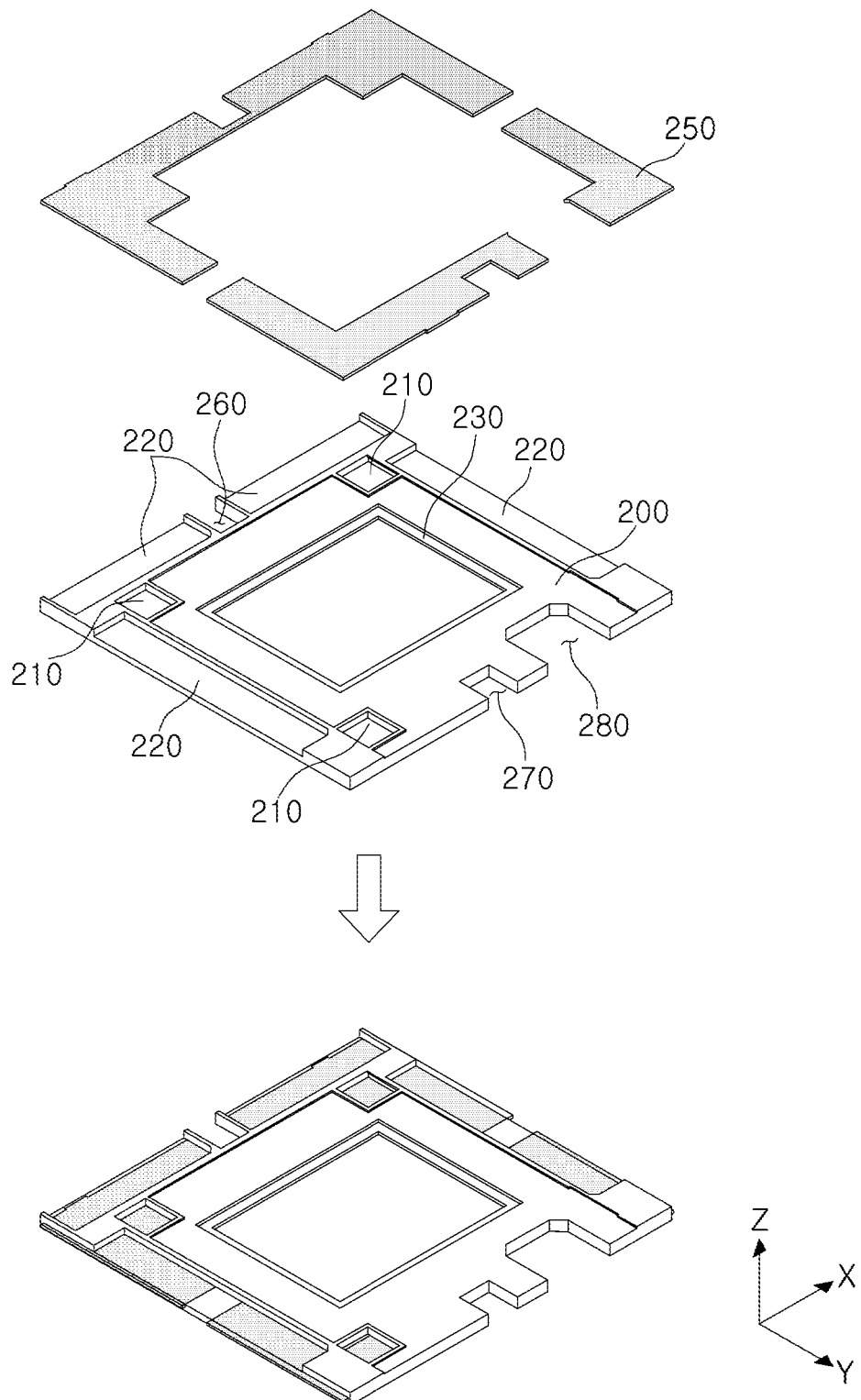
FIG. 10 illustrates a modified example of FIG. 8.

FIG. 10 illustrates a modified example of FIG. 8, FIG. 11 is a perspective view of the moving frame and the sensor substrate of the first actuator, and FIG. 12 is a plan view illustrating a form in which the moving frame and the sensor substrate of the first actuator are coupled to each other.

Referring to FIGS. 10 through 12, the moving frame 200 may be provided with a first escape hole 260 and a second escape hole 270.

For example, the first escape hole 260 and the second escape hole 270 may be configured to penetrate through the moving frame 200 in the optical axis (e.g., Z-axis) direction.

In a state in which the moving frame 200 is coupled to the sensor substrate 400, each of the first escape hole 260 and the second escape hole 270 may overlap space between the fixed part 430 and the connection part 450 of the sensor substrate 400 in the optical axis (e.g., Z-axis) direction.

When viewed from the optical axis (e.g., Z-axis) direction, the space between the fixed part 430 and the connection part 450 may be exposed through the first escape hole 260 and the second escape hole 270.

The connection part 450 of the sensor substrate 400 may include a first support part 451 and a second support part 453. The connection part 450 may be connected to the fixed part 430 through the first support part 451. In addition, the connection part 450 may be connected to the moving part 410 through the second support part 453.

That is, since the first support part 451 is spaced apart from the moving part 410 and the second support part 453 is spaced apart from the fixed part 430, the plurality of bridges 455 of the connection part 450 may support the moving part 410 in a state in which they are mobile.

In this case, when the sensor substrate 400 and the moving frame 200 are coupled to each other in a state in which the plurality of bridges 455 of the connection part 450 moves, there may be a problem due to difficulty in fixing the position of the moving part 410 supported by the connection part 450 in a coupling process. In this case, since an assembly failure may likely occur, the plurality of bridges 455 of the connection part 450 should not move when the sensor substrate 400 and the moving frame 200 are coupled to each other.

Accordingly, in an embodiment, the sensor substrate 400 and the moving frame 200 may be coupled to each other in a state in which any one of the first support part 451 and the second support part 453 is connected to all of the moving part 410, the fixed part 430 and the plurality of bridges 455 (see upper drawings of FIGS. 11 and 12).

In FIGS. 11 and 12, the first support part 451 may be connected to the fixed part 430, but may be spaced apart from the moving part 410, and the second support part 453 may be connected to all of the moving part 410, the fixed part 430, and the plurality of bridges 455. Accordingly, the plurality of bridges 455 may not move in this state.

After the moving part 410 of the sensor substrate 400 and the moving frame 200 are coupled to each other, the portions where the second supporting part 453 and the fixed part 430 are connected to each other may be exposed through the first escape hole 260 and the second escape hole 270 of the moving frame 200.

Accordingly, the portions where the second support part 453 and the fixed part 430 are connected to each other may be cut through the first escape hole 260 and the second escape hole 270, and accordingly, the moving part 410 of the sensor substrate 400 may have mobility after being coupled to the moving frame 200.

Figure 13:
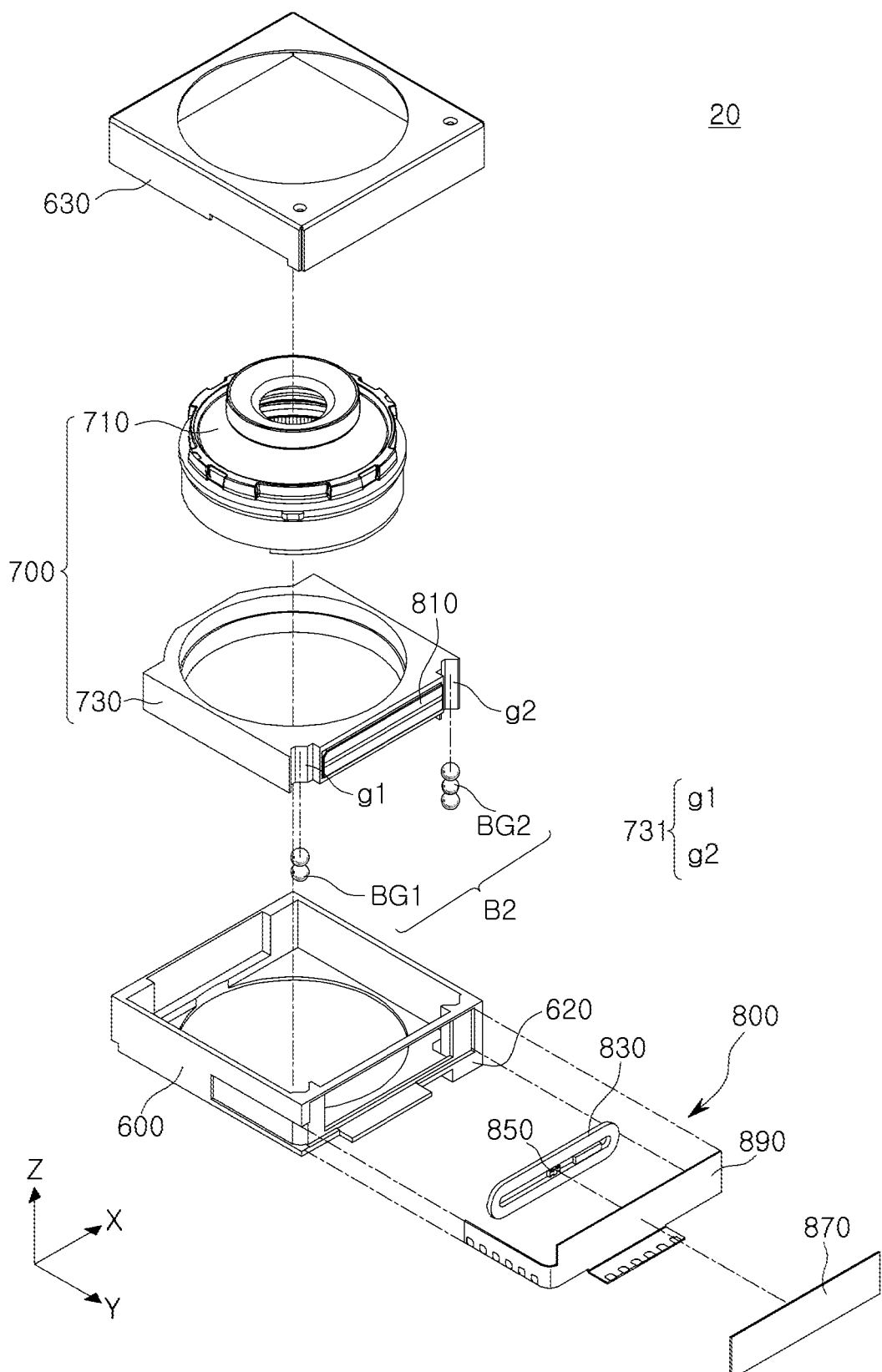
FIG. 13 is an exploded perspective view of a second actuator.
Figure 14:
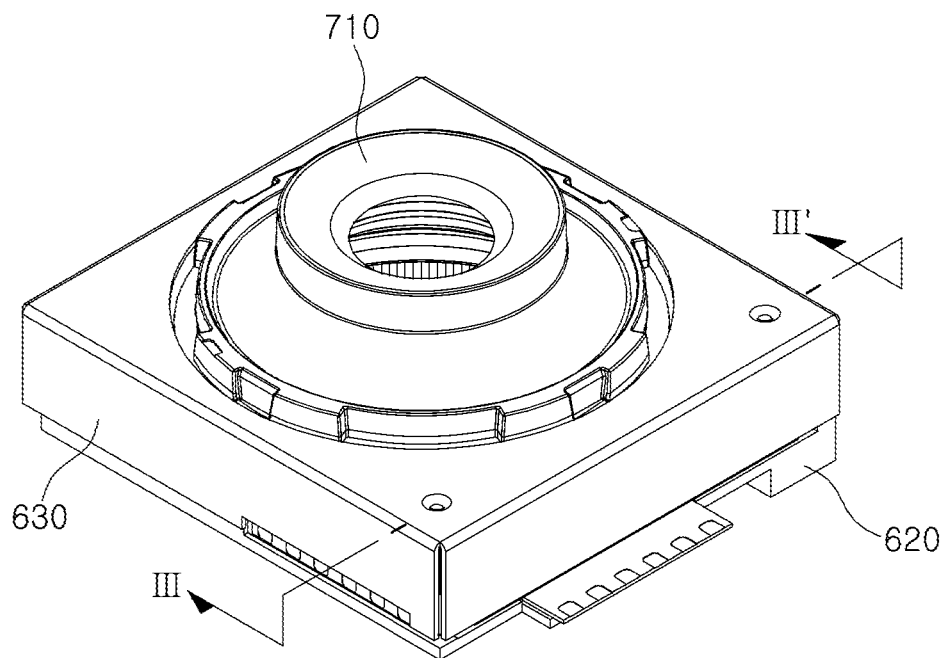
FIG. 14 is a perspective view of the first actuator.

FIG. 13 is an exploded perspective view of a second actuator, and FIG. 14 is a perspective view of the first actuator.

Figure 15:
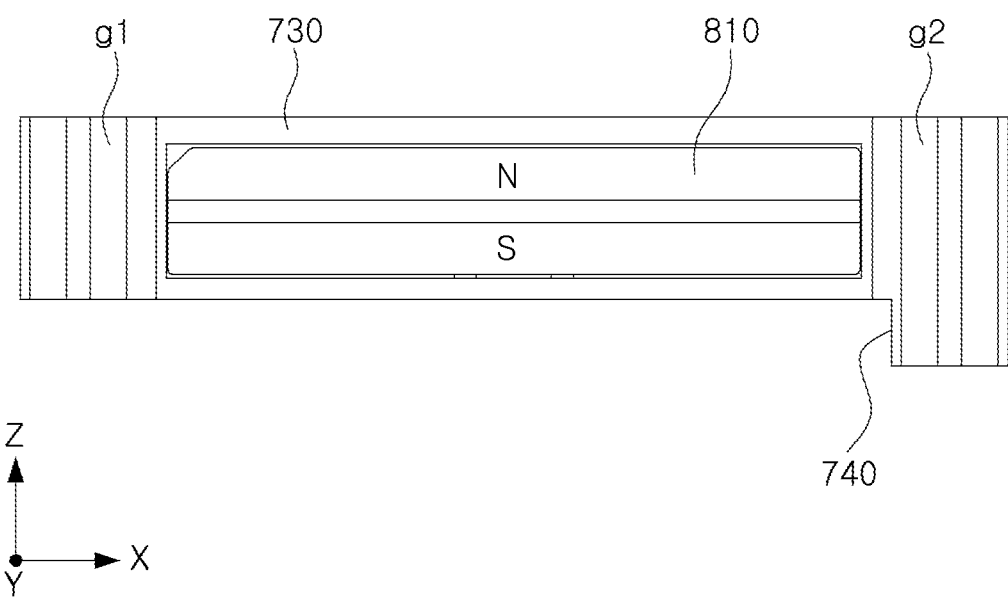
FIG. 15 is a side view of a carrier of the second actuator.
Figure 16:
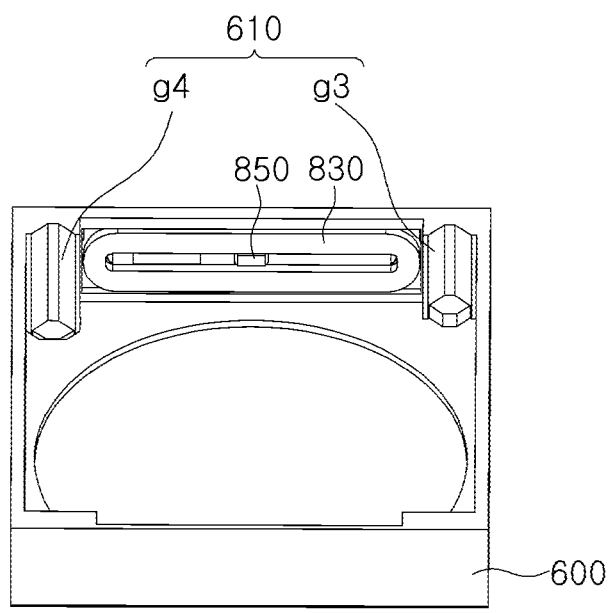
FIG. 16 is a perspective view of a housing of the second actuator.
Figure 17:
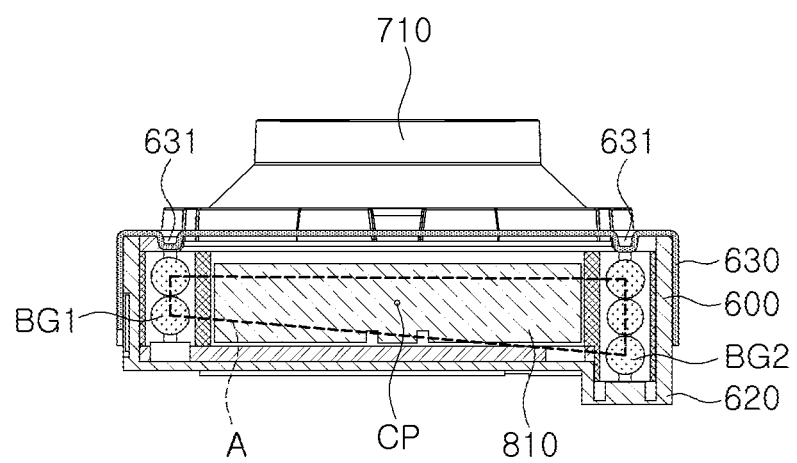
FIG. 17 is a cross-sectional view taken along line III-III' of FIG. 14.

In addition, FIG. 15 is a side view of a carrier of the second actuator, FIG. 16 is a perspective view of a housing of the second actuator, and FIG. 17 is a cross-sectional view taken along line III-III' of FIG. 11.

The movement of the carrier 730 in the optical axis (e.g., Z-axis) direction will be described with reference to FIGS. 13 through 17.

First, referring to FIG. 13, the second actuator 20 may include a carrier 730, a housing 600, and a second driver 800, and may further include a case 630.

The carrier 730 may be provided with a hollow part penetrating through the carrier 730 in the optical axis (e.g., Z-axis) direction, and the lens barrel 710 may be inserted into the hollow part and be fixedly disposed with respect to the carrier 730. Accordingly, the lens barrel 710 and the carrier 730 may be moved together in the direction of the optical axis (e.g., Z-axis).

The housing 600 may have an internal space, and may have a rectangular box shape of which a top and a bottom are opened. The carrier 730 may be disposed in the internal space of the housing 600.

The case 630 may be coupled to the housing 600 to protect the internal components of the second actuator 20.

The case 630 may be provided with a protrusion part 631 protruding toward a second ball member B2 to be described later. The protrusion part 631 may serve as a stopper and a buffer member, restricting the movement range of the second ball member B2.

The second driver 800 may generate driving force in the optical axis (e.g., Z-axis) direction to move the carrier 730 in the optical axis (e.g., Z-axis) direction.

The second driver 800 may include a third magnet 810 and a third coil 830. The third magnet 810 and the third coil 830 may be disposed to face each other in the direction perpendicular to the optical axis (e.g., the Z-axis).

The third magnet 810 may be disposed on the carrier 730. For example, the third magnet 810 may be disposed on one side surface of the carrier 730.

A back yoke may be disposed between the carrier 730 and the third magnet 810. The back yoke may improve driving force by preventing leakage of a magnetic flux of the third magnet 810.

The third magnet 810 may be magnetized so that one surface thereof (e.g., a surface thereof facing the third coil 830) has both of an N pole and an S pole. As an example, an N pole, a neutral region, and an S pole may be sequentially provided along the optical axis (e.g., Z-axis) direction on one surface of the third magnet 810 facing the third coil 830.

The third magnet 810 may be magnetized so that the other surface (e.g., an opposite surface to one surface) thereof has both of an S pole and an N pole. As an example, an S pole, a neutral region, and an N pole may be sequentially provided along the optical axis (e.g., Z-axis) direction on the other surface of the third magnet 810.

The third coil 830 may be disposed to face the third magnet 810. For example, the third coil 830 may be disposed to face the third magnet 810 in the direction perpendicular to the optical axis (e.g., the Z-axis).

The third coil 830 may be disposed on a second substrate 890, and the second substrate 890 may be mounted on the housing 600 so that the third magnet 810 and the third coil 830 face each other in the direction perpendicular to the optical axis (e.g., the Z-axis).

The third magnet 810 may be a movable member mounted on the carrier 730 and moving in the optical axis (e.g., Z-axis) direction together with the carrier 730, and the third coil 830 may be a fixed member fixed to the second substrate 890.

When power is applied to the third coil 830, the carrier 730 may be moved in the optical axis (e.g., Z-axis) direction by an electromagnetic force between the third magnet 810 and the third coil 830.

Since the lens barrel 710 is disposed in the carrier 730, the lens barrel 710 may also be moved in the optical axis (e.g., Z-axis) direction by the movement of the carrier 730.

A second ball member B2 may be disposed between the carrier 730 and the housing 600. The second ball member B2 may include a plurality of balls disposed along the optical axis (e.g., Z-axis) direction. The plurality of balls may be moved in a rolling motion in the optical axis (e.g., Z-axis) direction when the carrier 730 is moved in the direction of the optical axis (e.g., Z-axis).

A third yoke 870 may be disposed on the housing 600. The third yoke 870 may be disposed at a position facing the third magnet 810. For example, the third coil 830 may be disposed on one surface of the second substrate 890, and the third yoke 870 may be disposed on the other surface of the second substrate 890.

The third magnet 810 and the third yoke 870 may generate attractive force therebetween. For example, attractive force may act in the direction perpendicular to the optical axis (e.g., the Z-axis) between the third magnet 810 and the third yoke 870.

Due to the attractive force of the third magnet 810 and the third yoke 870, the second ball member B2 may be in contact with each of the carrier 730 and the housing 600.

Guide grooves may be disposed in surfaces of the carrier 730 and the housing 600 facing each other. For example, a third guide groove 731 may be provided in the carrier 730, and a fourth guide groove 610 may be provided in the housing 600.

The third guide groove 731 and the fourth guide groove 610 may extend in the optical axis (e.g., Z-axis) direction. The second ball member B2 may be disposed between the third guide groove 731 and the fourth guide groove 610.

The third guide groove 731 may include a first groove g1 and a second groove g2, and the fourth guide groove 610 may include a third groove g3 and a fourth groove g4. Each of the grooves may extend to have a length in the optical axis (e.g., Z-axis) direction.

The first groove g1 and the third groove g3 may be disposed to face each other in the direction perpendicular to the optical axis (e.g., Z-axis) direction, and some (e.g., a first ball group BG1 to be described later) of the plurality of balls of the second ball member B2 may be disposed in a space between the first groove g1 and the third groove g3.

The first ball group BG1 may be in three-point contact with the first groove g1 and the third groove g3. For example, when the first ball group BG1 includes a plurality of balls, each ball may be in one-point contact with the first groove g1 and two-point contact with the third groove g3 (and vice versa). The first ball group BG1, the first groove g1, and the third groove g3 may function as an auxiliary guide.

In addition, the second groove g2 and the fourth groove g4 may be disposed to face each other in the direction perpendicular to the optical axis (e.g., Z-axis) direction, and the others (e.g., a second ball group BG2 to be described later) of the plurality of balls of the second ball member B2 may be disposed in a space between the second groove g2 and the fourth groove g4.

The second ball group BG2 may be in four-point contact with the second groove g2 and the fourth groove g4. For example, when the second ball group BG2 includes a plurality of balls, each ball may be in two-point contact with the second groove g2 and two-point contact with the fourth groove g4. The second ball group BG2, the second groove g2, and the fourth groove g4 may function as a main guide.

The second ball member B2 may include a first ball group BG1 and a second ball group BG2, and each of the first ball group BG1 and the second ball group BG2 may include a plurality of balls disposed along the optical axis (e.g., Z-axis) direction.

The first ball group BG1 and the second ball group BG2 may be disposed to be spaced apart from each other in a direction (e.g., the X-axis direction) perpendicular to the optical axis (e.g., the Z-axis). The number of balls in the first ball group BG1 and the number of balls in the second ball group BG2 may differ (see FIG. 13).

For example, the first ball group BG1 may include two or more balls disposed along the optical axis (e.g., Z-axis) direction, and the second ball group BG2 may include three or more balls disposed along the optical axis (e.g., Z-axis) direction.

However, the idea of the present disclosure is not limited to the number of balls belonging to each ball group, and the number of balls belonging to each ball group may be changed on the assumption that the number of balls belonging to the first ball group BG1 and the number of balls belonging to the second ball group BG2 are different from each other. Hereinafter, for convenience of explanation, an embodiment in which the first ball group BG1 includes two balls and the second ball group BG2 includes three balls will be described.

Referring to FIG. 17, the two balls of the first ball group BG1 may have the same diameter. For example, the two balls of the first ball group BG1 may have a first diameter.

In the second ball group BG2, two balls disposed at the outermost side in the optical axis (e.g., Z-axis) direction may have the same diameter. A ball disposed between the two balls may have a smaller diameter than the balls disposed on the outer side. For example, in the second ball group BG1, the two balls disposed at the outer sides in the optical axis (e.g., Z-axis) direction may have a second diameter, and one ball disposed between the two balls may have a third diameter. Here, the second diameter may be greater than the third diameter.

In addition, the first diameter and the second diameter may be the same as each other. Here, the same diameter may be a concept including not only physically the same diameter, but also a manufacturing error.

A distance between the centers of the two balls of the first ball group BG1 and a distance between the centers of the two balls disposed at the outermost sides in the optical axis direction among the plurality of balls of the second ball group BG2 may be different from each other. For example, a distance between the centers of the two balls having the second diameter may be greater than a distance between the centers of the two balls having the first diameter.

In order for the carrier 730 to be moved in parallel to the optical axis (e.g., Z-axis) direction (that is, to prevent the occurrence of a tilt) when the carrier 730 is moved in the optical axis (e.g., Z-axis) direction, an action center point CP of the attractive force acting between the third magnet 810 and the third yoke 870 needs to be positioned within a support area A obtained by connecting contact points of the second ball member B2 and the carrier 730 (or the housing 600) to each other.

When the action center point CP of the attractive force deviates from the support area A, a position of the carrier 730 may be deviated in a movement process of the carrier 730, such that there may be a risk that the tilt will occur. Therefore, the support area A may be formed to be as wide as possible.

In one or more embodiments in the present disclosure, some of the plurality of balls of the second ball member B2 may be formed to have a size intentionally (e.g., a diameter) smaller than a size (e.g., a diameter) of the other balls. In such a case, balls having a greater size among the plurality of balls may be intentionally brought into contact with the carrier 730 (or the housing 600).

Referring to FIG. 17, the two balls of the first ball group BG1 may have the same diameter, and the first ball group BG1 may thus be in two-point contact with the carrier 730 (or the housing 600). In addition, the diameter of the two balls of the three balls of the second ball group BG2 may be greater than the diameter of the other ball, and the second ball group BG2 may thus be in two-point contact with the carrier 730 (or the housing 600).

Accordingly, the second ball member B2 including the first ball group BG1 and the second ball group BG2 may be in four-point contact with the carrier 730 (or the housing 600). In addition, the support region A obtained by connecting the contact points to each other may have a quadrangular shape (e.g., a trapezoidal shape).

Accordingly, the support area A may be formed relatively wide, and the action center point CP of the attractive force acting between the third magnet 810 and the third yoke 870 may be stably positioned in the support area A. Accordingly, driving stability during focusing may be ensured.

Meanwhile, at the time of the focusing, the plurality of balls of the first ball group BG1 and the plurality of balls of the second ball group BG2 may be moved in a rolling motion in the optical axis (e.g., Z-axis) direction. Accordingly, the size of the support area A may be changed according to the movement of the balls belonging to each ball group. In this case, there may be a risk that the action center point CP of the attractive force will unexpectedly deviate from the support area A while driving the camera module.

In one or more embodiments in the present disclosure, the first groove g1 and the second groove g2 may be configured to have different lengths in the optical axis (e.g., Z-axis) direction. For example, the length of the second groove g2 in the optical axis (e.g., Z-axis) direction may be greater than the length of the first groove g1 in the optical axis (e.g., Z-axis) direction.

Referring to FIG. 15, the second groove g2 may protrude from a lower surface of the carrier 730 in the optical axis (e.g., Z-axis) direction. For example, a first extension part 740 protruding downwardly in the optical axis (e.g., Z-axis) direction may be disposed on the lower surface of the carrier 730. The length of the second groove g2 may be greater than the length of the first groove g1 by the first extension part 740.

In addition, lengths of the third groove g3 and the fourth groove g4 in the optical axis (e.g., Z-axis) direction may differ. For example, the length of the fourth groove g4 in the optical axis (e.g., Z-axis) direction may be greater than the length of the third groove g3 in the optical axis (e.g., Z-axis) direction.

Referring to FIGS. 13 and 17, the fourth groove g4 may protrude from a lower surface of the housing 600 in the optical axis (e.g., Z-axis) direction. For example, a second extension part 620 protruding downwardly in the optical axis (e.g., Z-axis) direction may be disposed on the lower surface of the housing 600. The length of the fourth groove g4 may be greater than the length of the third groove g3 by the second extension part 620.

Accordingly, in one or more embodiments in the present disclosure, by configuring the number of balls belonging to the first ball group BG1 and the number of balls belonging to the second ball group BG2 to be different from each other and forming spaces in which the respective ball groups are accommodated to different lengths in the optical axis (e.g., Z-axis) direction, it is possible to prevent the size of the support area A from changing or prevent the action center point CP of the attractive force from deviating from the support area A even though the size of the support area A is changed.

In addition, the second groove g2 and the fourth groove g4 corresponding to the main guide of the main guide and the auxiliary guide may be configured to have the lengths greater than the lengths of the first grooves g1 and the third grooves g3, respectively, and the size of the support area A may thus be increased.

In addition, escape areas may be provided in the fixed frame 100 and the moving frame 200 of the first actuator 10 to secure spaces where the first extension part 740 and the second extension part 620 may protrude.

That is, a first accommodating part 140 may be provided in the fixed frame 100, second accommodating parts 280 and 290 may be provided with the moving frame 200, and the first accommodating part 140 and the second accommodating parts 280 and 290 may be disposed in areas overlapping each other in the optical axis (e.g., Z-axis) direction (see FIGS. 3, 8 and 10).

The first accommodating part 140 may have the shape of a hole penetrating through the fixed frame 100 in the optical axis (e.g., Z-axis) direction. The second accommodating parts 280 and 290 may have the shape of a groove or a shape of a hole penetrating through the moving frame 200 in the optical axis (e.g., Z-axis) direction.

In addition, when the first actuator 10 and the second actuator 20 are coupled to each other, the first extension part 740 and the second extension part 620 may be positioned in the first accommodating part 140 and the second accommodating part 280 and 290, respectively. Since the moving frame 200 is configured to be moved in the X-Y plane, the sizes of the first accommodating part 140 and the second accommodating parts 280 and 290 in the X-Y plane may be greater than the sizes of the first extension part 740 and the second extension part 620 relative to an amount of movement of the moving frame 200.

Accordingly, even when the first extension part 740 is formed to protrude from the lower surface of the carrier 730 and the second extension part 620 is formed to protrude from the lower surface of the housing 600 at the second actuator 20, protruding portions may be disposed in the first actuator 10, and resultantly, an entire height of the camera module 1 may not be increased.

Meanwhile, the second actuator 20 may sense the position of the carrier 730 in the optical axis (e.g., Z-axis) direction.

To this end, a third position sensor 850 may be provided (see FIG. 10). The third position sensor 850 may be disposed on the second substrate 890 to face the third magnet 810. The third position sensor 850 may be a Hall sensor.

Meanwhile, in an embodiment, the third magnet 810 may be disposed so that the action center point CP of the attractive force acting between the third magnet 810 and the third yoke 870 is positioned closer to the main guide than the auxiliary guide.

Figure 18:
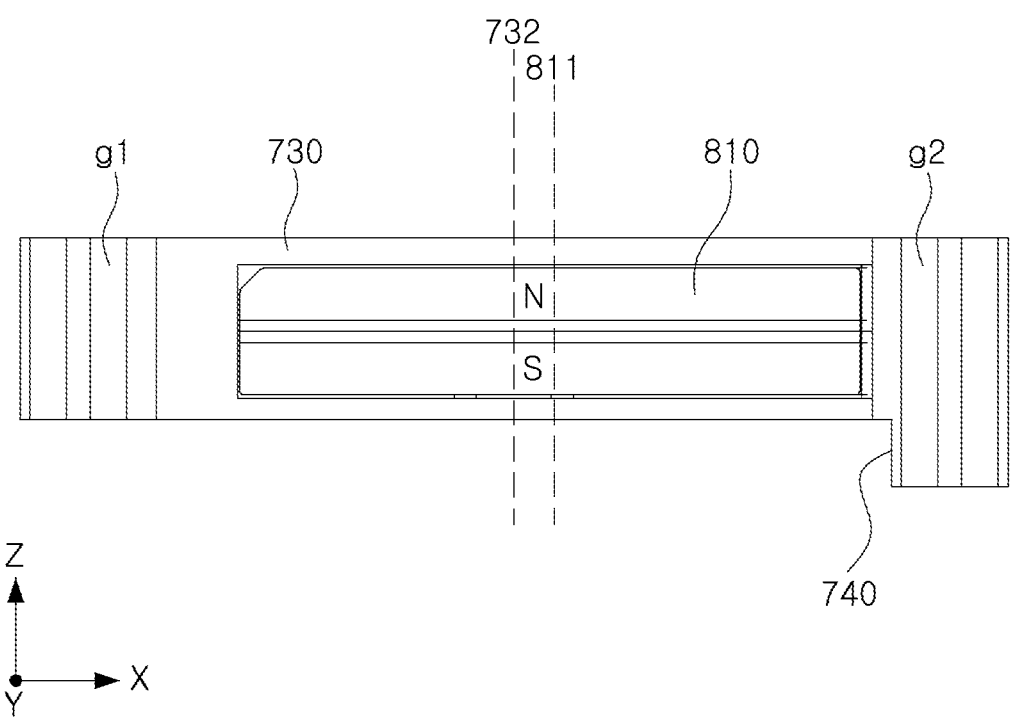
FIG. 18 illustrates a modified example of the carrier of the second actuator.

For example, referring to FIG. 18, on one side surface of the carrier 730, the third magnet 810 may be disposed to be eccentric toward any one side in a length direction of the third magnet 810 (e.g., the first axis direction (e.g., the X-axis direction)).

The center 732 of one side surface of the carrier 730 and the center 811 of the third magnet 810 may be disposed to be misaligned with each other. A direction in which the third magnet 810 is eccentric may be a direction toward the main guide.

That is, the third magnet 810 may be disposed closer to the main guide than the auxiliary guide.

Since the support area A is formed to have a greater length in the optical axis (e.g., Z-axis) direction as it is closer to the main guide, the action center point CP of the attractive force may be positioned within the support area A by disposing the third magnet 810 to close to the main guide.

Figure 19:
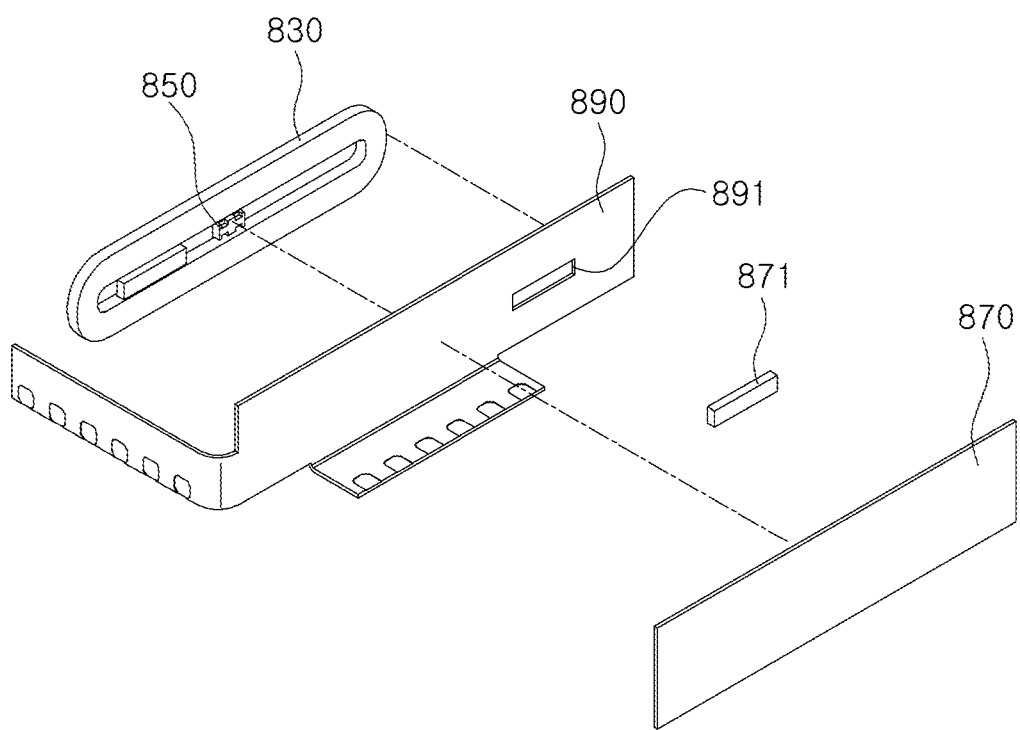
FIG. 19 describes an auxiliary yoke of the second actuator.

Referring to FIG. 19, in an embodiment, an auxiliary yoke 871 may be disposed at a position facing the third magnet 810. For example, the auxiliary yoke 871 may be disposed on the second substrate 890 to face the third magnet 810.

The second substrate 890 may be provided with a guide hole 891 penetrating through the second substrate 890, and the auxiliary yoke 871 may be disposed in the guide hole 891 to directly face the third magnet 810.

The auxiliary yoke 871 may be positioned closer to the main guide than the auxiliary guide. The auxiliary yoke 871 may be formed of a material capable of generating attractive force with respect to the third magnet 810.

Accordingly, a resultant force of the attractive force acting between the third magnet 810 and the third yoke 870 and the attractive force generated between the third magnet 810 and the auxiliary yoke 871 may be positioned closer to the main guide than the auxiliary guide.

The camera module 1, according to one or more embodiments in the present disclosure, may be configured so that the lens module 700 moves in the optical axis (e.g., Z-axis) direction at the time of the auto-focusing, and may be configured so that the image sensor S moves along the directions perpendicular to the optical axis (e.g., the Z-axis) at the time of the optical image stabilization.

Accordingly, even though the lens module 700 is moved in the optical axis (e.g., Z-axis) direction at the time of the focusing, the relative positions of the magnets and the coils of the first driver 300 do not change, and thus, the driving force for the optical image stabilization may be precisely controlled.

In addition, even though the image sensor S is moved in the directions perpendicular to the optical axis at the time of the optical image stabilization, the relative positions of the magnet and the coil of the second driver 800 do not change, and thus, driving force for the focusing may be precisely controlled.

Hereinafter, a camera module 1' according to another one or more embodiments in the present disclosure will be described with reference to FIGS. 20 through 34.

Figure 20:
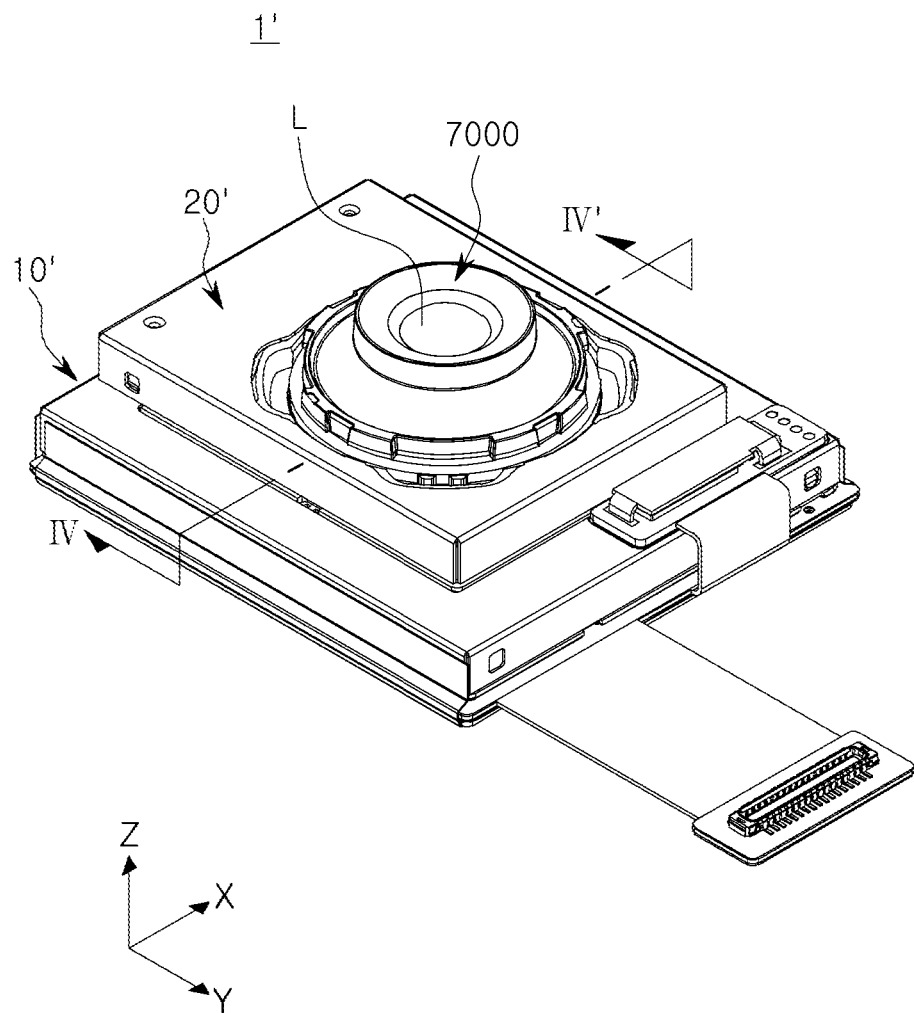
FIG. 20 is a perspective view illustrating a camera module according to another one or more embodiments in the present disclosure.
Figure 21:
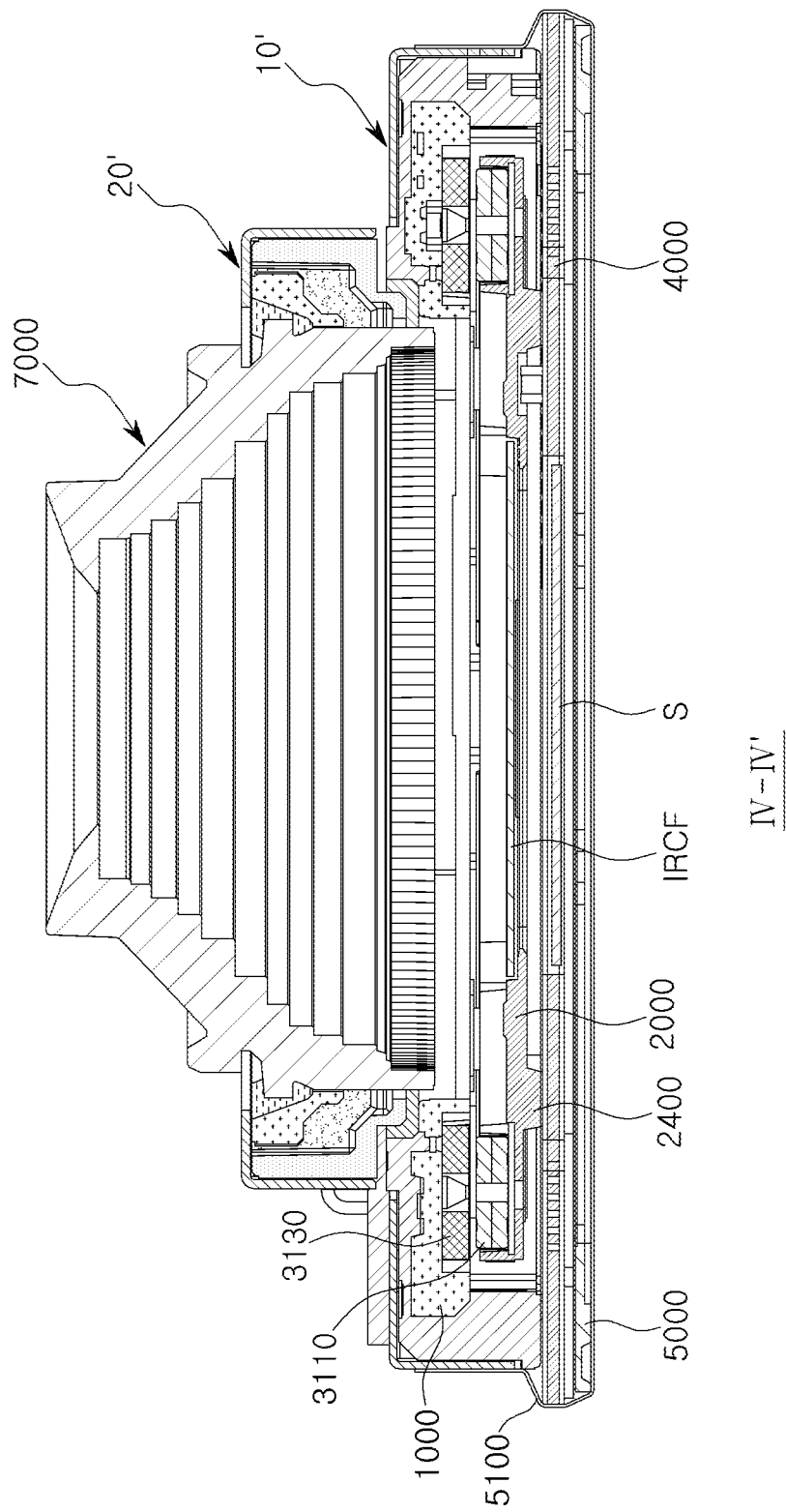
FIG. 21 is a cross-sectional view taken along line IV-IV' of FIG. 20.

Referring to FIGS. 20 and 21, a camera module 1' according to another one or more embodiments in the present disclosure may include a lens module 7000, an image sensor S, a first actuator 10', and a second actuator 20'.

The first actuator 10' may be an actuator for optical image stabilization, and the second actuator 20' may be an actuator for focusing.

The lens module 7000 may include at least one lens and a lens barrel 7100. At least one lens may be disposed inside the lens barrel 7100. When a plurality of lenses L are provided, the plurality of lenses L may be mounted inside the lens barrel 7100 along an optical axis (e.g., a Z-axis).

The lens module 7000 may further include a carrier 7300 coupled to the lens barrel 7100.

The carrier 7300 may be provided with a hollow part penetrating through the carrier 7300 in the optical axis (e.g., Z-axis) direction, and the lens barrel 7100 may be inserted into the hollow part and be fixedly disposed with respect to the carrier 7300.

In another one or more embodiments in the present disclosure, the lens module 7000 may be a moving member moving in the optical axis (e.g., Z-axis) direction at the time of auto-focusing (AF). To this end, the camera module 1', according to another one or more embodiments in the present disclosure, may include the second actuator 20'.

The lens module 7000 may be moved in the optical axis (e.g., Z-axis) direction by the second actuator 20' to perform a focusing operation.

Meanwhile, the lens module 7000 may be a fixed member that does not move at the time of optical image stabilization.

The camera module 1', according to another one or more embodiments in the present disclosure, may perform optical image stabilization (OIS) by moving the image sensor S rather than the lens module 7000. Since the image sensor S that is relatively light is moved, the image sensor S may be moved with a smaller driving force. Accordingly, the optical image stabilization may be more precisely performed.

To this end, the camera module 1', according to another one or more embodiments in the present disclosure, may include the first actuator 10'.

The image sensor S may be moved in directions perpendicular to the optical axis (e.g., the Z-axis) or rotated with the optical axis (e.g., the Z-axis) as a rotation axis by the first actuator 10' to perform the optical image stabilization.

That is, the image sensor S may be moved in directions perpendicular to a direction to which an imaging plane of the image sensor S is directed, by the first actuator 10'. For example, the image sensor S may be moved in the directions perpendicular to the optical axis (e.g., the Z-axis) or rotated with the optical axis (e.g., the Z-axis) as a rotation axis to perform the optical image stabilization.

In the embodiments, it has been described that the image sensor S is rotated with the optical axis (e.g., the Z-axis) as a rotation axis for convenience, but when the image sensor S is rotated, the rotation axis of the image sensor may not coincide with the optical axis (e.g., the Z-axis). For example, the image sensor S may be rotated with any one axis perpendicular to the direction to which the imaging plane of the image sensor S is directed, as a rotation axis.

Figure 22:
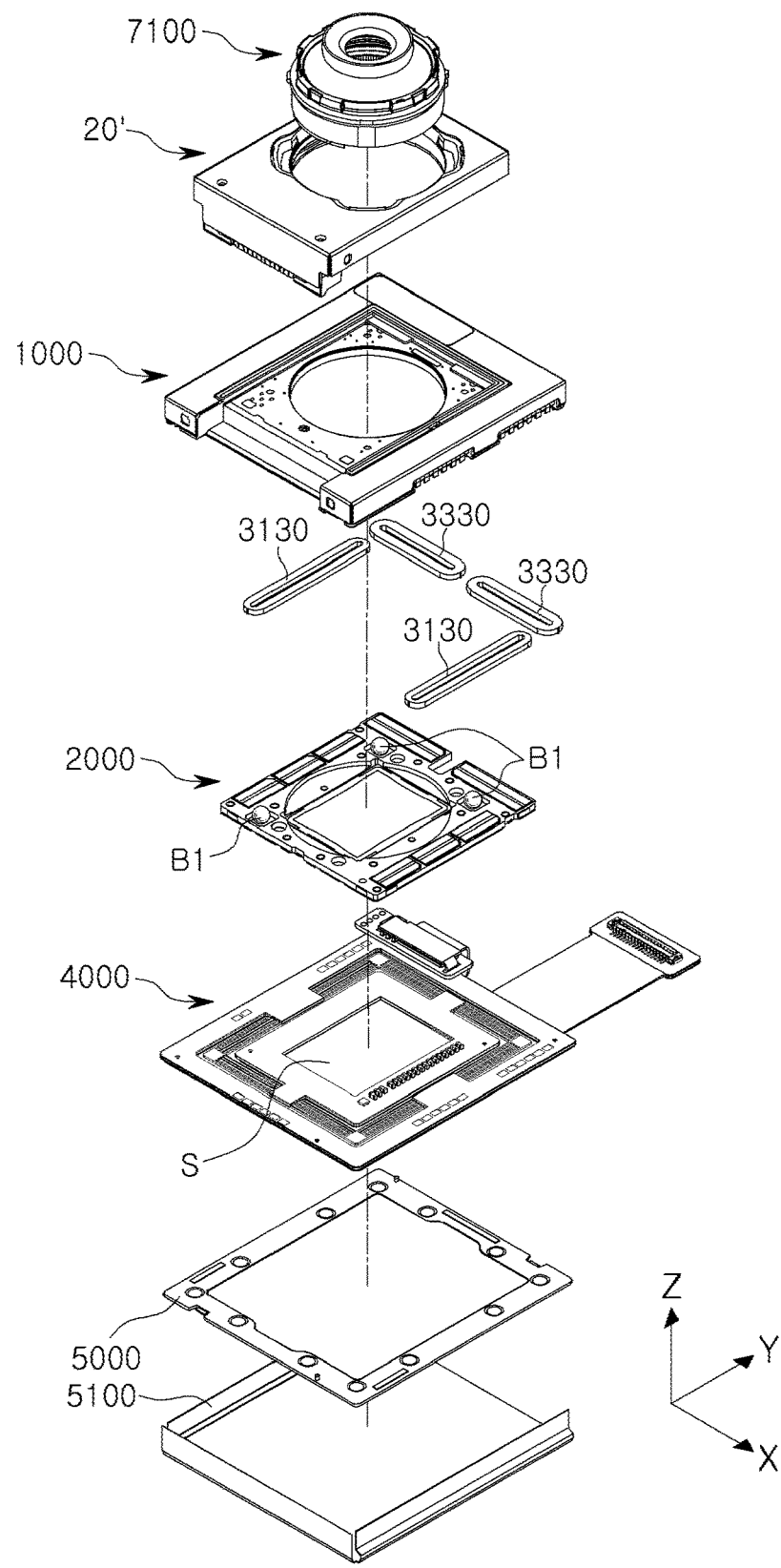
FIG. 22 is a schematic exploded perspective view illustrating the camera module according to another one or more embodiments in the present disclosure.

Referring to FIG. 22, the first actuator 10' may include a fixed frame 1000, a moving frame 2000, a first driver 3000, and a sensor substrate 4000, and may further include a base 5000.

The fixed frame 1000 may be coupled to a second actuator 20' to be described later. For example, the fixed frame 1000 may be coupled to a housing 6000 of the second actuator 20'.

The fixed frame 1000 may be a fixed member that does not move at the time of the focusing and the optical image stabilization.

The fixed frame 1000 may have a rectangular plate shape with a center penetrated in the direction of the optical axis (e.g., Z-axis).

The moving frame 2000 may be accommodated in the fixed frame 1000. The fixed frame 1000 may have sidewalls extending downward in the optical axis (e.g., Z-axis) direction, and accordingly, the fixed frame 1000 may have an accommodation space for accommodating the moving frame 2000 therein.

The moving frame 2000 may be relatively moved in the directions perpendicular to the optical axis (e.g., the Z-axis) with respect to the fixed frame 1000 or may be rotated with the optical axis (e.g., the Z-axis) as a rotation axis. That is, the moving frame 2000 may be a moving member moving at the time of the optical image stabilization.

For example, the moving frame 2000 may be configured to be movable in a first axis (e.g., X-axis) direction and a second axis (e.g., Y-axis) direction, and may be rotated with the optical axis (e.g., the Z-axis) as the rotation axis.

The first axis (e.g., X-axis) direction may refer to a direction perpendicular to the optical axis (e.g., the Z-axis), and the second axis (e.g., Y-axis) direction may refer to a direction perpendicular to both the optical axis (e.g., Z-axis) direction and the first axis (e.g., X-axis) direction.

The moving frame 2000 may have a rectangular plate shape with a center penetrated in the optical axis (e.g., Z-axis) direction.

An infrared cut-off filter IRCF may be mounted on an upper surface of the moving frame 2000. A filter mounting groove 2300 (see FIG. 29) in which the infrared cut-off filter IRCF is mounted may be provided on the upper surface of the moving frame 2000. The sensor substrate 4000 may be mounted on a lower surface of the moving frame 2000.

The first ball member B1 may be disposed between the fixed frame 1000 and the moving frame 2000.

The first ball member B1 may be disposed to contact each of the fixed frame 1000 and the moving frame 2000.

When the moving frame 2000 is moved or rotated relatively with respect to the fixed frame 1000, the first ball member B1 may be moved in a rolling motion between the fixed frame 1000 and the moving frame 2000 to support the movement of the moving frame 2000.

Meanwhile, since the moving frame 2000 is accommodated in the fixed frame 1000, the thickness of the moving frame 2000 needs to be decreased to decrease the height of the first actuator 10' in the optical axis (e.g., Z-axis) direction.

However, when the thickness of the moving frame 2000 is decreased, the rigidity of the moving frame 2000 may decrease, such that there is a risk that the reliability of the moving frame 2000 against an external impact or the like will be decreased.

Accordingly, the moving frame 2000 may be provided with a reinforcing plate 2500 to reinforce the rigidity of the moving frame 2000.

Figure 29:
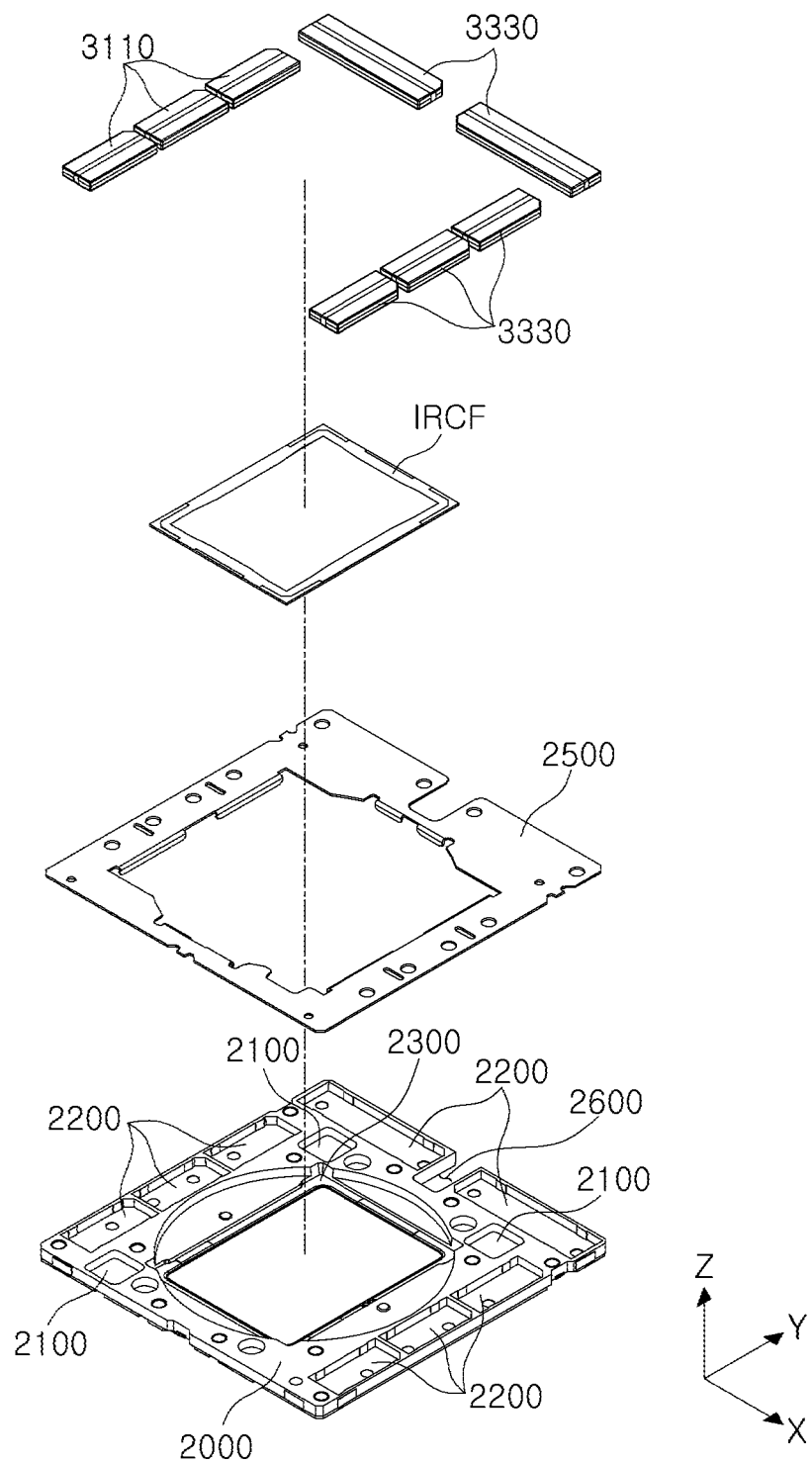
FIG. 29 is a perspective view illustrating a moving frame of the first actuator according to another one or more embodiments in the present disclosure.

As an example, referring to FIG. 29, the reinforcing plate 2500 may be coupled integrally with the moving frame 2000 by insert injection. In this case, the reinforcing plate 2500 may be manufactured to be integrated with the moving frame 2000 by injecting a resin material into a mold in a state where the reinforcing plate 2500 is fixed in the mold.

The reinforcing plate 2500 may be disposed inside the moving frame 2000. In addition, the reinforcing plate 2500 may be disposed so that a portion thereof is exposed externally to the moving frame 2000. By exposing a portion of the reinforcing plate 2500 externally to the moving frame 2000 while forming the reinforcing plate 2500 integrally with the moving frame 2000 inside the moving frame 2000 as described above, a coupling force between the reinforcing plate 2500 and the moving frame 2000 may be improved, and separation of the reinforcing plate 2500 from the moving frame 2000 may be prevented.

Meanwhile, the reinforcing plate 2500 may be formed of a stainless material.

Referring to FIG. 22, the image sensor S may be mounted on the sensor substrate 400. A portion of the sensor substrate 4000 may be coupled to the moving frame 2000, and the other portion of the sensor substrate 4000 may be coupled to the fixed frame 1000.

The image sensor S may be mounted on a portion of the sensor substrate 4000 coupled to the moving frame 2000.

Since a portion of the sensor substrate 4000 is coupled to the moving frame 2000, as the moving frame 2000 is moved or rotated, a portion of the sensor substrate 4000 may also be moved or rotated together with the moving frame 2000.

Accordingly, the image sensor S may be moved or rotated on a plane perpendicular to the optical axis (e.g., the Z-axis) to perform optical image stabilization when capturing an image.

Figure 28:
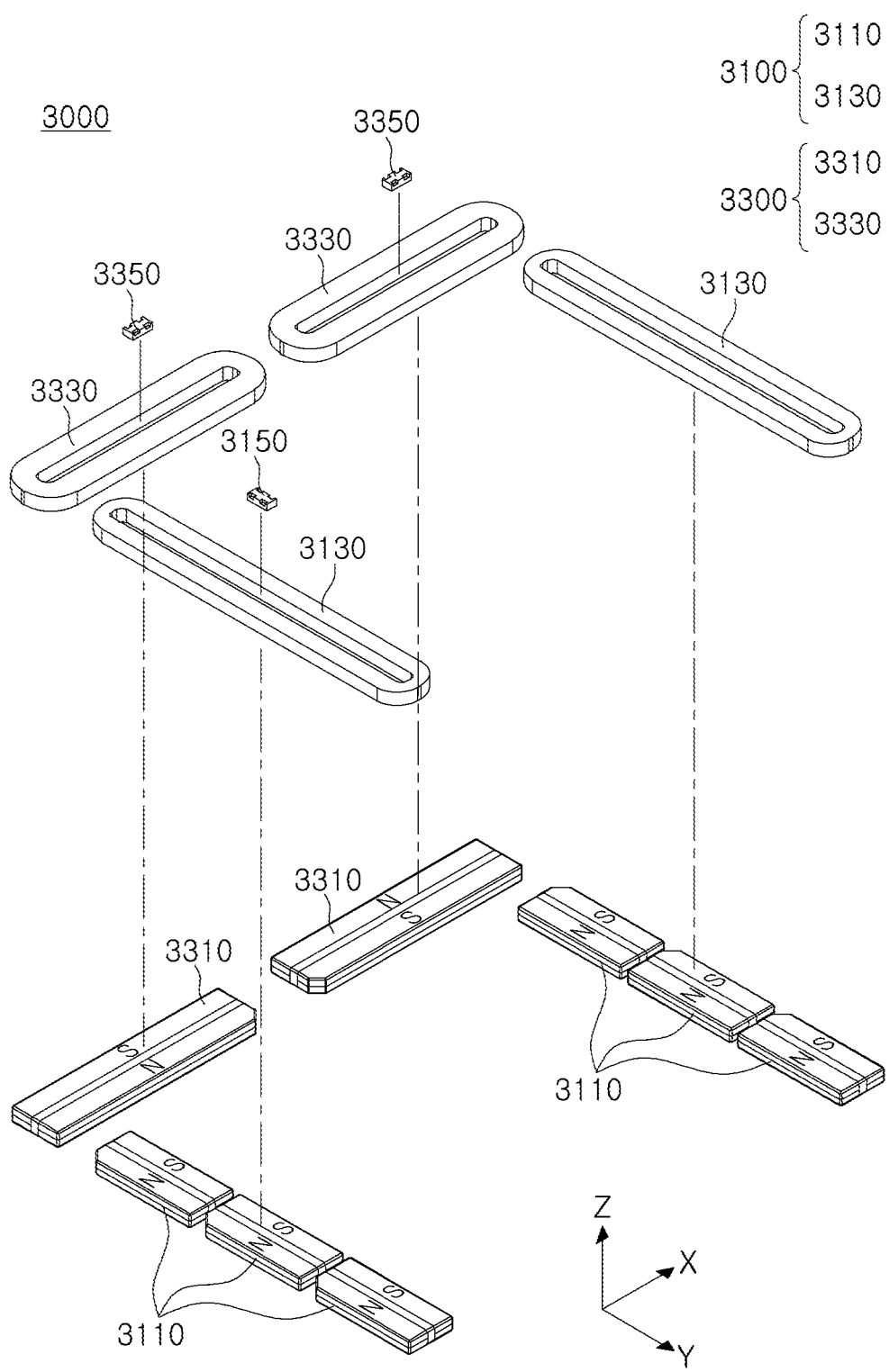
FIG. 28 is an exploded perspective view illustrating a first driver of a first actuator according to another one or more embodiments in the present disclosure.

Referring to FIG. 28, the first driver 3000 may generate driving forces in the directions perpendicular to the optical axis (e.g., the Z-axis) to move the moving frame 2000 in the directions perpendicular to the optical axis (e.g., the Z-axis) or rotate the moving frame 2000 with the optical axis (e.g., Z-axis) as the rotation axis.

The first driver 3000 may include a first sub-driver 3100 and a second sub-driver 3300. The first sub-driver 3100 may generate driving force in the first axis (e.g., X-axis) direction, and the second sub-driver 3300 may generate driving force in the second axis (e.g., Y-axis) direction.

The first sub-driver 3100 may include a first magnet 3110 and a first coil 3130. The first magnet 3110 and the first coil 3130 may be disposed to face each other in the optical axis (e.g., Z-axis) direction.

The first magnet 3110 may be disposed on the moving frame 2000. The first magnet 3110 may include a plurality of magnets. For example, the first magnet 3110 may include two sets of magnets disposed to be spaced apart from each other in a direction (the first axis (e.g., X-axis) direction) in which driving force is generated by the first magnet 3110. At least two magnets may be included in each set. In addition, the magnets included in each set may be disposed to be spaced apart from each other along the second axis (e.g., Y-axis) direction.

One magnet having a long shape in the second axis (e.g., Y-axis) direction may also be used, but when the magnet has a shape too long in one direction, there may be a risk that the magnet will be damaged at the time of manufacture. Accordingly, reliability at the time of manufacture may be improved by disposing a plurality of magnets spaced apart from each other in the length direction as one set.

A mounting groove 2200 (see FIG. 29) in which the first magnet 3110 is disposed may be provided in the upper surface of the moving frame 2000. By inserting and disposing the first magnet 3110 into and in the mounting groove 2200, increases in the entire heights of the first actuator 10' and the camera module 1' due to the thickness of the first magnet 3110 may be prevented.

The first magnet 3110 may be magnetized so that one surface (e.g., a surface thereof facing the first coil 3130) has both an N pole and an S pole. For example, an N pole, a neutral region, and an S pole may be sequentially provided along the first axis (e.g., X-axis) direction on one surface of the first magnet 3130 facing the first coil 3110. The first magnet 3110 may have a shape with a length in the second axis (e.g., Y-axis) direction (see FIG. 28).

The first magnet 3110 may be magnetized so that the other surface (e.g., an opposite surface to one surface) has both an S pole and an N pole. As an example, an S pole, a neutral region, and an N pole may be sequentially provided along the first axis (e.g., X-axis) direction on the other surface of the first magnet 3110.

All of the magnetization directions of polarities of the plurality of magnets included in the first magnet 3110 may be the same as each other.

The first coil 3130 may be disposed to face the first magnet 3110. For example, the first coil 3130 may be disposed to face the first magnet 3110 in the optical axis (e.g., Z-axis) direction.

The first coil 3130 may have a doughnut shape with a hollow part, and may have a shape with a length in the second axis (e.g., Y-axis) direction. The first coil 3130 may include coils of which the number is smaller than the number of magnets included in the first magnet 3110. For example, the first coil 3130 may include two coils disposed to be spaced apart from each other in the direction (the first axis (e.g., X-axis) direction) in which driving force is generated, and each coil may be disposed to face each set of magnets of the first magnet 3110.

The first magnet 3110 may be a moving member mounted on the moving frame 2000 and moving together with the moving frame 2000, and the first coil 3130 may be a fixed member fixed to the fixed frame 100.

When power is applied to the first coil 3130, the moving frame 2000 may be moved in the first axis (e.g., X-axis) direction by an electromagnetic force between the first magnet 3110 and the first coil 3130.

The first magnet 3110 and the first coil 3130 may generate driving force in a direction (e.g., the first axis (e.g., X-axis) direction) perpendicular to a direction (the optical axis direction) in which they face each other.

The second sub-driver 3300 may include a second magnet 3310 and a second coil 3330. The second magnet 3310 and the second coil 3330 may be disposed to face each other in the optical axis (e.g., Z-axis) direction.

The second magnet 3310 may be disposed on the moving frame 2000. The second magnet 3310 may include a plurality of magnets. For example, the second magnet 3310 may include two magnets, and the two magnets may be disposed to be spaced apart from each other along the first axis (the X-axis) direction. For example, the second magnet 3310 may include two magnets disposed to be spaced apart from each other in a direction perpendicular to a direction (the second axis (e.g., Y-axis) direction) in which driving force is generated by the second magnet 3310.

A mounting groove 2200 (see FIG. 29) in which the second magnet 3310 is disposed may be provided in the upper surface of the moving frame 2000. By inserting and disposing the second magnet 3310 into and in the mounting groove 2200, increases in the entire heights of the first actuator 10' and the camera module 2' due to the thickness of the first magnet 3310 may be prevented.

The second magnet 3310 may be magnetized so that one surface thereof (e.g., a surface thereof facing the second coil 3330) has both of an S pole and an N pole. For example, an S pole, a neutral region, and an N pole may be sequentially provided along the second axis (e.g., Y-axis) direction on one surface of the second magnet 3330 facing the second coil 3310 (see FIG. 28). The second magnet 3310 may have a shape with a length in the first axis (e.g., X-axis) direction.

The second magnet 3310 may be magnetized so that the other surface (e.g., an opposite surface to one surface) thereof has both of an N pole and an S pole. As an example, an N pole, a neutral region, and an S pole may be sequentially provided along the second axis (e.g., Y-axis) direction on the other surface of the second magnet 3310.

Magnetization directions of the two magnets of the second magnet 3310 may be opposite to each other.

The second coil 3330 may be disposed to face the second magnet 3310. For example, the second coil 3330 may be disposed to face the second magnet 3310 in the optical axis (e.g., Z-axis) direction.

The second coil 3330 may have a doughnut shape with a hollow part, and may have a shape with a length in the first axis (e.g., X-axis) direction. The second coil 3330 may include coils of which the number corresponds to the number of magnets included in the second magnet 3310.

The second magnet 3310 may be a moving member mounted on the moving frame 2000 and moving together with the moving frame 2000, and the second coil 3330 may be a fixed member fixed to the fixed frame 1000.

When power is applied to the second coil 3330, the moving frame 2000 may be moved in the second axis (e.g., Y-axis) direction by an electromagnetic force between the second magnet 3310 and the second coil 3330.

The second magnet 3310 and the second coil 3330 may generate driving force in a direction (e.g., the second axis (e.g., Y-axis) direction) perpendicular to the direction (the optical axis direction) in which they face each other.

Meanwhile, the moving frame 2000 may be rotated by the first sub-driver 3100 and the second sub-driver 3300.

For example, a torque may be generated by controlling the driving force of the first sub-driver 3100 and the driving force of the second sub-driver 3300, and accordingly, the moving frame 2000 may be rotated.

The first magnet 3110 and the second magnet 3310 may be disposed perpendicular to each other on the plane perpendicular to the optical axis (e.g., the Z-axis), and the first coil 3130 and the second coil 3330 may also be disposed perpendicular to each other on the plane perpendicular to the optical axis (e.g., the Z-axis).

The first ball member B1 may be disposed between the fixed frame 1000 and the moving frame 2000.

The first ball member B1 may be disposed to contact each of the fixed frame 1000 and the moving frame 2000.

The first ball member B1 may guide the movement of the moving frame 2000 in an optical image stabilization process. In addition, the first ball member B1 may also serve to maintain a gap between the fixed frame 1000 and the moving frame 2000.

The first ball member B1 may be moved in a rolling motion in the first axis (e.g., X-axis) direction when driving force in the first axis (e.g., X-axis) direction is generated. Accordingly, the first ball member B1 may guide the movement of the moving frame 2000 in the first axis (e.g., X-axis) direction.

In addition, the first ball member B1 may be moved in a rolling motion in the second axis (e.g., Y-axis) direction when the driving force in the second axis (e.g., Y-axis) direction is generated. Accordingly, the first ball member B1 may guide the movement of the moving frame 2000 in the second axis (e.g., Y-axis) direction.

The first ball member B1 may include a plurality of balls disposed between the fixed frame 1000 and the moving frame 2000.

Figure 24:
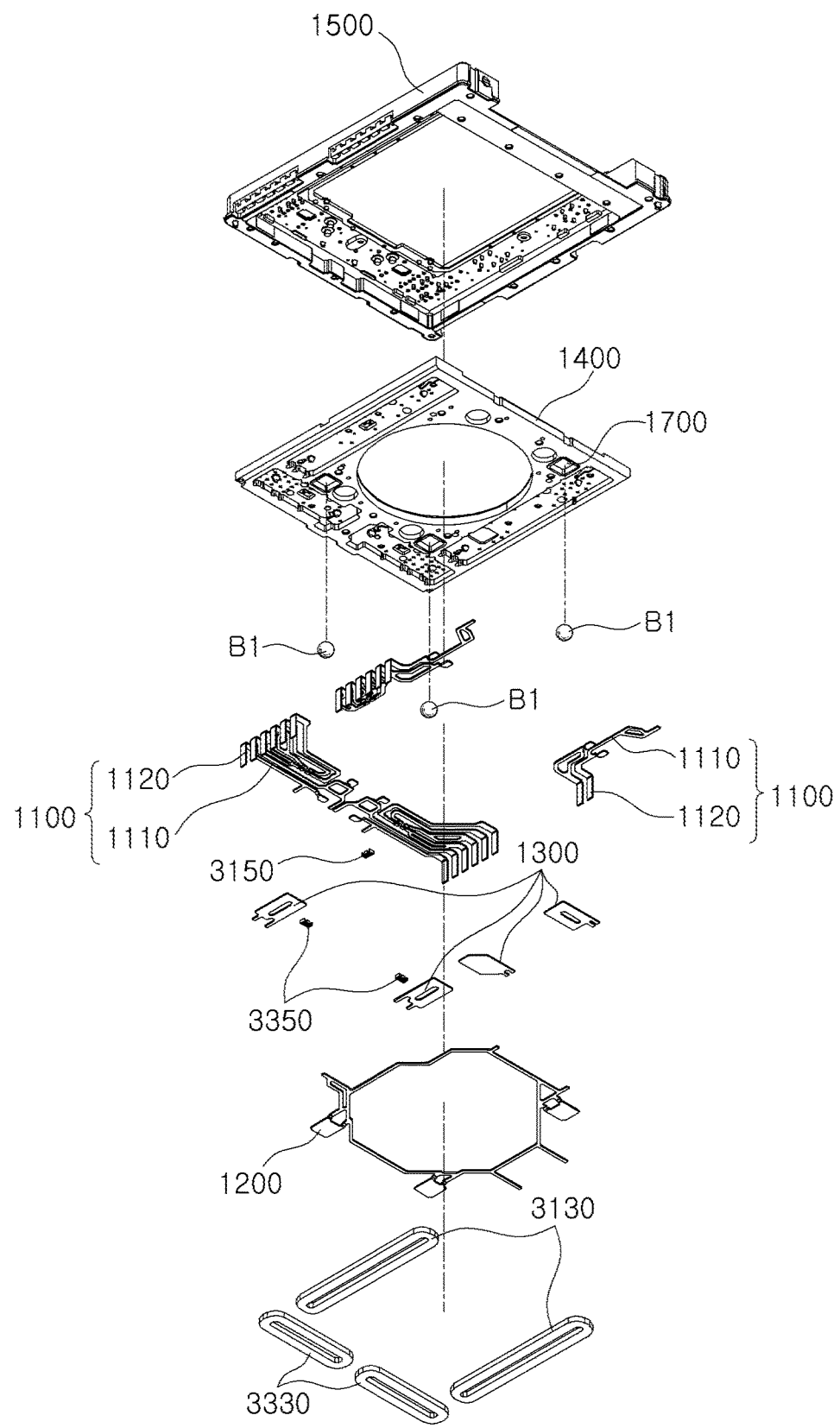
FIG. 24 is an exploded bottom perspective view illustrating the fixed frame of the first actuator according to another one or more embodiments in the present disclosure.
Figure 25:
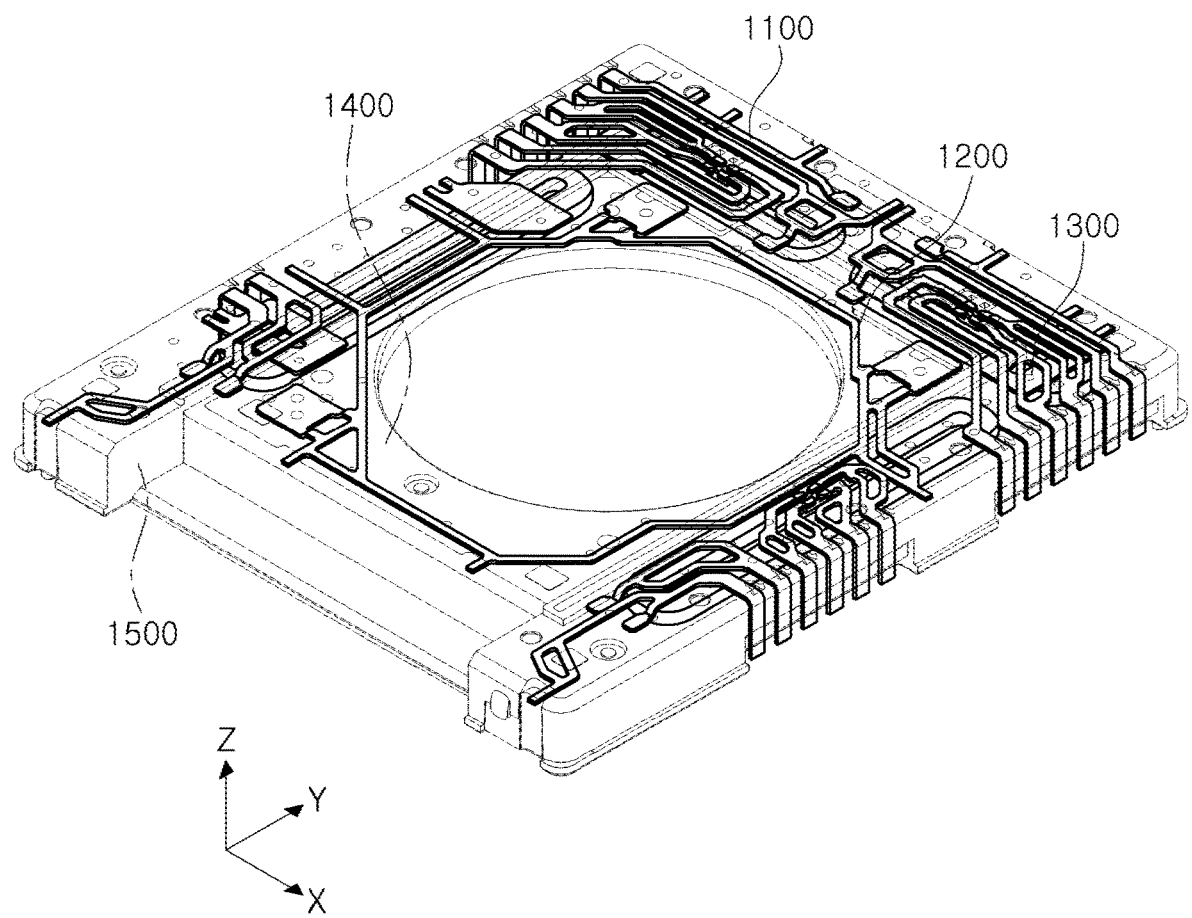
FIG. 25 is a perspective view describing a wiring pattern, a support pad, and a yoke part disposed inside the fixed frame of the first actuator according to another one or more embodiments in the present disclosure.

Referring to FIGS. 24 and 29, a guide groove in which the first ball member B1 is disposed may be provided in at least one of the surfaces of the fixed frame 1000 and the moving frame 2000 facing each other in the optical axis (e.g., Z-axis) direction. A plurality of guide grooves may be provided to correspond to the plurality of balls of the first ball member B1.

For example, a first guide groove 1700 may be provided in a lower surface of the fixed frame 1000, and a second guide groove 2100 may be provided in the upper surface of the moving frame 2000.

The first ball member B1 may be disposed in the first guide groove 1700 and the second guide groove 2100 to be fitted between the fixed frame 1000 and the moving frame 2000.

Each of the first guide groove 1700 and the second guide groove 2100 may have a polygonal or circular shape in plan view. The sizes of the first guide groove 1700 and the second guide groove 2100 may be greater than the diameter of the first ball member B1. For example, cross sections of the first guide groove 1700 and the second guide groove 2100 on the plane perpendicular to the optical axis (e.g., the Z-axis) may have sizes greater than the diameter of the first ball member B1.

Specific shapes of the first guide groove 1700 and the second guide groove 2100 are not limited as long as the sizes of the first guide groove 1700 and the second guide groove 2100 are greater than the diameter of the first ball member B1.

Accordingly, the first ball member B1 may be moved in the rolling motion in the directions perpendicular to the optical axis (e.g., the Z-axis) in a state in which it is accommodated in the first guide groove 1700 and the second guide groove 2100.

Meanwhile, a portion of the reinforcing plate 2500 may be exposed externally through the upper surface of the moving frame 2000. The reinforcing plate 2500 exposed externally may form a bottom surface of the second guide groove 2100. Accordingly, the first ball member B1 may be in contact with and roll with respect to the reinforcing plate 2500.

When the driving force is generated in the first axis (e.g., X-axis) direction, the moving frame 2000 may be moved in the first axis (e.g., X-axis) direction.

In addition, when the driving force is generated in the second axis (e.g., Y-axis) direction, the moving frame 2000 may be moved in the second axis (e.g., Y-axis) direction.

In addition, the moving frame 2000 may be rotated by generating a deviation between a magnitude of the driving force in the first axis (e.g., X-axis) direction and a magnitude of the driving force in the second axis (e.g., Y-axis) direction.

Since a portion of the sensor substrate 4000 is coupled to the moving frame 2000 and the image sensor S is disposed on the sensor substrate 4000, as the moving frame 2000 moves, the image sensor S may also be moved or rotated.

Meanwhile, referring to FIG. 21, a projection part 2400 protruding toward the sensor substrate 4000 may be disposed on the moving frame 2000. For example, the projection part 2400 may be disposed on the lower surface of the moving frame 2000, and may be coupled to a moving part 4100 of the sensor substrate 4000. Accordingly, a gap may be formed between a body of the moving frame 2000 and the sensor substrate 4000 in the optical axis (e.g., Z-axis) direction, and accordingly, interference between the moving frame 2000 and the sensor substrate 4000 when the moving frame 200 is moved on an X-Y plane may be prevented.

It has been illustrated in FIG. 21 that the projection part 2400 is disposed on the lower surface of the moving frame 2000, but this is only an example, and the projection part 2400 may also be disposed on an upper surface of the sensor substrate 4000.

The first actuator 10' may detect a position of the moving frame 2000 in the directions perpendicular to the optical axis (e.g., the Z-axis).

To this end, a first position sensor 3150 and a second position sensor 3350 may be provided (see FIG. 28). The first position sensor 3150 may be disposed on the fixed frame 1000 to face the first magnet 3110, and the second position sensor 3350 may be disposed on the fixed frame 1000 to face the second magnet 3310. The first position sensor 3150 and the second position sensor 3350 may be Hall sensors.

Here, referring to an embodiment illustrated in FIG. 28, the second position sensor 3350 may include two Hall sensors. For example, the second magnet 3310 may include two magnets disposed to be spaced apart from each other in the direction (the first axis (e.g., X-axis) direction) perpendicular to the direction (the second axis (e.g., Y-axis) direction) in which the driving force is generated by the second magnet 3310, and the second position sensor 3350 may include two Hall sensors disposed to face the two magnets.

It may be sensed whether or not the moving frame 2000 is rotated through the two hall sensors facing the second magnet 3310.

Meanwhile, a torque may be intentionally generated in a manner of generating a deviation between the driving force of the first sub-driver 3100 and the driving force of the second sub-driver 3300, using a resultant force of the first sub-driver 3100 and the second sub-driver 3300, or using the two magnets and the two coils included in the second sub-driver 3300.

Since the first guide groove 1700 and the second guide groove 2100 have a polygonal or circular shape, in plan view, greater than the diameter of the first ball member B1, the first ball member B1 disposed between the first guide groove 1700 and the second guide groove 2100 may be moved in the rolling motion in the directions perpendicular to the optical axis (e.g., the Z-axis) without limitation.

Accordingly, the moving frame 2000 may be rotated about the Z-axis in a state where first ball member B1 supports it.

In addition, when the rotation of the moving frame 2000 is not desired and linear movement of the moving frame 2000 is desired, the driving force of the first sub-driver 3100 and/or the driving force of the second sub-driver 3300 may be controlled to offset an unintentionally generated torque.

Referring to FIGS. 23 through 27, the fixed frame 1000 may include a wiring pattern 1100 therein, and the wiring pattern 1100 may be connected to the first coil 3130 and the second coil 3330. In addition, the wiring pattern 1100 of the fixed frame 1000 may also be connected to the sensor substrate 4000. Accordingly, the first coil 3130 and the second coil 3330 may receive power through the wiring pattern 1100 disposed in the fixed frame 1000.

That is, the camera module 1', according to another one or more embodiments in the present disclosure, does not include a separate printed circuit board for supplying power to the first driver 3000, and may be configured to supply the power to the first driver 3000 by including the wiring pattern 1100 disposed in the fixed frame 1000 itself.

Figure 26:
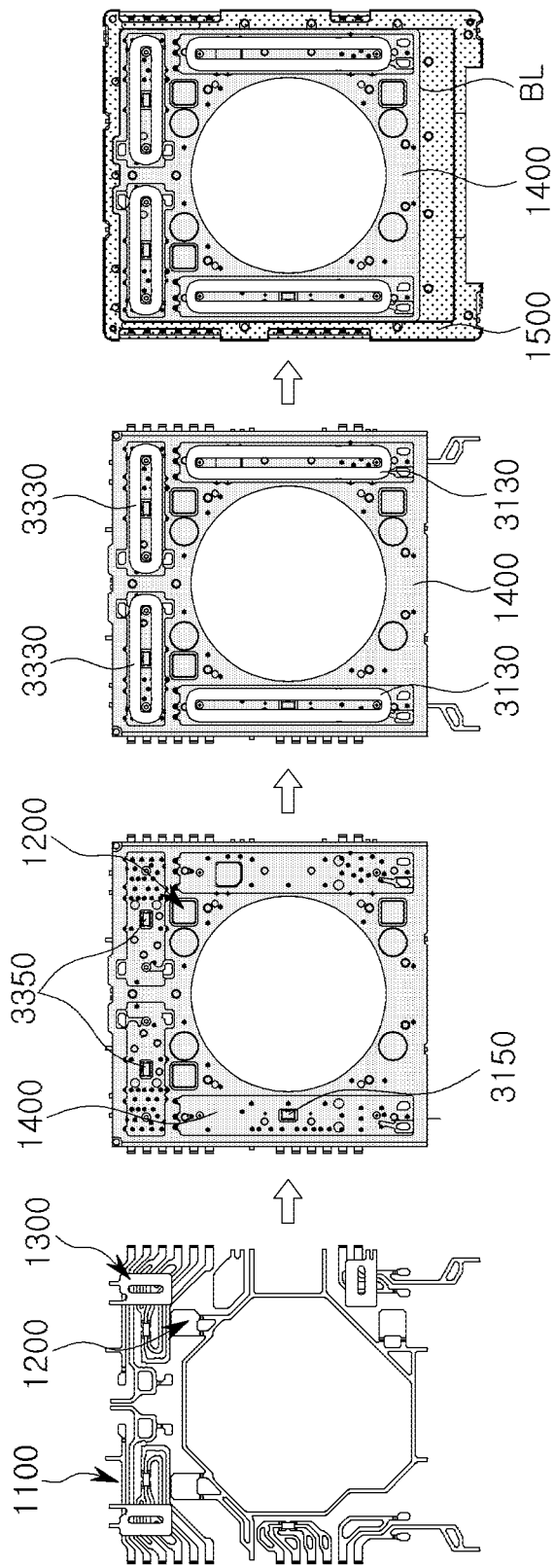
FIG. 26 illustrates the manufacturing of the fixed frame of the first actuator according to another one or more embodiments in the present disclosure.
Figure 27:
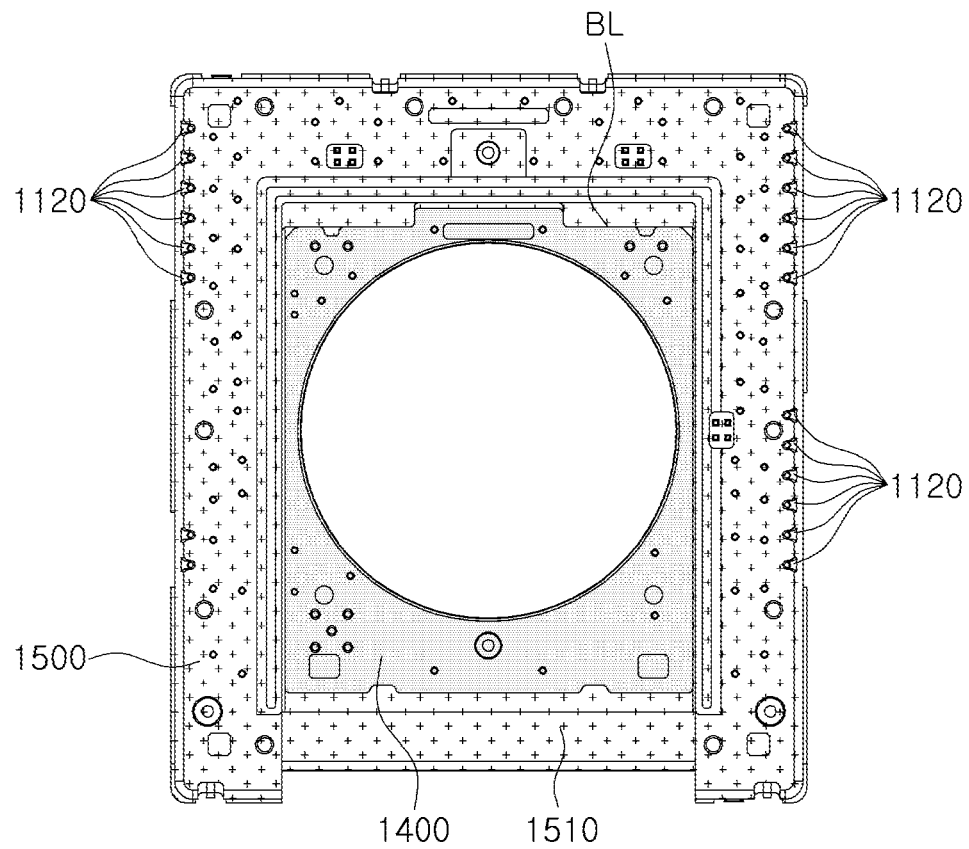
FIG. 27 is a plan view illustrating a structure of the fixed frame of the first actuator according to another one or more embodiments in the present disclosure before a shield can is coupled.

Referring to FIG. 26, the wiring pattern 1100 may be integrally coupled with the fixed frame 1000 by insert injection. For example, the wiring pattern 1100 may be manufactured to be integrated with the fixed frame 1000 by injecting a resin material into a mold in a state where the wiring pattern 1100 is disposed in the mold.

The camera module 1' according to another one or more embodiments in the present disclosure may be subjected to injection at least twice in a process of manufacturing the fixed frame 1000.

When the pattern width of the wiring pattern 1100 is significantly decreased to decrease the size of the wiring pattern 1100, the rigidity of the wiring pattern 1100 may not be sufficient, such that it may be difficult to fix the position of the wiring pattern 1100 at the time of insert injection.

Accordingly, the fixed frame 1000 having the wiring pattern 1100 therein may be manufactured by manufacturing a primary injection product (e.g., a first frame 1400) integrated with the wiring pattern 1100 by insert injection and then performing insert injection on the primary injection product to manufacture a secondary injection product (e.g., a second frame 1500) integrated with the primary injection product.

Since the injection is performed at least twice, a boundary line BL may be formed between the first frame 1400, the primary injection product, and the second frame 1500, the secondary injection product.

The first coil 3130, the second coil 3330, the first position sensor 3150, and the second position sensor 3350 may be disposed on the first frame 1400, which is the primary injection product. The first coil 3130, the second coil 3330, the first position sensor 3150, and the second position sensor 3350 may be connected to the wiring pattern 1100 included in the first frame 1400.

It has been illustrated in an embodiment of FIG. 26 that the first position sensor 3150 and the second position sensor 3350, and the first coil 3130 and the second coil 3330 are disposed on the first frame 1400 after primary injection, and secondary injection is then performed. However, the present disclosure is not limited thereto, and the first coil 3130 and the second coil 3330 may be disposed on the first frame 1400 after the secondary injection. In addition, the first position sensor 3150 and the second position sensor 3350 may also be disposed on the first frame 1400 after the secondary injection.

The wiring pattern 1100 may include a wiring part 1110 and a terminal part 1120, the wiring part 1110 may be positioned inside the first frame 1400, and the terminal part 1120 may be disposed to be exposed externally of the first frame 1400. In addition, the terminal part 1120 may also be disposed to be exposed externally of the second frame 1500. The terminal part 1120 of the wiring pattern 1100 may be connected to the sensor substrate 4000, and power may thus be applied to the first coil 3130 and the second coil 3330 through the wiring pattern 1100.

Meanwhile, the first guide groove 1700 in which the first ball member B1 is disposed may be formed in the first frame 1400. Since the material of the first ball member B1 may be ceramic and the material of the first frame 1400 is plastic, there may be a risk that the first guide groove 1700 will be damaged due to a difference in rigidity between the first ball member B1 and the first frame 1400.

Accordingly, a support pad 1200 may be disposed on the bottom surface of the first guide groove 1700 in order to prevent damage to the first guide groove 1700. Such a support pad 1200 may be insert-injected like the wiring pattern 1100 in a primary injection process to be integrated with the first frame 1400. The support pad 1200 may be formed of stainless material.

A portion of the support pad 1200 may be disposed inside the first frame 1400, and the other portion of the support pad 1200 may be disposed to be exposed externally of the first frame 1400.

The support pad 1200 exposed externally of the first frame 1400 may form a bottom surface of the first guide groove 1700. Accordingly, the first ball member B1 may be in contact with and roll with respect to the support pad 1200.

A yoke part 1300 may be disposed inside the fixed frame 1000. The yoke part 1300 may provide attractive force so that the fixed frame 1000 and the moving frame 2000 may be maintained in a state in which the fixed frame 1000 and the moving frame 2000 are in contact with the first ball member B1.

The yoke part 1300 may be insert-injected like the wiring pattern 1100 in the primary injection process to be integrated with the first frame 1400.

The yoke part 1300 may be disposed to face the first magnet 3110 and the second magnet 3310 in the optical axis (e.g., Z-axis) direction. The yoke part 1300 may include a plurality of yokes. For example, the yoke part may include two yokes facing the two magnets included in the second magnet 3310 and two yokes facing the two sets of magnets of the first magnet.

The number of yokes included in the yoke part 1300 is not particularly limited, but an action center point of attractive force acting between the first and second magnets 3110 and 3310 and the yoke part 1300 needs to be positioned in a support area obtained by connecting the plurality of balls included the first ball member B1 to each other.

Attractive forces may act between the yoke part 1300 and the first magnet 3110 and between the yoke part 1300 and the second magnet 3310 in the optical axis (e.g., Z-axis) direction, respectively.

Accordingly, the moving frame 2000 may be pressed toward the fixed frame 1000, and the fixed frame 1000 and the moving frame 2000 may thus be maintained in a state in which they are in contact with the first ball member B1.

The yoke part 1300 may be formed of a material capable of generating the attractive force between the yoke part 1200 and the first and second magnets 3110 and 3310. As an example, the yoke part 1300 may be formed of a magnetic material.

Figure 23:
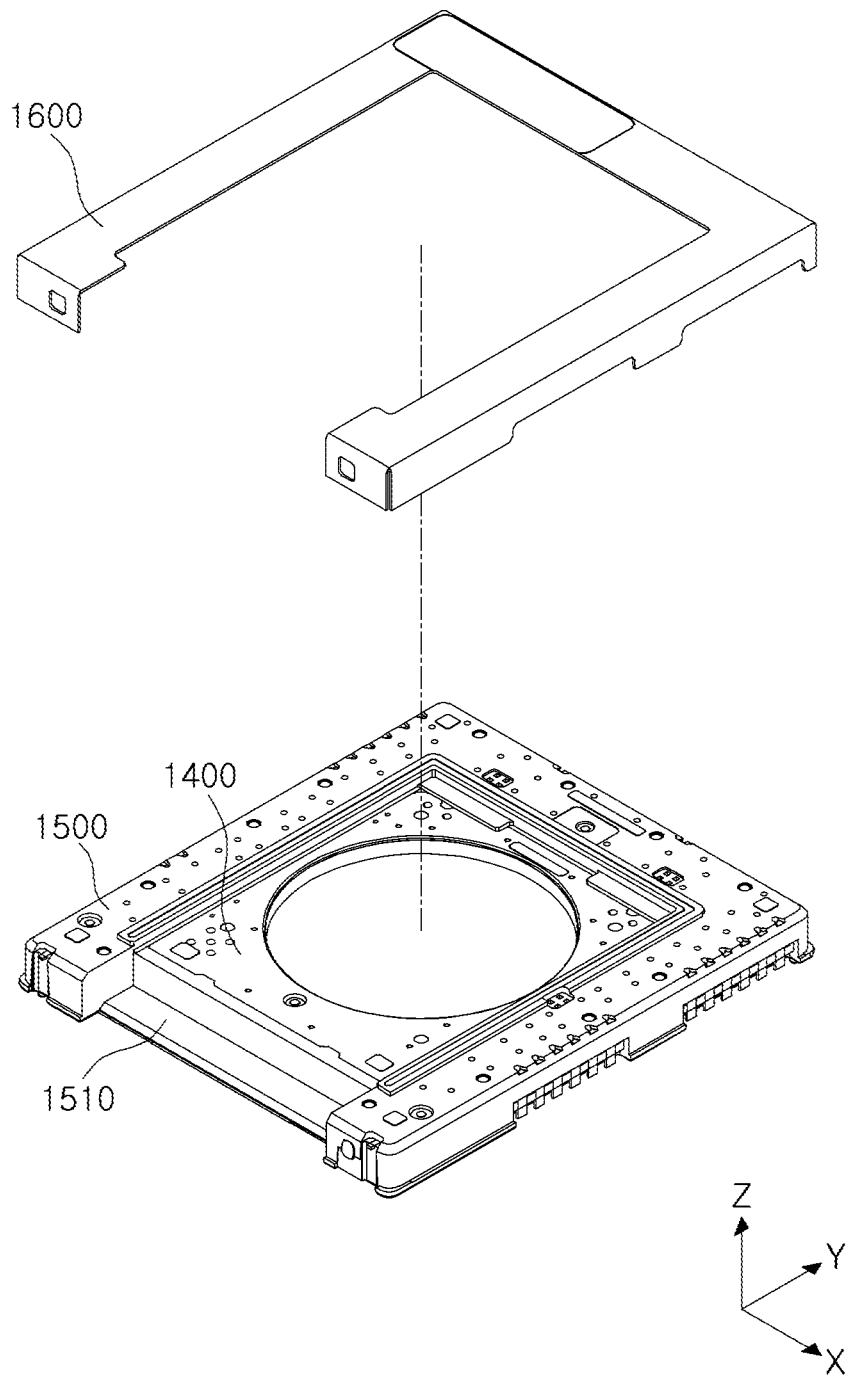
FIG. 23 is a perspective view illustrating a fixed frame of a first actuator according to another one or more embodiments in the present disclosure.

Meanwhile, the fixed frame 1000 may further include a shield can 1600. Referring to FIG. 23, after secondary injection is performed in a process of manufacturing the fixed frame 1000, the shield can 1600 may be coupled to the second frame 1500, which is the secondary injection product, to cover at least portions of an upper surface and side surfaces of the second frame 1500. The shield can 1600 may serve to shield electromagnetic waves.

Figure 30A:
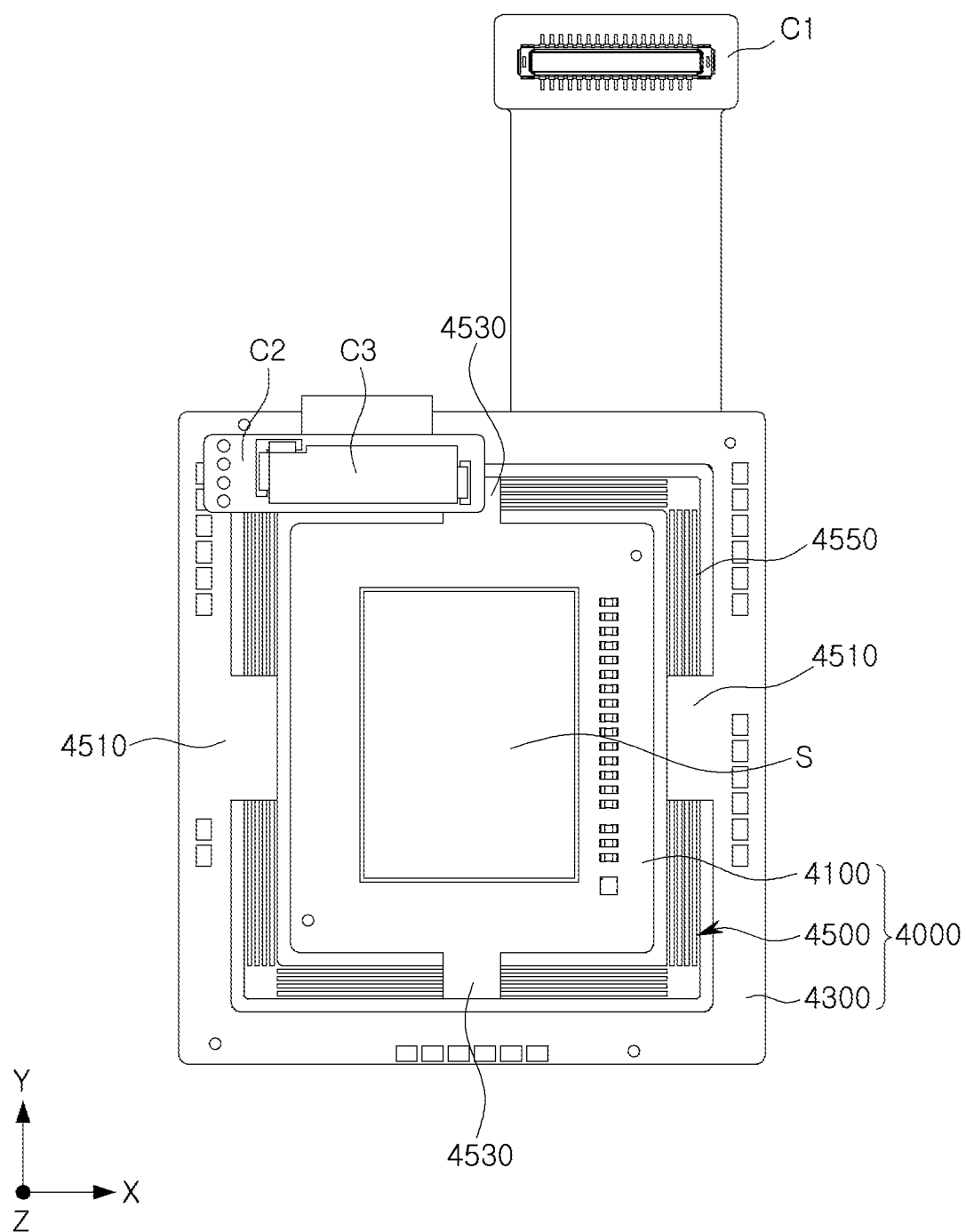
FIGS. 30A and 30B are plan views of a sensor substrate of the first actuator according to another one or more embodiments in the present disclosure.
Figure 30B:
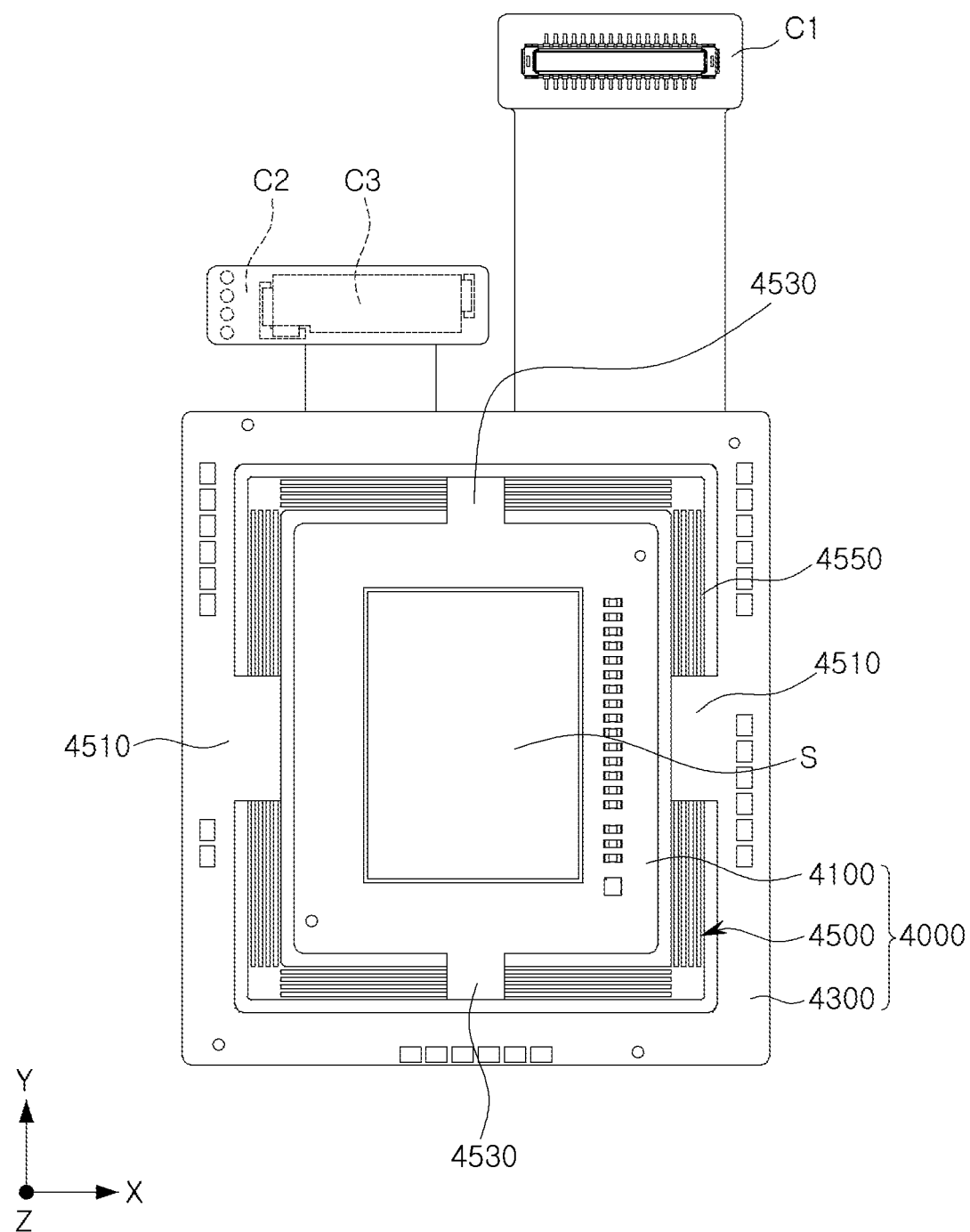

Referring to FIGS. 30A and 30B, the sensor substrate 4000 may include a moving part 4100, a fixed part 4300, and a connection part 4500. The sensor substrate 4000 may be a rigid flexible printed circuit board (RF PCB).

The image sensor S may be mounted on the moving part 4100. The moving part 4100 may be coupled to the lower surface of the moving frame 2000. For example, an area of the moving part 4100 may be greater than that of the image sensor S, and the moving part 4100 at an outer part of the image sensor S may be coupled to the lower surface of the moving frame 2000.

The moving part 4100 may be a moving member moving together with the moving frame 2000 at the time of the optical image stabilization. The moving part 4100 may be a rigid PCB.

The fixed part 4300 may be coupled to the lower surface of the fixed frame 1000. The fixed part 4300 may be a fixed member that does not move at the time of optical image stabilization. The fixed part 4300 may be a rigid PCB.

The connection part 4500 may be disposed between the moving part 4100 and the fixed part 4300, and may connect the moving part 4100 and the fixed part 4300 to each other. The connection part 4500 may be a flexible PCB. When the moving part 4100 is moved, the connection part 4500 disposed between the moving part 4100 and the fixed part 4300 may be bent.

The connection part 4500 may extend along a circumference of the moving part 4100. The connection part 4500 may be provided with a plurality of slits penetrating through the connection part 4500 in the optical axis direction. The plurality of slits may be disposed at intervals between the moving part 4100 and the fixed part 4300. Accordingly, the connection part 4500 may include a plurality of bridges 4550 spaced apart from each other by the plurality of slits. The plurality of bridges 4550 may extend along the circumference of the moving part 4100.

The connection part 4500 may include a first support part 4510 and a second support part 4530. The connection part 4500 may be connected to the fixed part 4300 through the first support part 4510. In addition, the connection part 4500 may be connected to the moving part 4100 through the second support part 4530.

For example, the first support part 4510 may be in contact with and connected to the fixed part 4300, and may be spaced apart from the moving part 4100. In addition, the second support part 4530 may be in contact with and connected to the moving part 4100, and may be spaced apart from the fixed part 4300.

For example, the first support part 4510 may extend in the first axis direction (e.g., the X-axis direction) to connect the plurality of bridges 4550 of the connection part 4500 and the fixed part 4300 to each other. In another embodiment, the first support part 4510 may include two support parts disposed on sides opposite to each other in the first axis direction (e.g., X-axis direction).

The second support part 4530 may extend in the second axis direction (e.g., the Y-axis direction) to connect the plurality of bridges 4550 of the connection part 4500 and the moving part 4100 to each other. In another embodiment, the second support part 4530 may include two support parts disposed on sides opposite to each other in the second axis direction (e.g., Y-axis direction).

Accordingly, the moving part 4100 may be moved in the directions perpendicular to the optical axis (e.g., the Z-axis) or rotated in relation to the optical axis (e.g., the Z-axis) in a state in which it is supported by the connection part 4500.

In another embodiment, when the image sensor S is moved in the first axis direction (e.g., the X-axis direction), the plurality of bridges 4550 connected to the first support part 4510 may be bent. In addition, when the image sensor S is moved in the second axis direction (e.g., the Y-axis direction), the plurality of bridges 4550 connected to the second support part 4530 may be bent. In addition, when the image sensor S is rotated, the plurality of bridges 4550 connected to the first support part 4510 and the plurality of bridges 4550 connected to the second support part 4530 may be bent together.

In another embodiment, the length of the fixed part 4300 in the first axis (e.g., X-axis) direction and the length of the fixed part 4300 in the second axis (e.g., Y-axis) direction may differ. For example, the length of the fixed part 4300 in the second axis (e.g., Y-axis) direction may be greater than the length of the fixed part 4300 in the first axis (e.g., X-axis) direction. In another embodiment, the sensor substrate 4000 may have a rectangular shape as a whole.

In the sensor substrate 4000 having such a shape, when the length of the first support part 4510 and a length of the second support part 4530 are the same as each other, a load applied to the plurality of bridges 4550 connected to the first support part 4510 and a load applied to the plurality of bridges 4550 connected to the second support part 4530 may differ, and accordingly, it may be difficult to control the driving.

Accordingly, by making the length of the first support part 4510 and the length of the second support part 4530 different, the lengths of the plurality of bridges 4550 extending from the first support part 4510 in the second axis (e.g., Y-axis) direction and lengths of the plurality of bridges 4550 extending from the second support part 4530 in the first axis (e.g., X-axis) direction may be made to be approximately the same as each other.

Here, the length of the first support part 4510 may refer to the length of the first support part 4510 in the second axis (e.g., Y-axis) direction, and the length of the second support part 4530 may refer to the length of the second support part 4530 in the first axis (e.g., X-axis) direction.

An integrated driver circuit (IC) C3 for controlling the driving of the first driver 3000 may be disposed on the sensor substrate 4000. The driver IC C3 may be disposed on a connection substrate C2, and the connection substrate C2 may be connected to the fixed part 4300 by a flexible PCB.

The driver IC C3 may be fixed to an upper surface of the fixed frame 1000 (e.g., an upper surface of the shield can 1600). That is, since the flexible circuit board may be bent, the connection board C2 on which the driver IC C3 is disposed may be disposed on the upper surface of the fixed frame 1000. Accordingly, a separate installation space does not need to be secured, and the total size of the camera module 1' may thus be decreased.

In addition, the first connector C1 for connection to an external power supply (e.g., a mobile electronic device on which the camera module 1' is mounted) may be disposed to extend from the fixed part 4300 of the sensor substrate 4000.

Meanwhile, referring to FIGS. 21 and 22, the base 5000 may be coupled to a lower portion of the sensor substrate 4000.

The base 5000 may be coupled to the sensor substrate 4000 to cover the lower portion of the sensor substrate 4000. The base 5000 may prevent foreign materials or the like from being introduced through a gap between the moving part 4100 and the fixed part 4300 of the sensor substrate 4000.

A heat dissipation film 5100 may be disposed below the base 5000. Such a heat dissipation film 5100 may cover a lower portion of the base 5000 and side surfaces of the first actuator 10'.

As an example, the heat dissipation film 5100 may cover a lower surface of the base 5000, and may further cover at least one of side surfaces of the sensor substrate 4000 and side surfaces of the fixed frame 1000, if necessary.

Accordingly, heat generated from the image sensor S may be effectively dissipated.

Referring to FIG. 29, the moving frame 2000 may be mounted with an infrared cut-off filter IRCF, and a distance from the infrared cut-off filter IRCF to one side surface of the moving frame 2000 in one direction and a distance from the infrared cut-off filter IRCF to the other side surface of the moving frame 2000 in the other direction may differ.

Here, one side surface and the other side surface of the moving frame 2000 may refer to surfaces disposed on opposite sides to each other, and one direction and the other direction may refer to opposite directions.

For example, a distance from the infrared cut-off filter IRCF to one side surface of the moving frame 2000 in a +Y-axis direction may be greater than a distance from the infrared cut-off filter IRCF to the other side surface of the moving frame 2000 in −Y-axis direction.

Accordingly, in a state in which the moving frame 2000 is coupled to the sensor substrate 4000, any one of the two second support parts 4530 and the plurality of bridges 4550 connected to any one of the two second support parts 4530 may be exposed in the optical axis (e.g., Z-axis) direction.

This may be to secure a space in which the second actuator 20' is to be disposed.

Since the moving frame 2000 has such a form, one escape hole 2600 may be formed in the moving frame 2000 unlike the moving frame 200 described above with reference to FIGS. 10 through 12.

The second actuator 20' will be described with reference to FIGS. 32 through 34.

Figure 32:
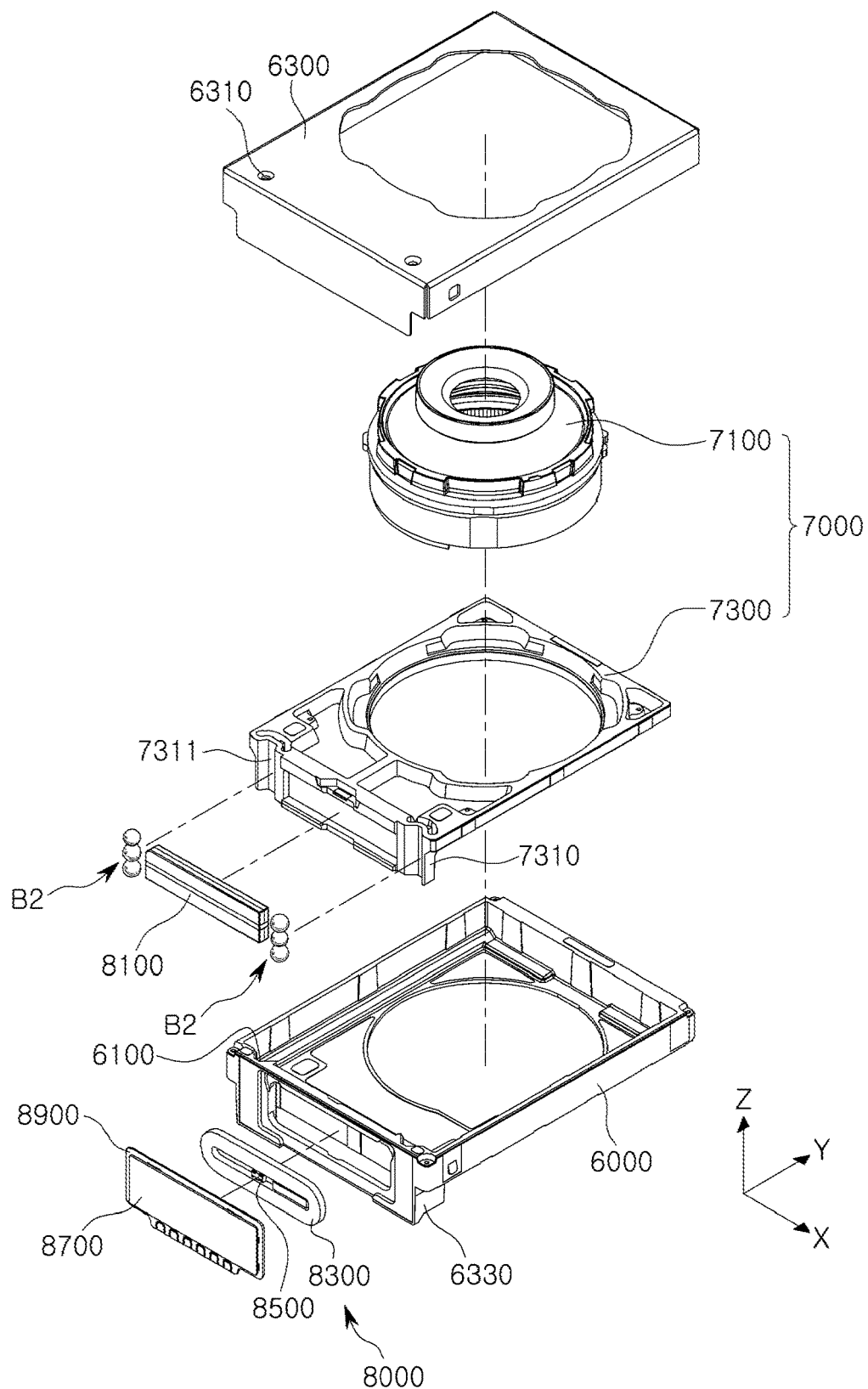
FIG. 32 is an exploded perspective view illustrating a second actuator according to another one or more embodiments in the present disclosure.
Figure 33:
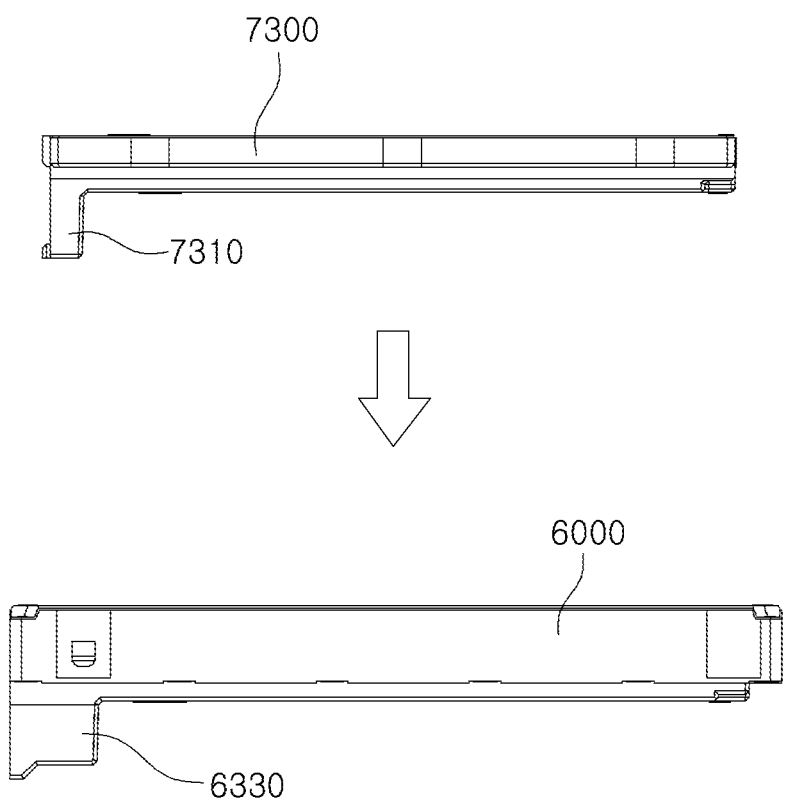
FIG. 33 is a side view of a carrier and a housing of the second actuator according to another one or more embodiments in the present disclosure.

Referring to FIG. 32, the second actuator 20' may include a carrier 7300, a housing 6000, and a second driver 8000, and may further include a case 6300.

The carrier 7300 may be provided with a hollow part penetrating through the carrier 7300 in the optical axis (e.g., Z-axis) direction, and the lens barrel 7100 may be inserted into the hollow part and be fixedly disposed with respect to the carrier 7300. Accordingly, the lens barrel 7100 and the carrier 7300 may be moved together in the optical axis (e.g., Z-axis) direction.

The housing 6000 may have an internal space, and may have a rectangular box shape of which a top and a bottom are opened. The carrier 7300 may be disposed in the internal space of the housing 6000.

The case 6300 may be coupled to the housing 6000 to protect the internal components of the second actuator 20'.

The case 6300 may be provided with a protrusion part 6310 protruding toward a second ball member B2 to be described later. The protrusion part 6310 may serve as a stopper and a buffer member, restricting the movement range of the second ball member B2.

The second driver 8000 may generate driving force in the optical axis (e.g., Z-axis) direction to move the carrier 7300 in the optical axis (e.g., Z-axis) direction.

The second driver 8000 may include a third magnet 8100 and a third coil 8300. The third magnet 8100 and the third coil 8300 may be disposed to face each other in the direction perpendicular to the optical axis (e.g., the Z-axis).

The third magnet 8100 may be disposed on the carrier 7300. For example, the third magnet 8100 may be disposed on one side surface of the carrier 7300.

One side surface of the carrier 7300 may further protrude in the optical axis (e.g., Z-axis) direction than the other portion of the carrier 7300. For example, the carrier 7300 may include a first guide part 7310 protruding in the optical axis (e.g., Z-axis) direction, and the third magnet 8100 may be disposed on the first guide part 7310. Accordingly, the height of the second actuator 20' may be decreased by decreasing the height of the other portion of the carrier 7300 while securing the second driver 8000 installation space to secure driving force.

A back yoke may be disposed between the carrier 7300 and the third magnet 8100. The back yoke may improve driving force by preventing leakage of magnetic flux of the third magnet 8100.

The third magnet 8100 may be magnetized so that one surface thereof (e.g., a surface thereof facing the third coil 8300) has both of an N pole and an S pole. As an example, an N pole, a neutral region, and an S pole may be sequentially provided along the optical axis (e.g., Z-axis) direction on one surface of the third magnet 8100 facing the third coil 8300.

The third magnet 8100 may be magnetized so that the other surface (e.g., an opposite surface to one surface) thereof has both of an S pole and an N pole. As an example, an S pole, a neutral region, and an N pole may be sequentially provided along the optical axis (e.g., Z-axis) direction on the other surface of the third magnet 8100.

The third coil 8300 may be disposed to face the third magnet 8100. For example, the third coil 8300 may be disposed to face the third magnet 8100 in the direction perpendicular to the optical axis (e.g., the Z-axis).

The third coil 8300 may be disposed on a substrate 8900, and the substrate 8900 may be mounted on the housing 6000 so that the third magnet 8100 and the third coil 8300 face each other in the direction perpendicular to the optical axis (e.g., the Z-axis).

One side surface of the housing 6000 may further protrude in the optical axis (e.g., Z-axis) direction than the other portion of the housing 6000. For example, the housing 6000 may include a second guide part 6330 protruding in the optical axis (e.g., Z-axis) direction, and the substrate 8900 may be disposed on the second guide part 6330.

Figure 34:
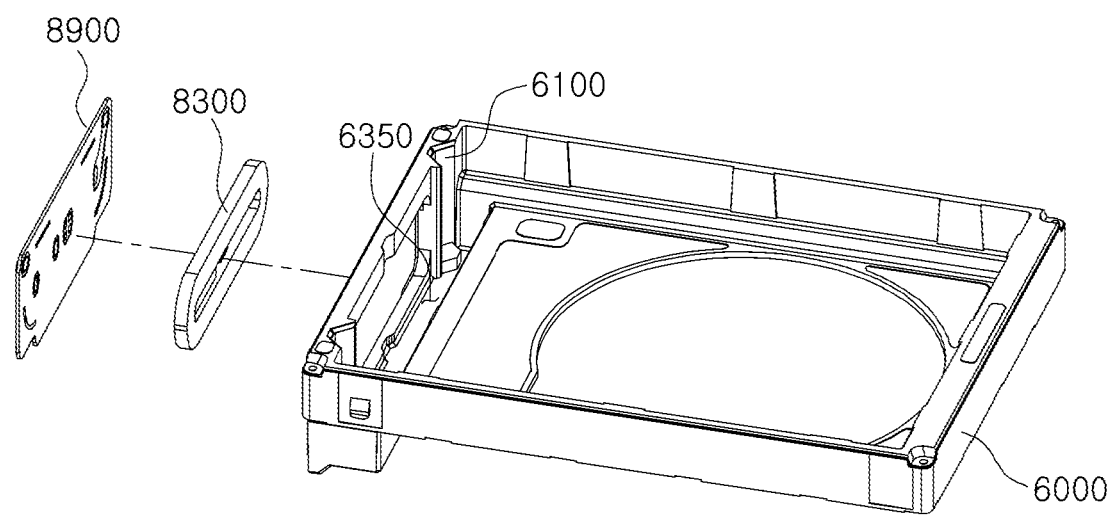
FIG. 34 is a perspective view of the housing of the second actuator according to another one or more embodiments in the present disclosure.

In addition, as illustrated in FIG. 34, the second guide part 6330 may have an accommodation space 6350 for accommodating the first guide part 7310.

Accordingly, a height of the second actuator 20' may be decreased by decreasing a height of the other portion of the housing 6000 while securing an installation space of the second driver 8000 in order to secure driving force.

The third magnet 8100 may be a movable member mounted on the carrier 7300 and moving in the optical axis (e.g., Z-axis) direction together with the carrier 7300, and the third coil 8300 may be a fixed member fixed to the substrate 8900.

When power is applied to the third coil 8300, the carrier 7300 may be moved in the optical axis (e.g., Z-axis) direction by an electromagnetic force between the third magnet 8100 and the third coil 8300.

Since the lens barrel 7100 is disposed in the carrier 7300, the lens barrel 7100 may also be moved in the optical axis (e.g., Z-axis) direction by the movement of the carrier 7300.

A second ball member B2 may be disposed between the carrier 7300 and the housing 6000. For example, the second ball member B2 may be disposed between the first guide part 7310 of the carrier 7300 and the second guide part 6330 of the housing 6000. The second ball member B2 may include a plurality of balls disposed along the optical axis (e.g., Z-axis) direction. The plurality of balls may be moved in a rolling motion in the optical axis (e.g., Z-axis) direction when the carrier 7300 is moved in the direction of the optical axis (e.g., Z-axis).

A yoke 8700 may be disposed on the housing 6000. The yoke 8700 may be disposed at a position facing the third magnet 8100. For example, the coil 8300 may be disposed on one surface of the substrate 8900, and the yoke 8700 may be disposed on the other surface of the substrate 8900.

The third magnet 8100 and the yoke 8700 may generate attractive force therebetween. For example, attractive force may act in the direction perpendicular to the optical axis (e.g., the Z-axis) between the magnet 8100 and the yoke 8700.

Due to the attractive force of the third magnet 8100 and the yoke 8700, the second ball member B2 may be in contact with each of the carrier 7300 and the housing 6000.

Guide grooves may be disposed in surfaces of the carrier 7300 and the housing 6000 facing each other. For example, a third guide groove 7311 may be provided in the first guide part 7310 of the carrier 7300, and a fourth guide groove 6100 may be provided in the second guide part of the housing 6000.

The third guide groove 7311 and the fourth guide groove 6100 may extend in the optical axis (e.g., Z-axis) direction.

The second ball member B2 may be disposed between the third guide groove 7311 and the fourth guide groove 6100.

Since the first guide part 7310 of the carrier 7300 and the second guide part 6330 of the housing 6000 have a shape in which they protrude in the optical axis (e.g., Z-axis) direction, escape areas may be provided in the fixed frame 1000 and the moving frame 2000 of the first actuator 10' in order to secure an installation space for the first guide part 7310 and the second guide part 6330.

Figure 31:
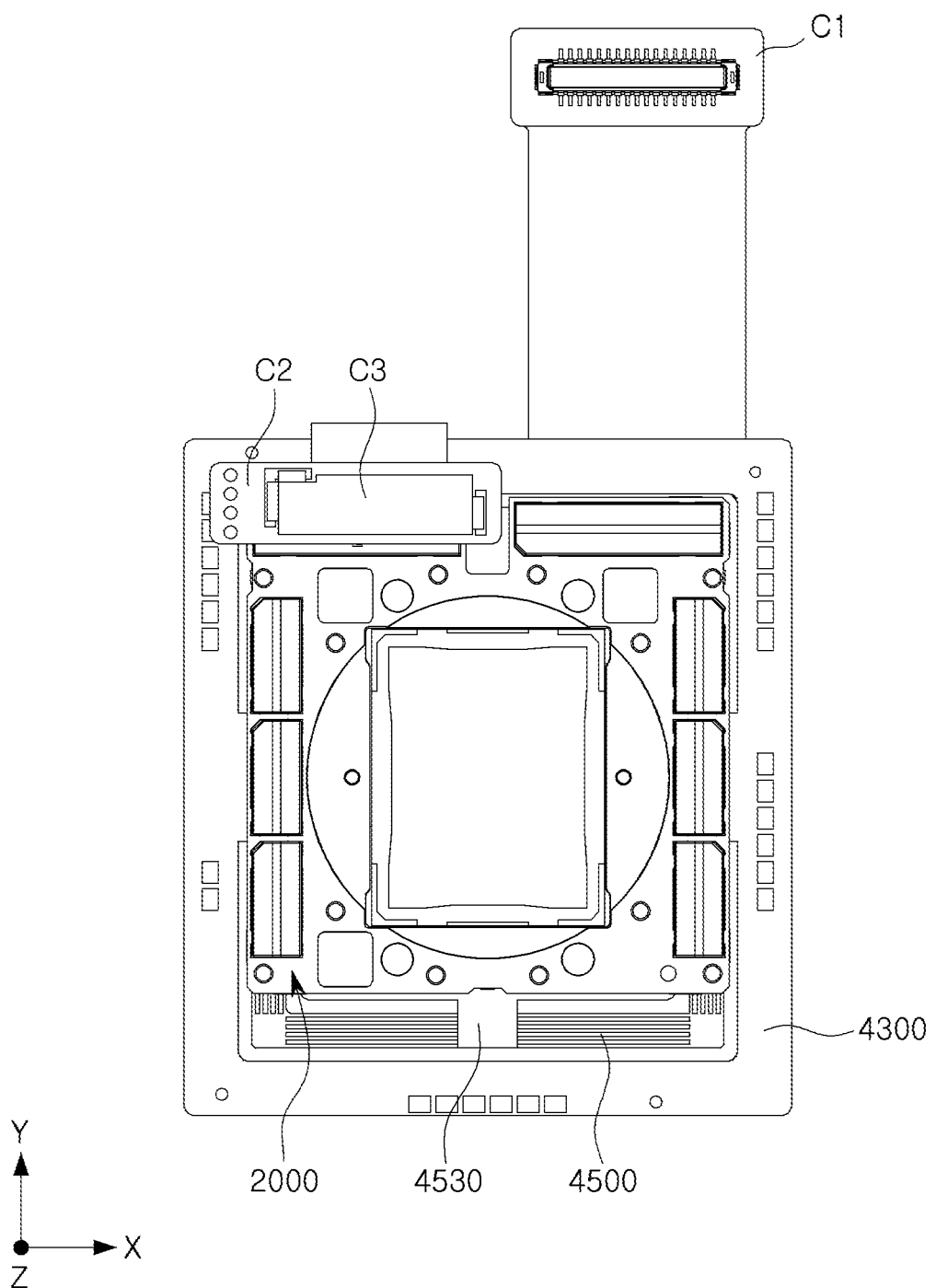
FIG. 31 is a plan view illustrating a form in which the moving frame and the sensor substrate of the first actuator, according to another one or more embodiments in the present disclosure, are coupled to each other.

That is, as illustrated in FIG. 23, a step part 1510 may be provided on one side of the fixed frame 1000, and as illustrated in FIG. 31, one side of the moving frame 2000 may be shorter than the other side of the moving frame 2000 to expose a portion of the sensor substrate 4000, and thus, an installation space for the first guide part 7310 and the second guide part 6330 may be secured by such a structure.

Accordingly, even when the first guide part 7310 of the carrier 7300 and the second guide part 6330 of the housing 6000 have the shape in which they protrude in the optical axis (e.g., Z-axis) direction at the second actuator 20', protruding portions may be disposed in the first actuator 10', and resultantly, an entire height of the camera module 1 may not be increased.

Meanwhile, the second actuator 20' may sense a position of the carrier 7300 in the optical axis (e.g., Z-axis) direction.

To this end, a third position sensor 8500 may be provided (see FIG. 32). The third position sensor 8500 may be disposed on the substrate 8900 to face the third magnet 8100. The third position sensor 8500 may be a Hall sensor.

Meanwhile, the configurations for the main guide, the auxiliary guide, the number of second ball members B2, the support area, and the like, described with reference to FIGS. 13 through 19 may also be applied to the camera module 1' according to another one or more embodiments in the present disclosure.

The camera module 1', according to one or more embodiments in the present disclosure, may be configured so that the lens module 7000 moves in the optical axis (e.g., Z-axis) direction at the time of the auto-focusing, and may be configured so that the image sensor S moves along the directions perpendicular to the optical axis (e.g., the Z-axis) at the time of the optical image stabilization.

Accordingly, even though the lens module 7000 is moved in the optical axis (e.g., Z-axis) direction at the time of the focusing, relative positions of the magnets and the coils of the first driver 3000 do not change, and thus, driving force for the optical image stabilization may be precisely controlled.

In addition, even though the image sensor S is moved in the directions perpendicular to the optical axis at the time of the optical image stabilization, relative positions of the magnet and the coil of the second driver 8000 do not change, and thus, driving force for the focusing may be precisely controlled.

As set forth above, the actuator for optical image stabilization, according to one or more embodiments in the present disclosure, and the camera module including the same may improve optical image stabilization performance.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for optical image stabilization, comprising:
a first frame;
a second frame disposed to be movable in a direction perpendicular to an optical axis with respect to the first frame;
a ball member disposed between the first frame and the second frame;
a first sub-driver comprising a first magnet disposed on the second frame and a first coil disposed to face the first magnet;
a second sub-driver comprising a second magnet disposed on the second frame and a second coil disposed to face the second magnet;
a magnetic body disposed to face the first and second magnets in an optical axis direction; and
a sensor substrate comprising a moving part on which an image sensor is disposed and fixed to the second frame.

2. The actuator of claim 1, wherein the second frame has a rectangular plate shape with a center penetrated in the optical axis direction,
the first magnet is disposed on one side of the second frame, and the second magnet is disposed on the other side of the second frame.

3. The actuator of claim 1, wherein the first magnet and the second magnet are disposed perpendicular to each other in a plane perpendicular to the optical axis.

4. The actuator of claim 1, wherein the first frame is provided with a plurality of through-holes penetrating through the first frame, and
the first coil and the first magnet, and the second coil and the second magnet face each other directly through the plurality of through-holes.

5. The actuator of claim 1, wherein a first substrate is disposed on the first frame, and the first coil and the second coil are disposed on one surface of the first substrate.

6. The actuator of claim 1, further comprising a first position sensor disposed to face the first magnet; and a second position sensor disposed to face the second magnet.

7. The camera module of claim 1, wherein the magnetic body comprises a first yoke facing the first magnet and a second yoke facing the second magnet.

8. The actuator of claim 1, wherein each of the first magnet and the second magnet has an N pole, a neutral region, and an S pole sequentially provided along a direction in which a driving force is generated.

9. The actuator of claim 1, wherein the sensor substrate comprises a fixed part spaced apart from the moving part, and a connection part connecting the moving part and the fixed part.

10. The actuator of claim 9, wherein the connection part extends along a circumference of the moving part.

11. An actuator for optical image stabilization, comprising:
a first frame;

a second frame disposed to be movable in a direction perpendicular to an optical axis with respect to the first frame;

a ball member disposed between the first frame and the second frame;

a first sub-driver comprising a first magnet disposed on the second frame and a first coil disposed to face the first magnet;

a second sub-driver comprising a second magnet disposed on the second frame and a second coil disposed to face the second magnet;

a magnetic body disposed to face the first and second magnets in an optical axis direction; and a sensor substrate comprising a moving part on which an image sensor is disposed and fixed to the second frame, wherein the sensor substrate comprises a fixed part spaced apart from the moving part, and a connection part connecting the moving part and the fixed part, wherein the connection part comprises a first support part and a second support part, the first support part has one side connected to the moving part and another side spaced apart from the fixed part, and the second support part has one side connected to the fixed part and another side spaced apart from the moving part.

12. The camera module of claim 1, wherein the optical axis direction is parallel to a direction perpendicular to the imaging plane of the image sensor.

* * * * *